United States Patent [19]

Fogg et al.

[11] Patent Number: 4,479,194
[45] Date of Patent: Oct. 23, 1984

[54] SYSTEM AND METHOD FOR READING MARKS ON A DOCUMENT

[75] Inventors: M. Charles Fogg, Hermosa Beach; Charles F. Krieger, Villa Park; John R. Veale, Manhattan Beach, all of Calif.

[73] Assignee: Computer Election Systems, Berkeley, Calif.

[21] Appl. No.: 406,920

[22] Filed: Aug. 10, 1982

[51] Int. Cl.³ .................. G06F 7/12; G06K 3/00; G07C 13/00
[52] U.S. Cl. ................................. 364/900; 235/386
[58] Field of Search ... 364/200 MS File, 900 MS File; 340/825.33, 825.34; 235/454, 455, 463, 466, 454 F, 386

[56] References Cited

U.S. PATENT DOCUMENTS

| | | | |
|---|---|---|---|
| 3,218,439 | 11/1965 | Holzer et al. | 235/386 |
| 3,582,660 | 6/1971 | Müller-Saala | 235/454 |
| 3,648,022 | 3/1972 | Cook | 235/386 |
| 3,673,389 | 6/1972 | Kapsambells | 235/466 X |
| 3,983,364 | 9/1976 | Firehammer et al. | 235/454 X |
| 4,021,780 | 5/1977 | Narey et al. | 364/900 |

Primary Examiner—Harvey E. Springborn
Attorney, Agent, or Firm—Flehr, Hohbach, Test, Albritton & Herbert

[57] ABSTRACT

A microprocessor based mark-sense ballot card reading system has automatic mark detection threshold adjustment, automatic skew and card speed correction, and provision for simultaneous, accurate reading of both sides of a ballot card regardless of card input orientation. A multidispatch, miltipage real time control program is utilized to enable multiple event detection on each card side and asynchronous processing of such multiple events on a two-sided card. Positive document sensing and control are monitored by the microprocessor control system. A folded card path card transport mechanism with diverter stations operates under microprocessor control to determine card destination.

58 Claims, 70 Drawing Figures

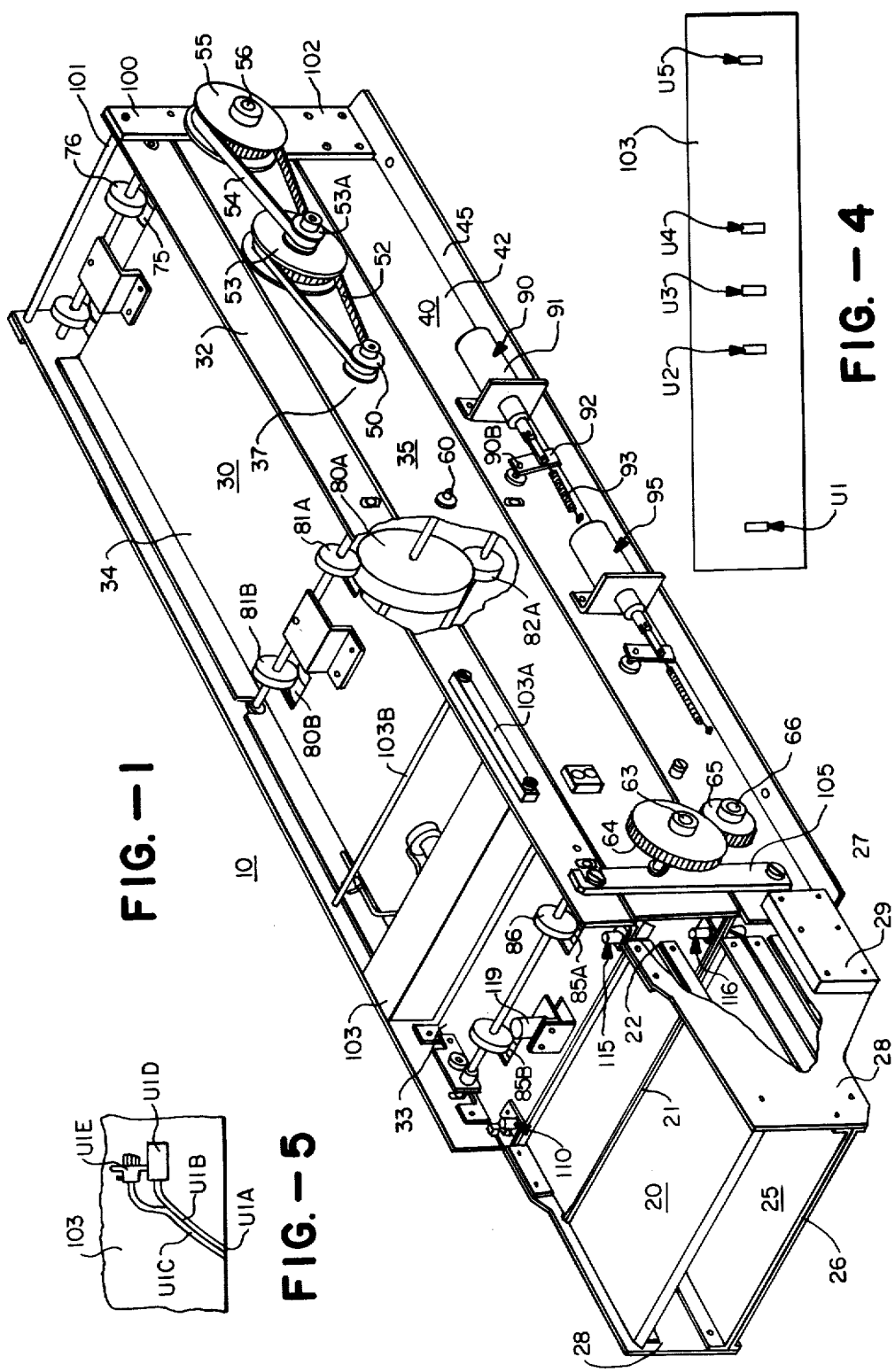

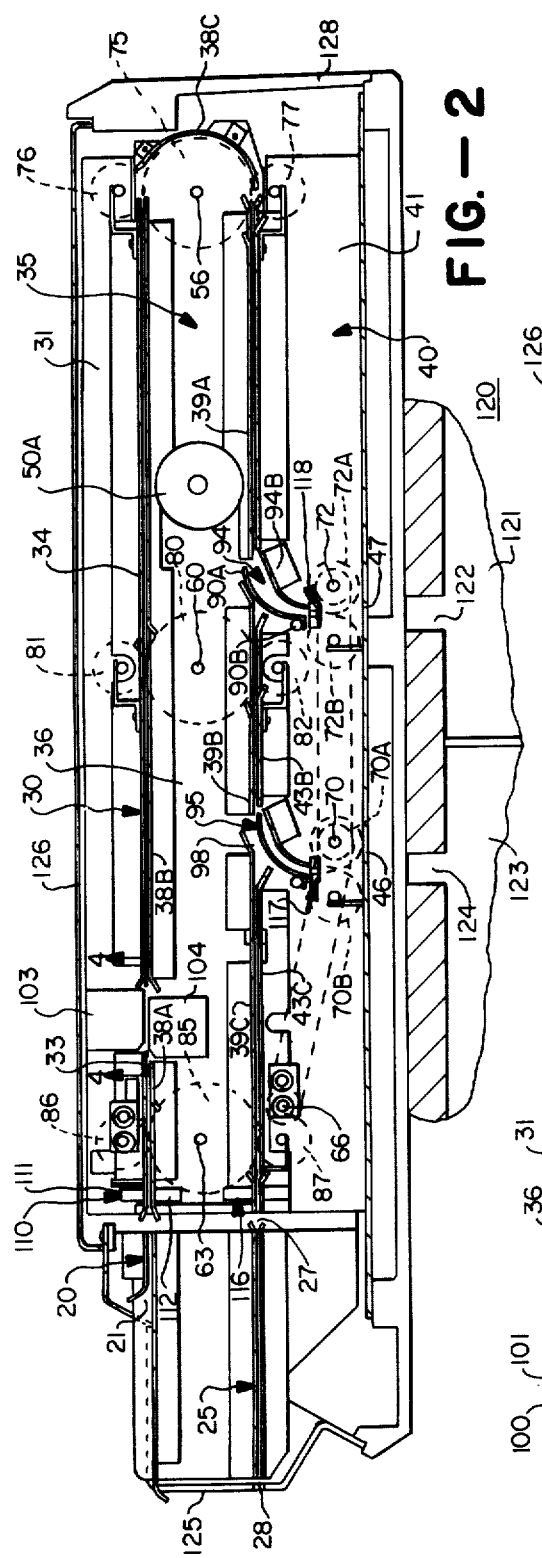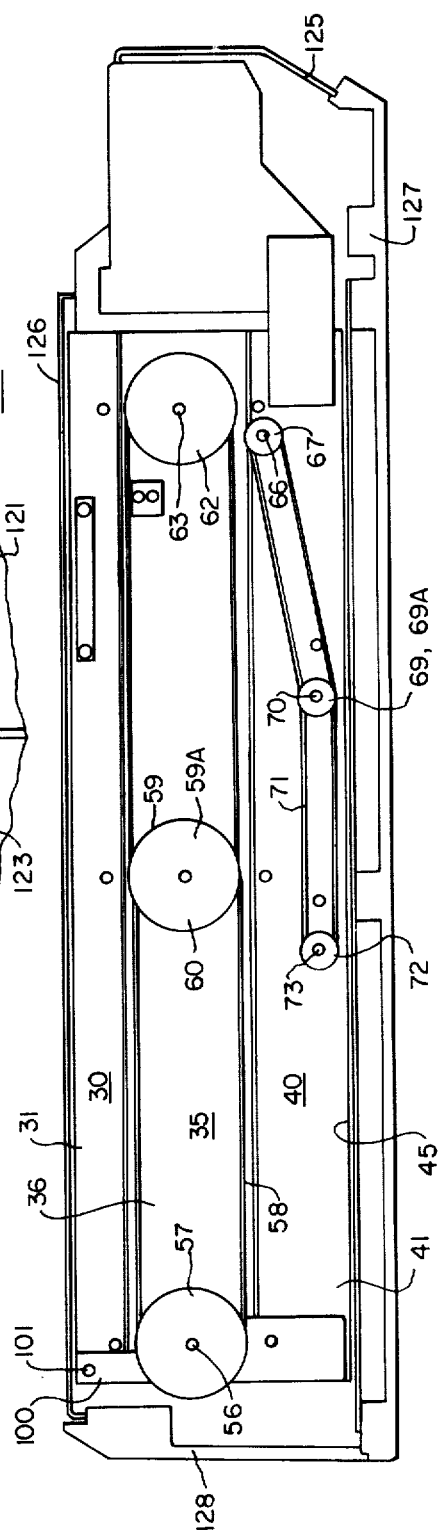

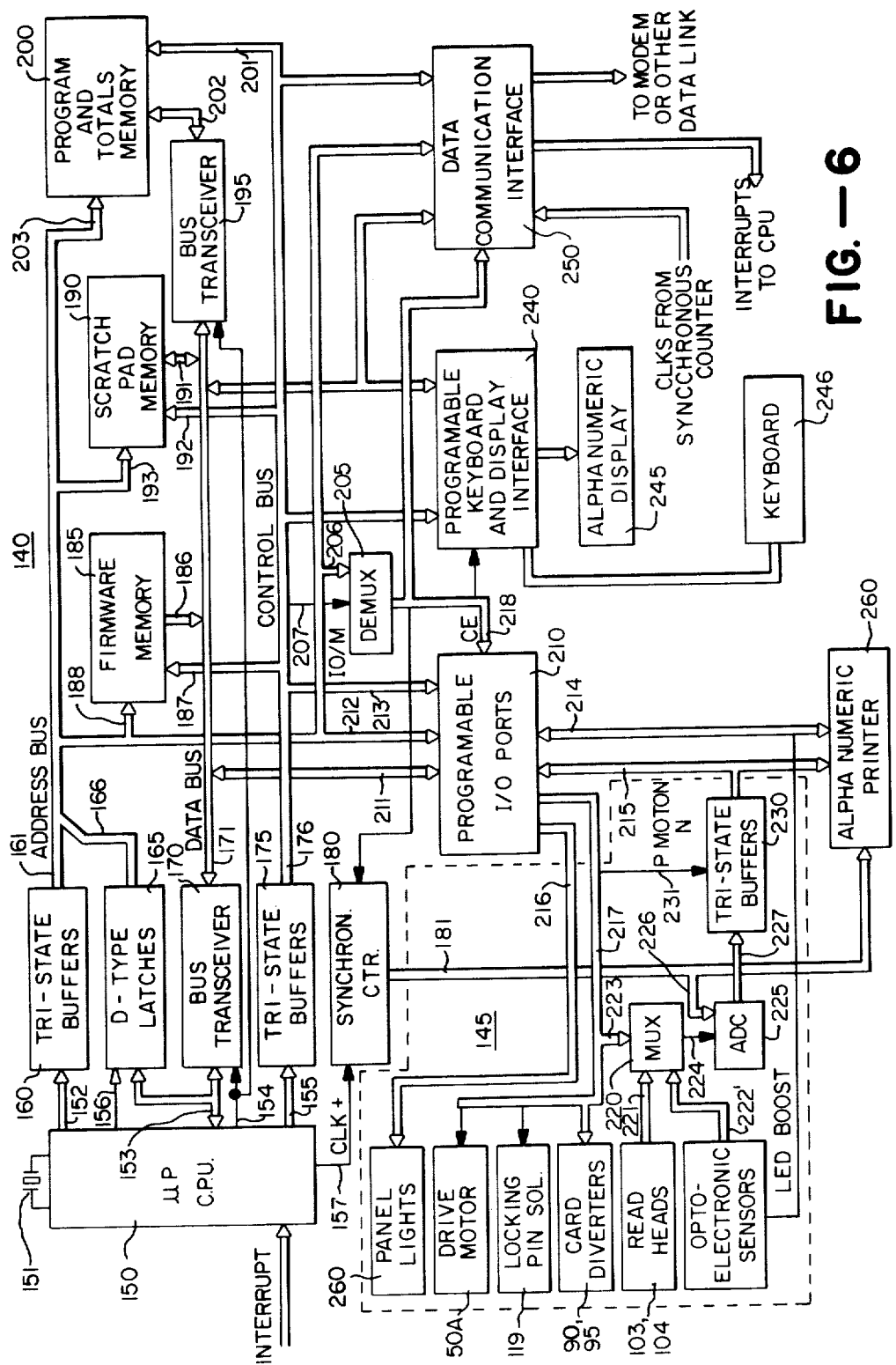
FIG.—6

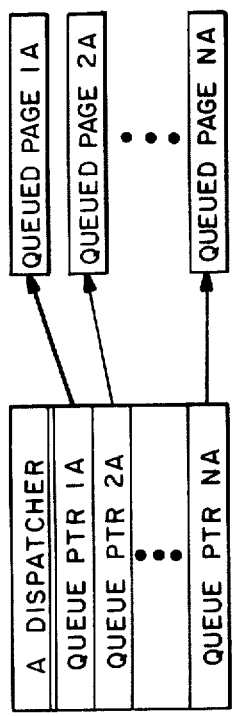
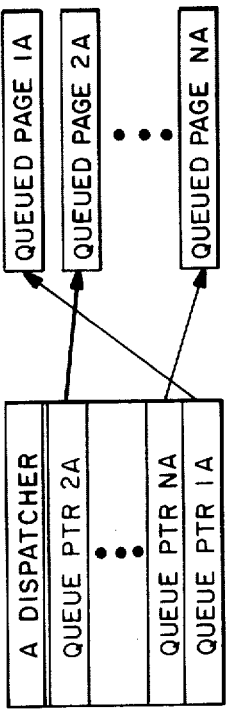
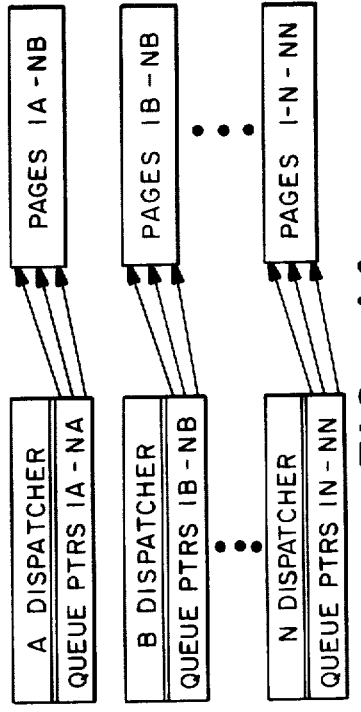
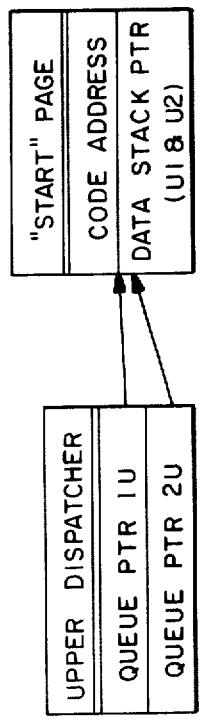
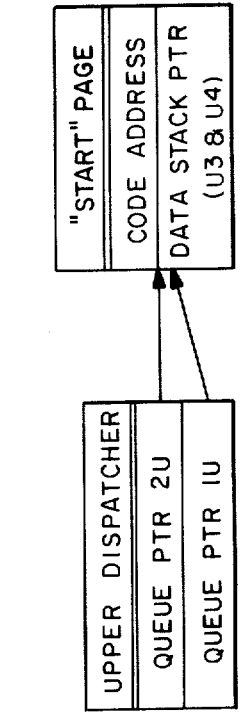
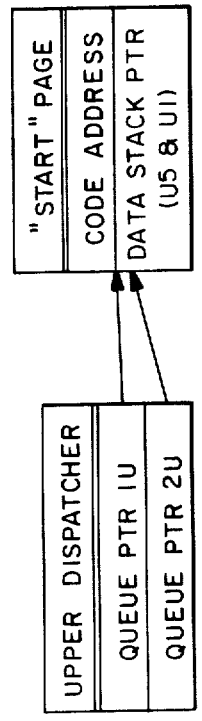

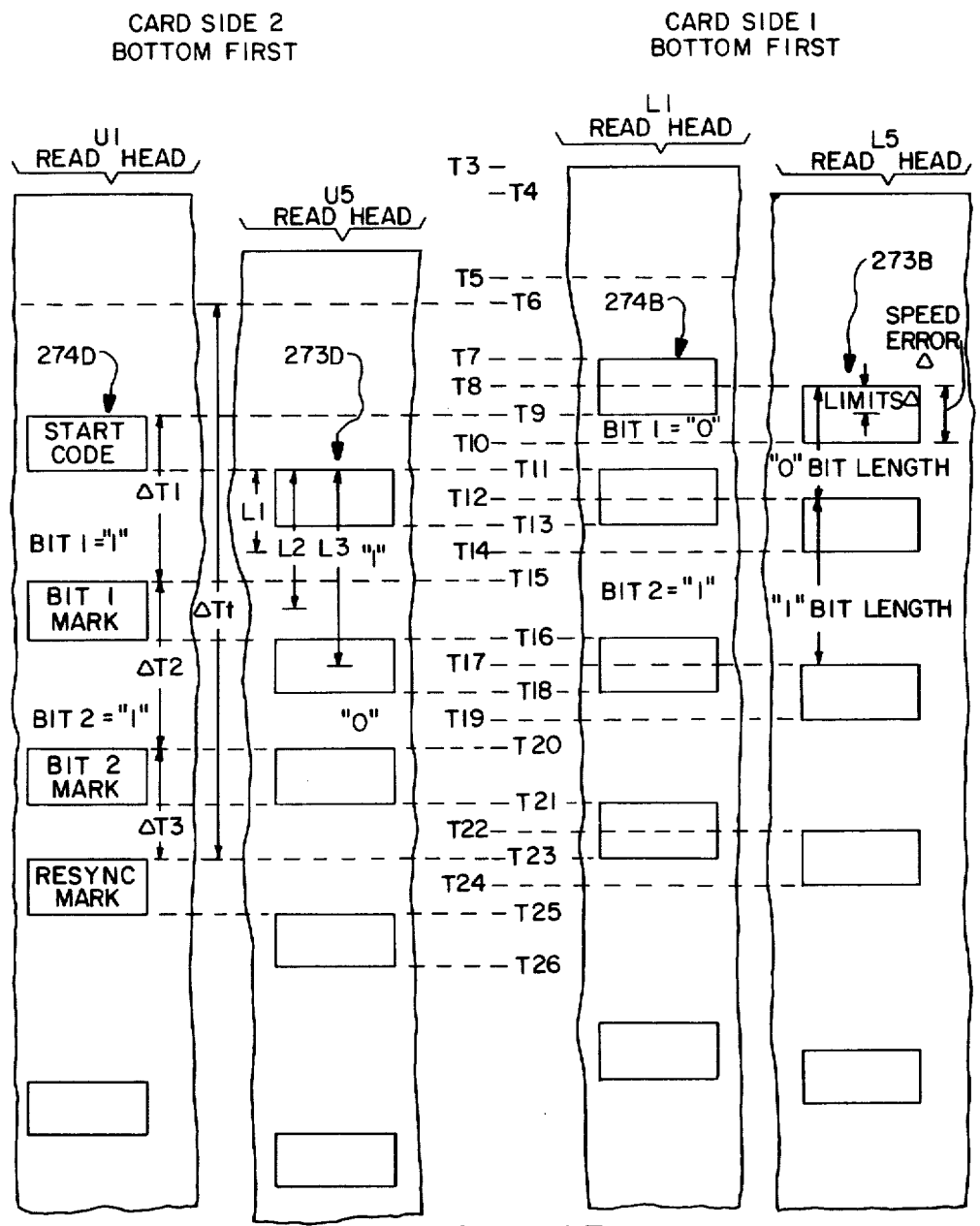
FIG.—15

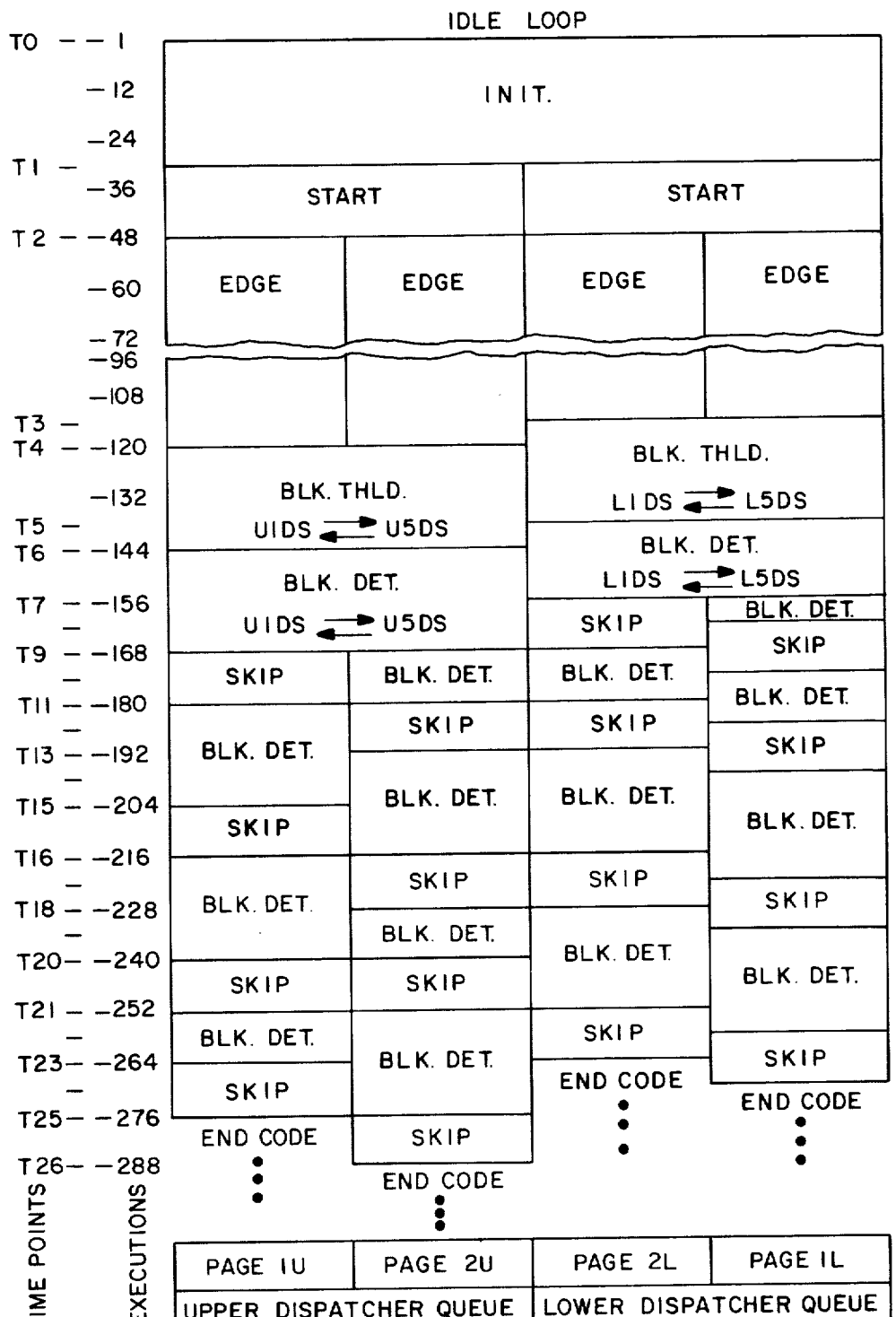
FIG. —16

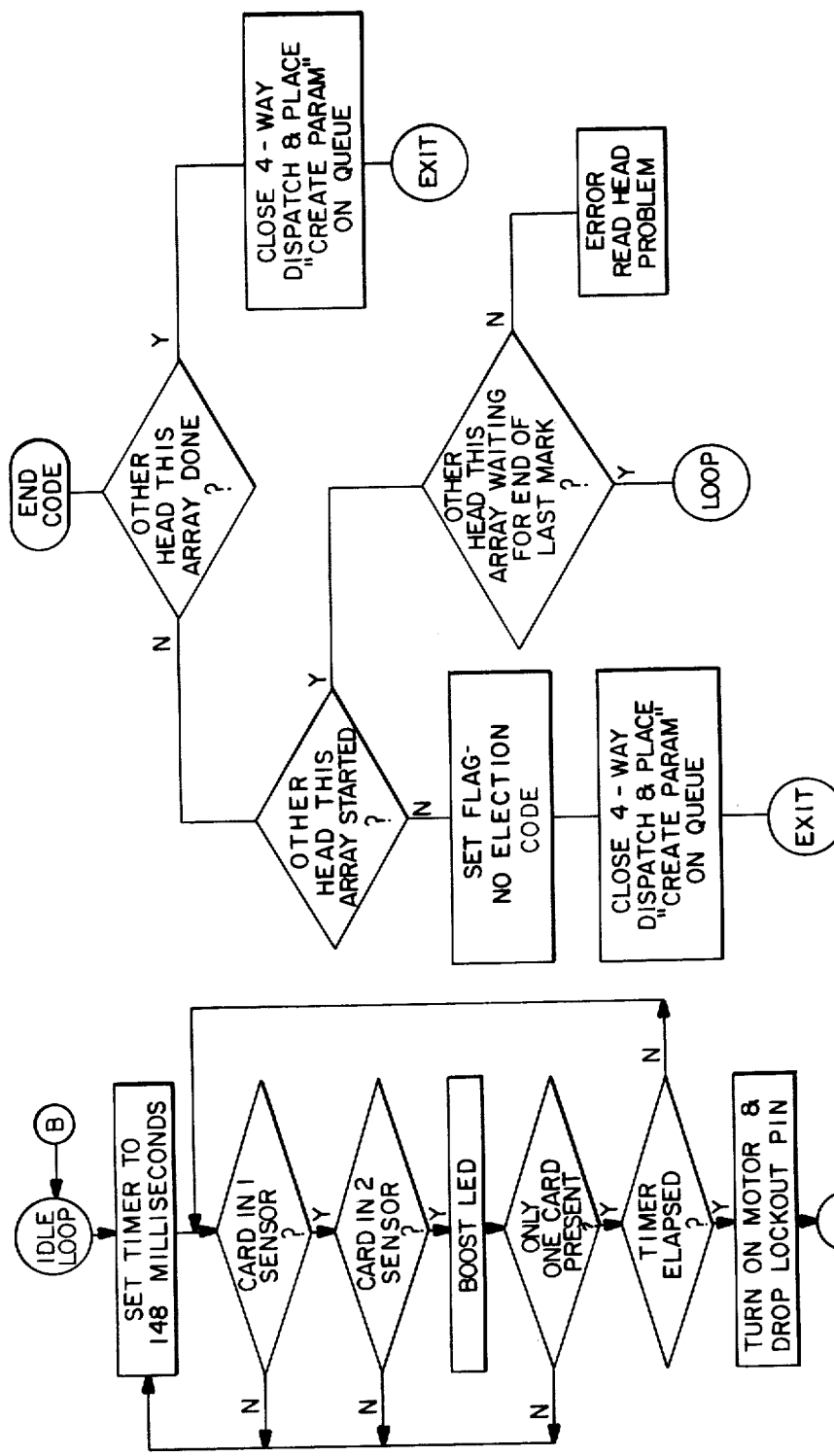

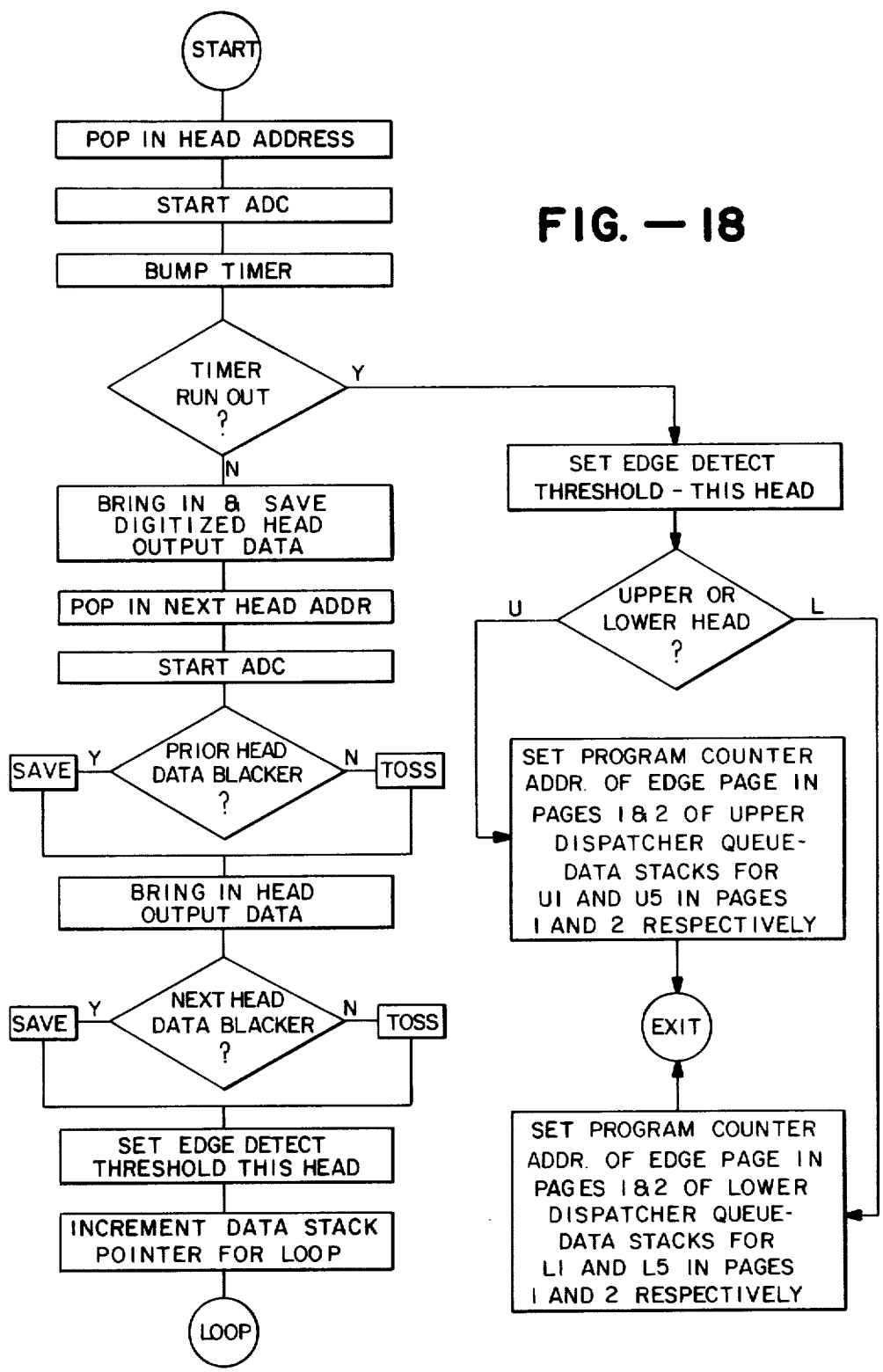
FIG.—18

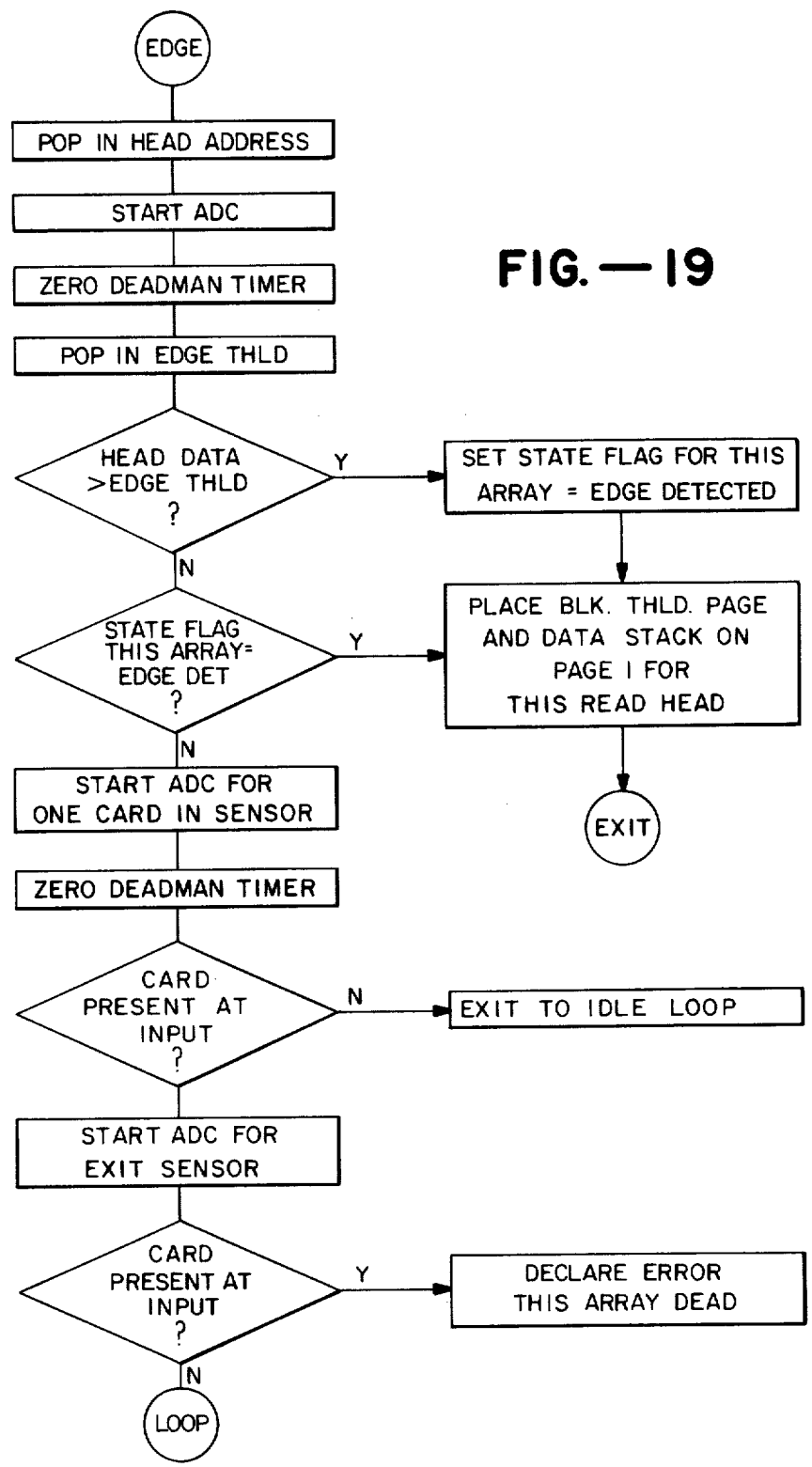
FIG.—19

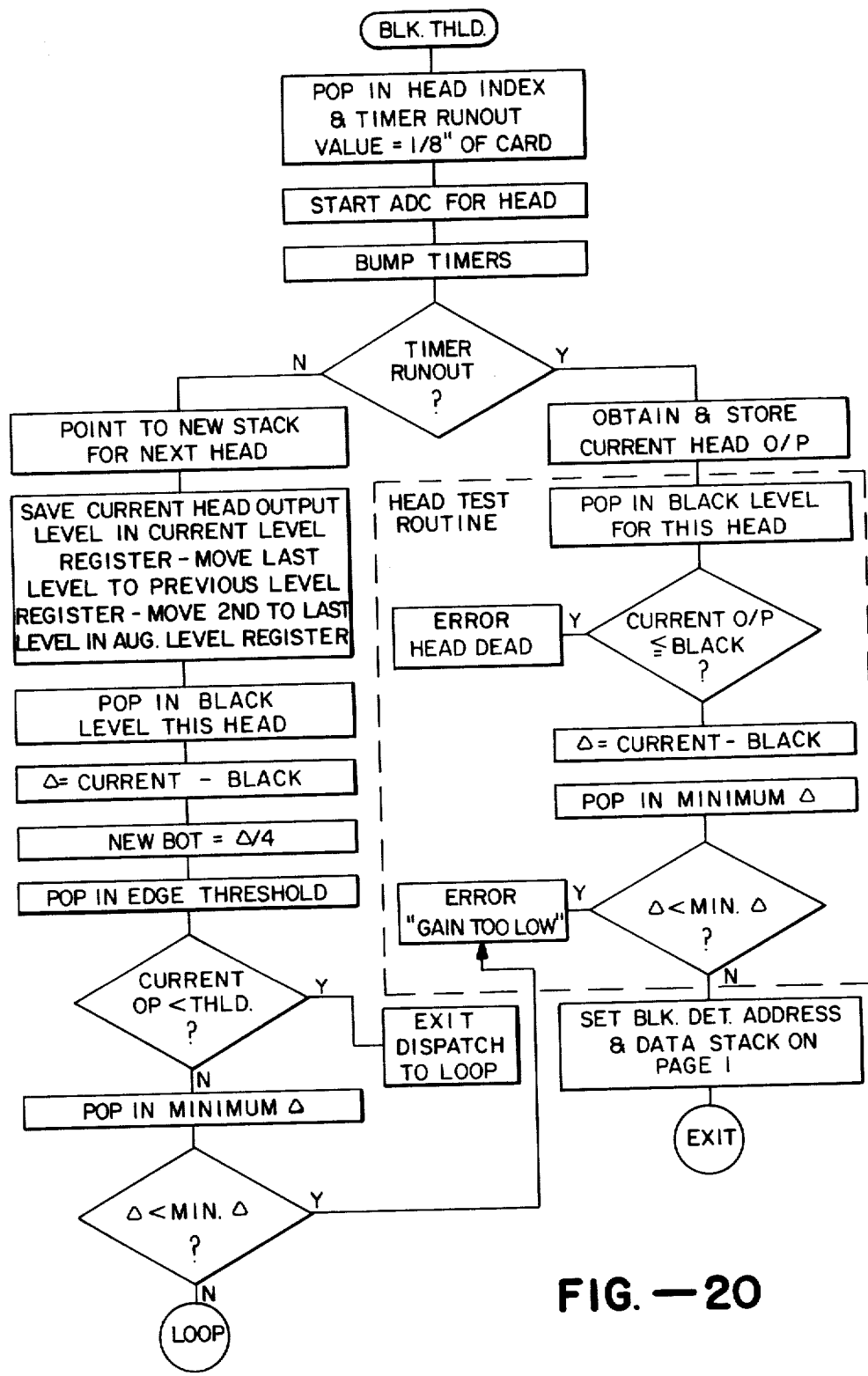
FIG.—20

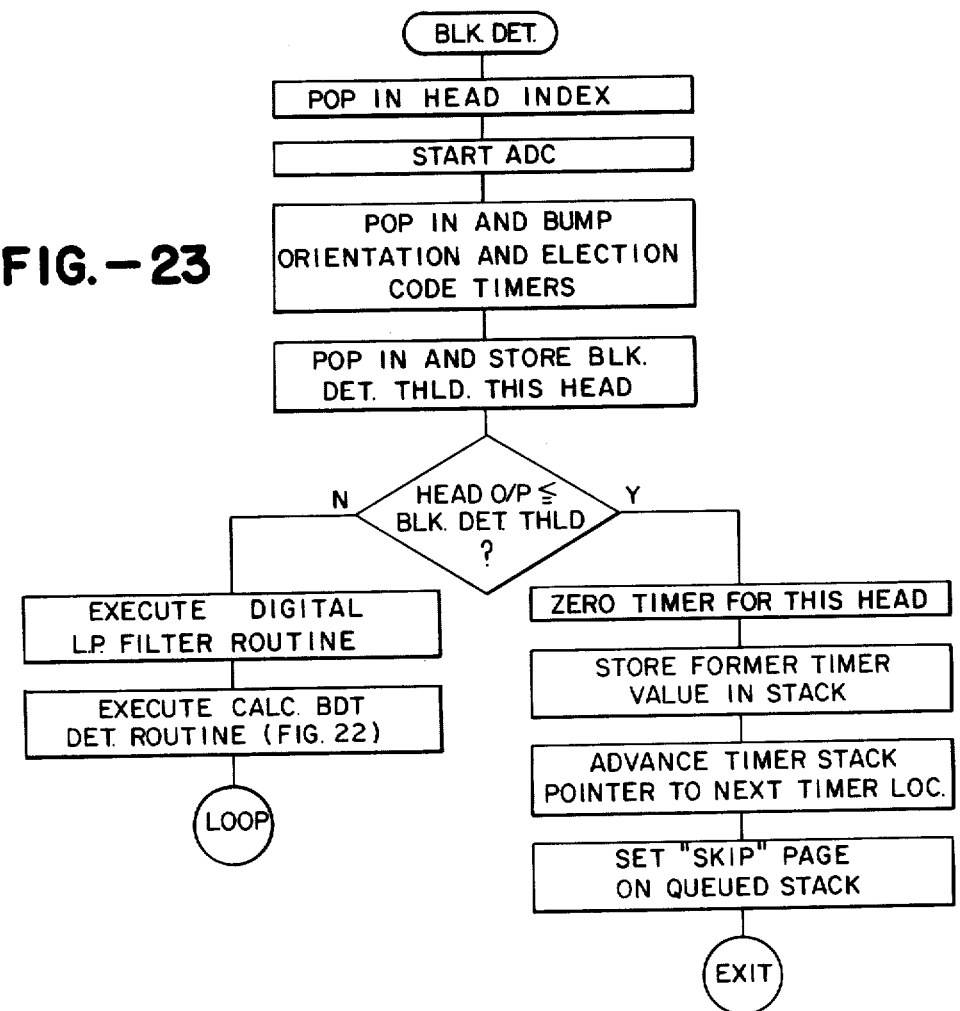
FIG.-23
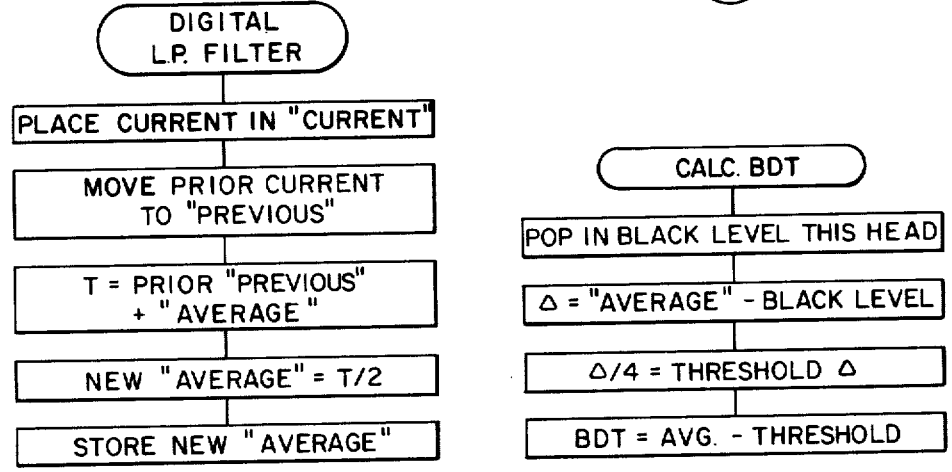
FIG.-21
FIG.-22

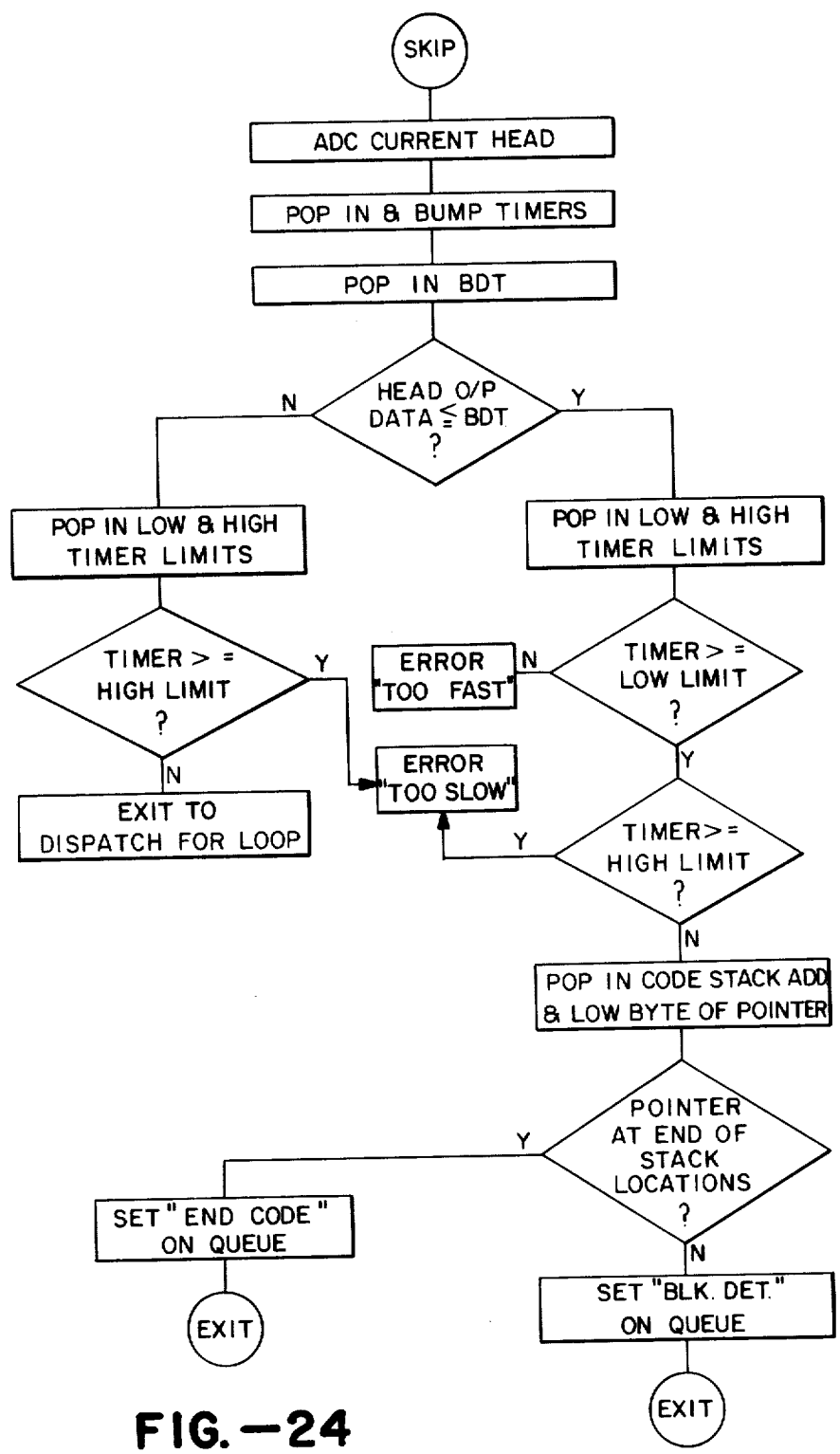
FIG.—24

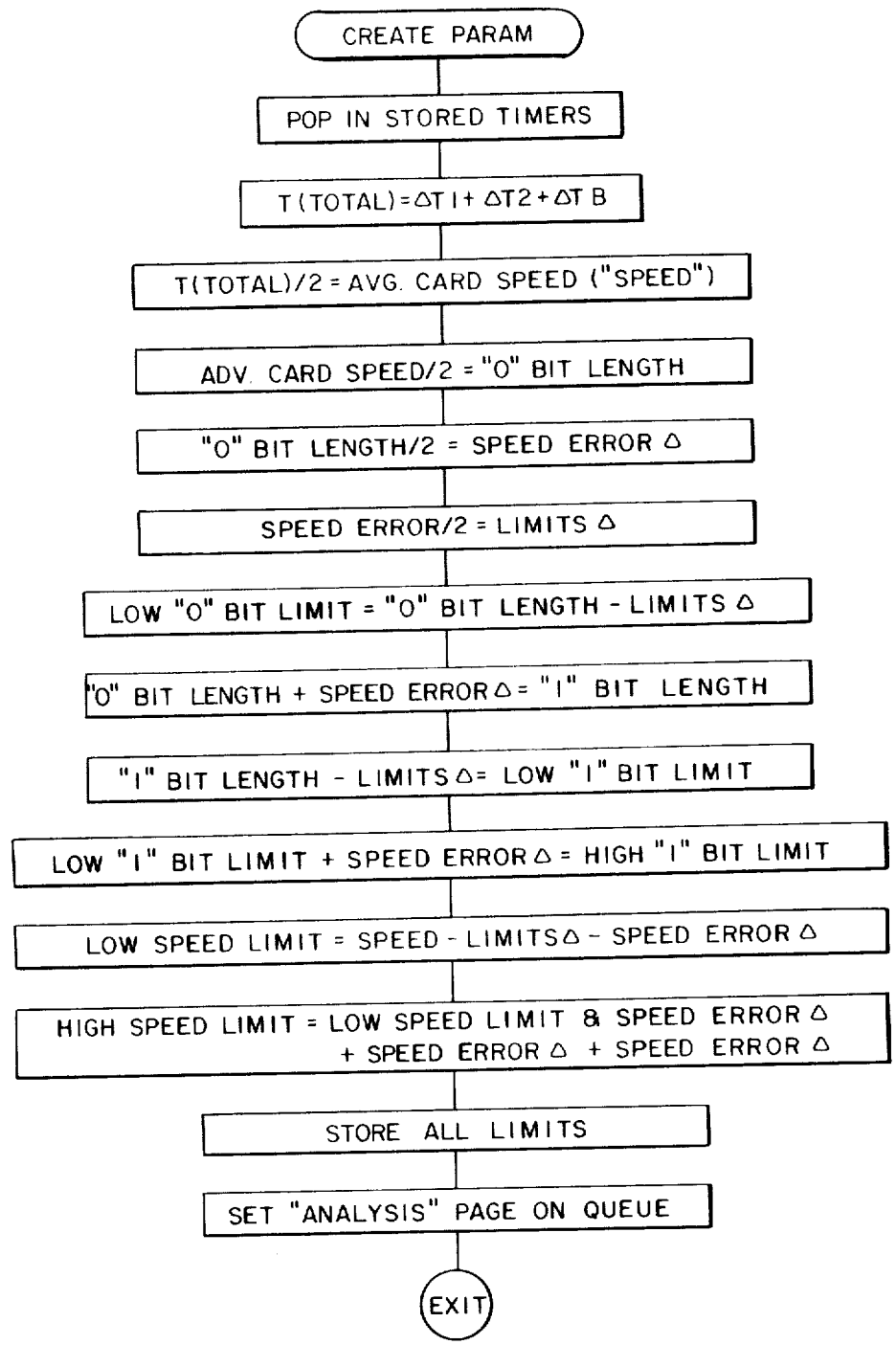
FIG.—26

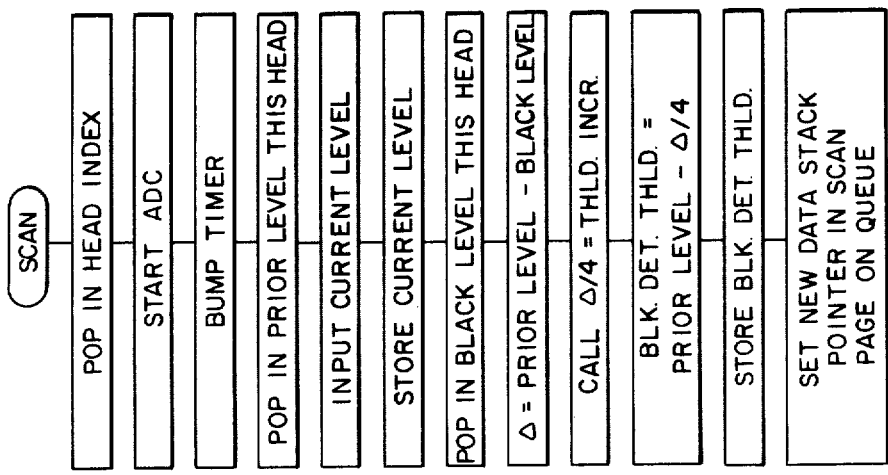
FIG.-33
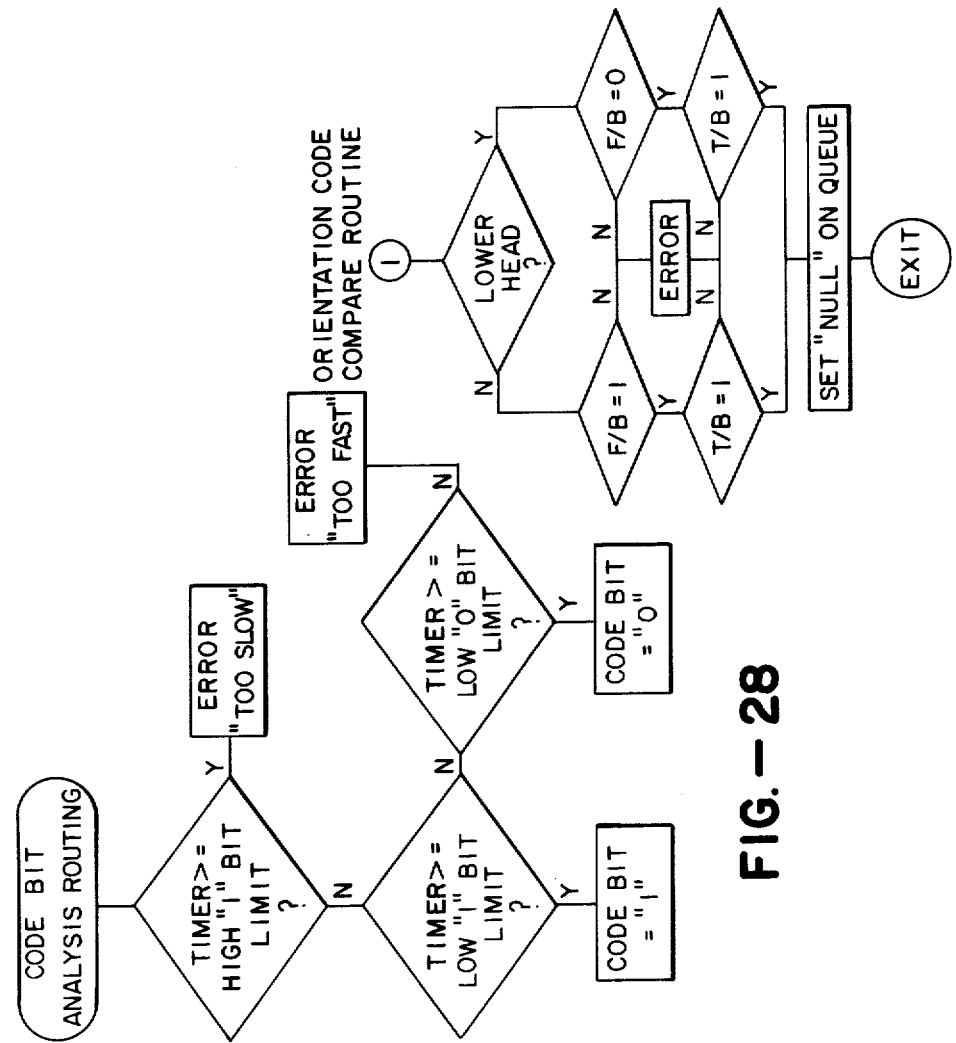
FIG.-29
FIG.-28

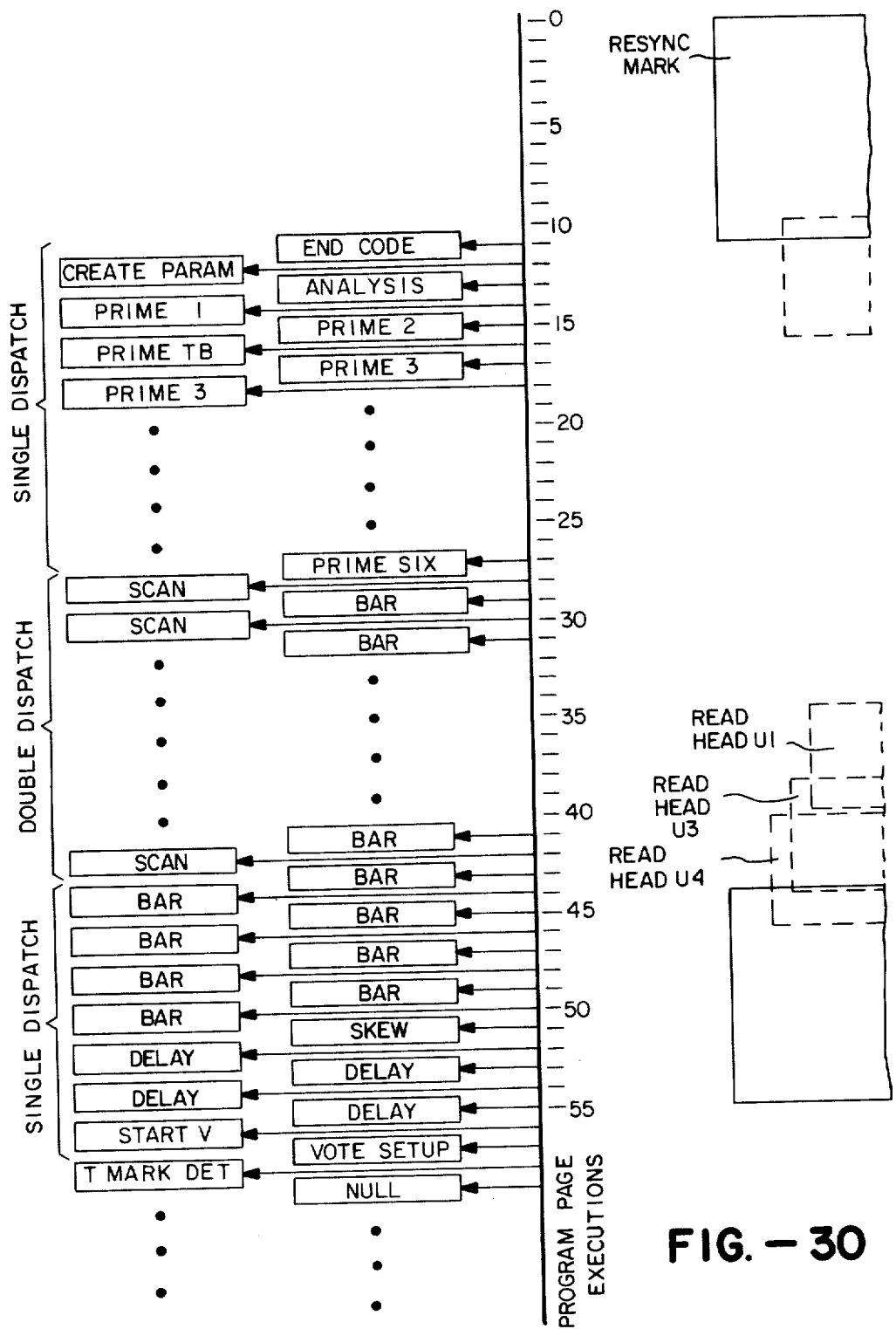
FIG.—30

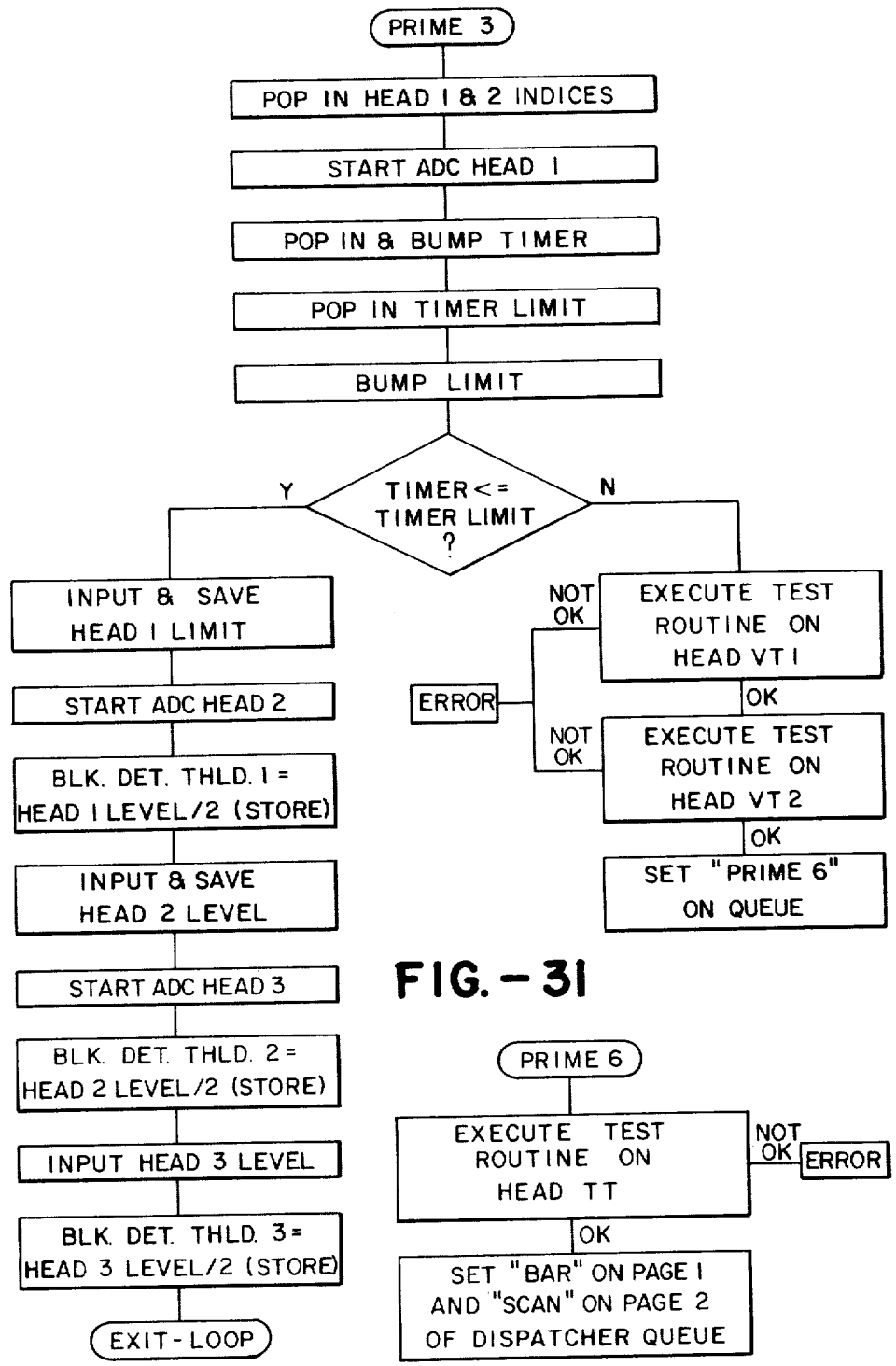
FIG.—31
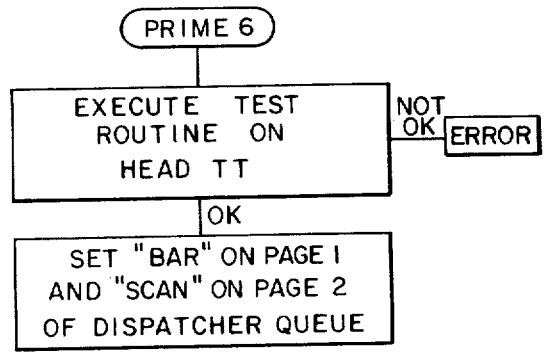
FIG.—32

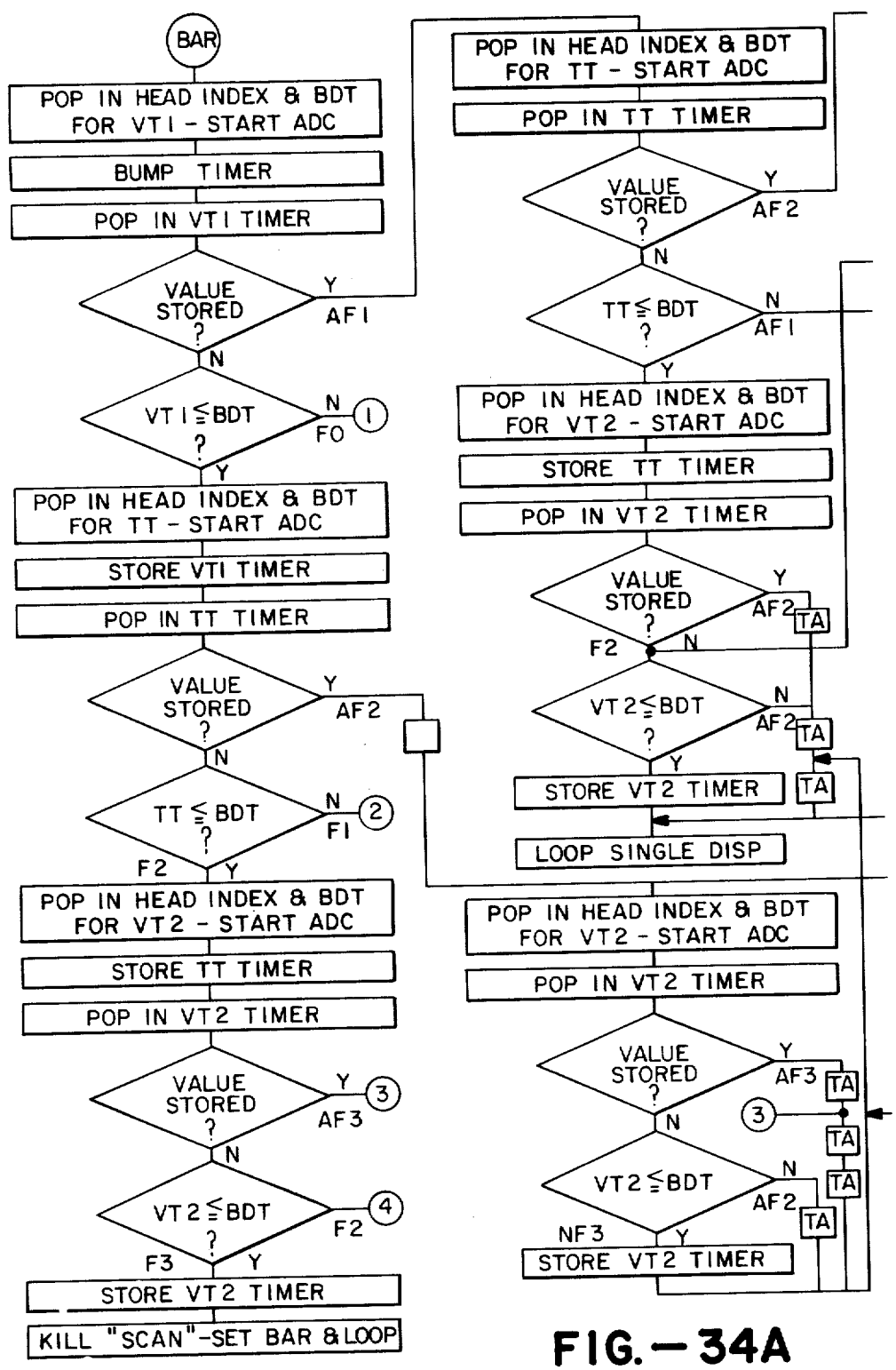
FIG.—34A

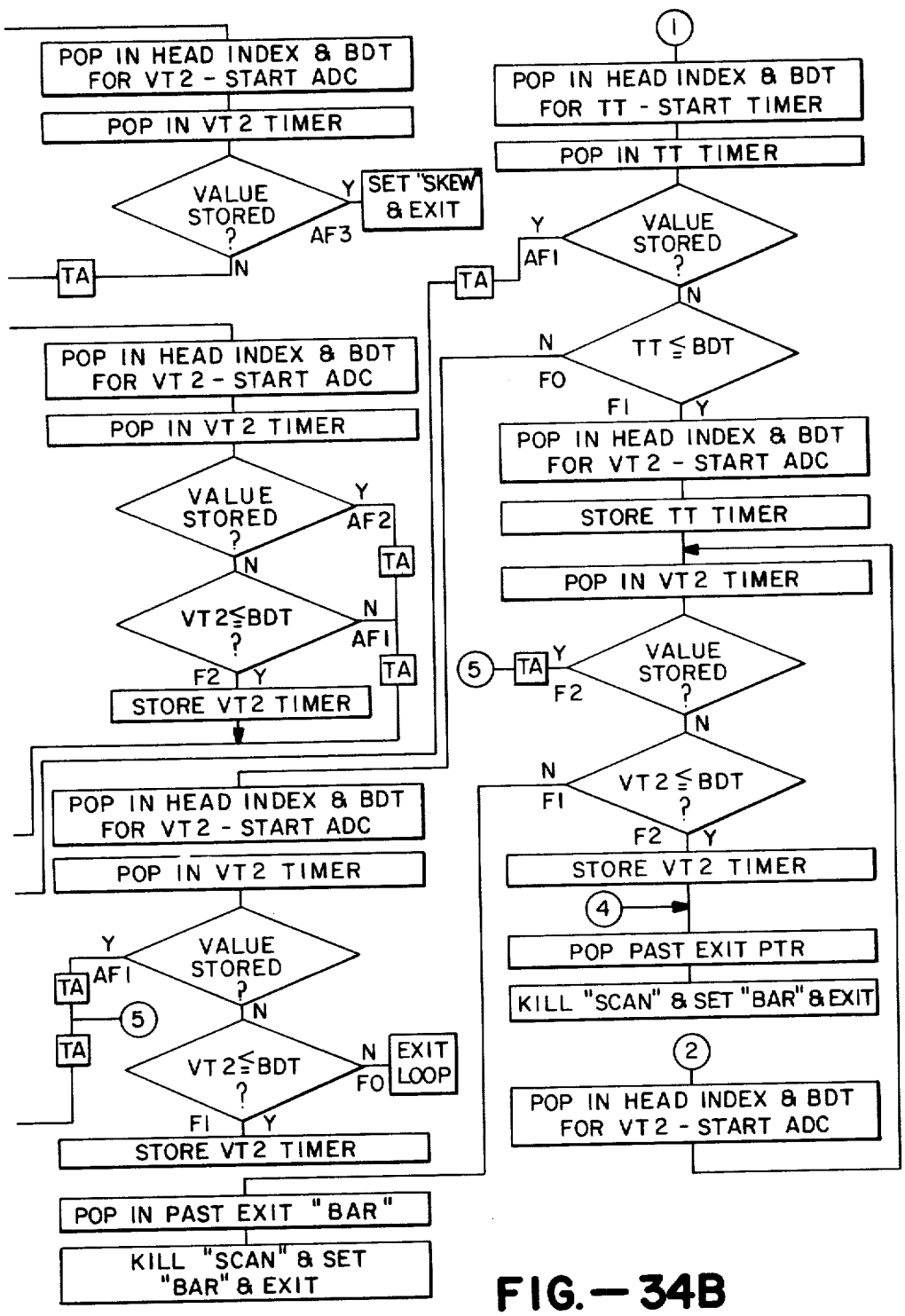
FIG.—34B

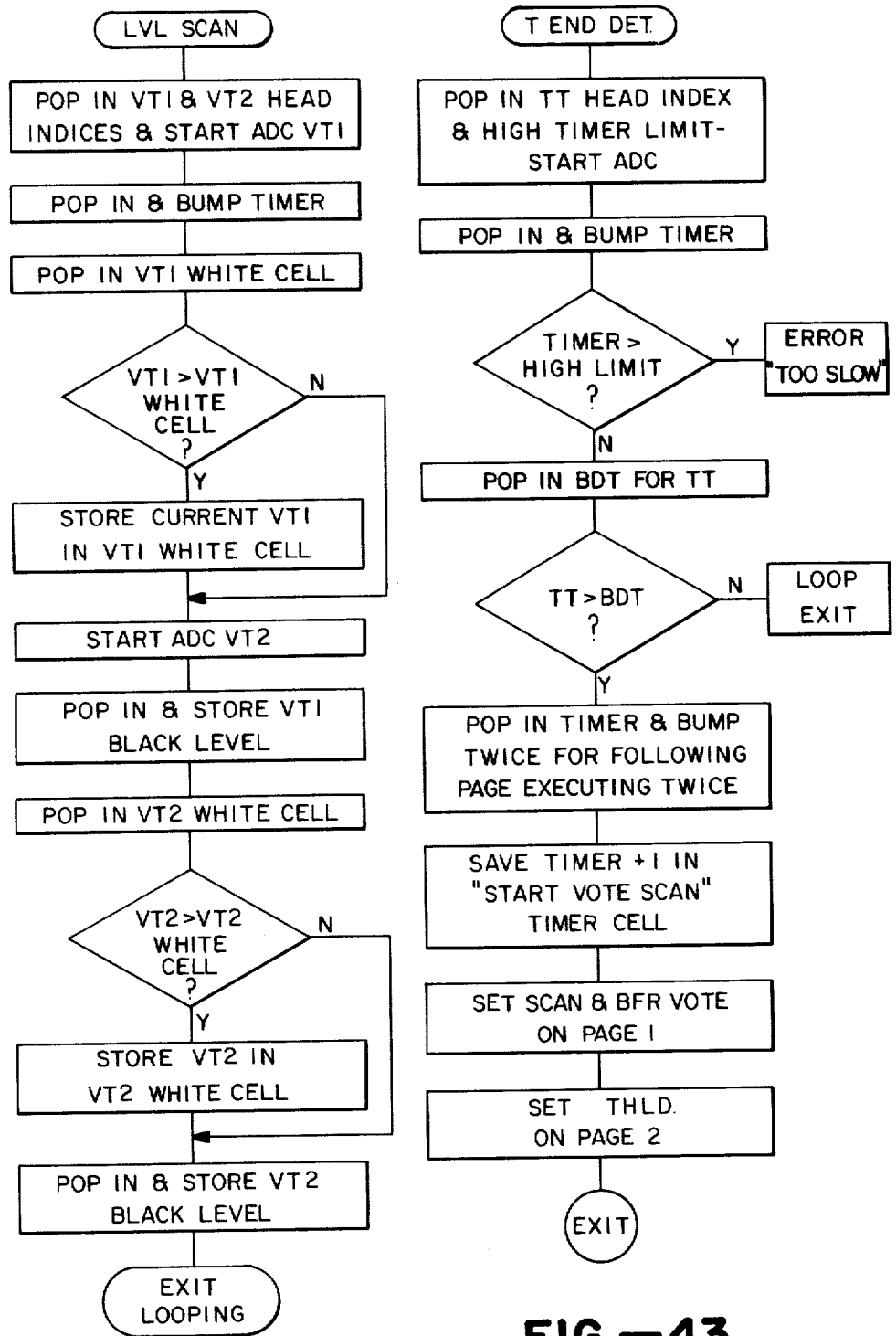
FIG.—37
FIG.—43

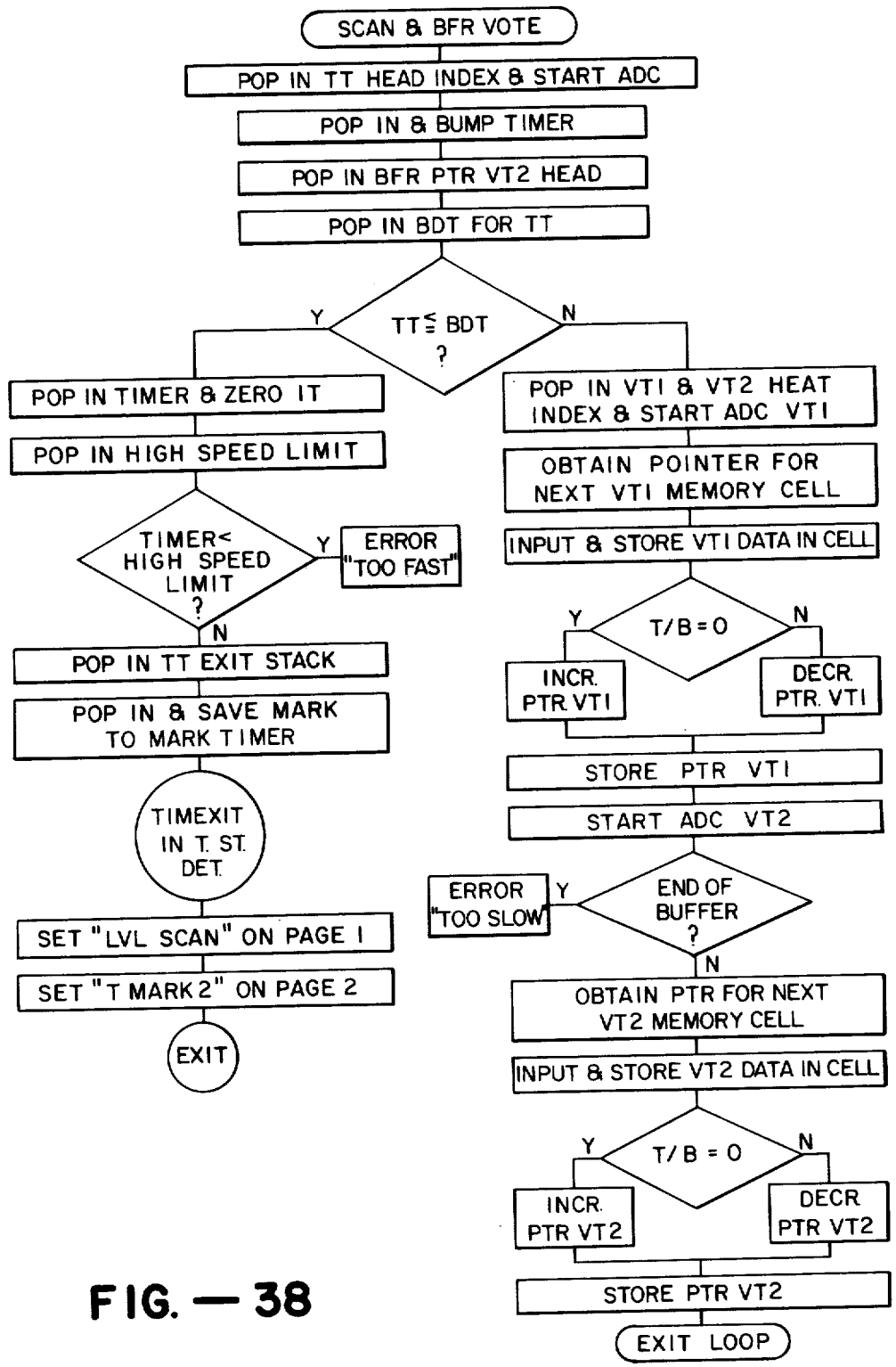
FIG.—38

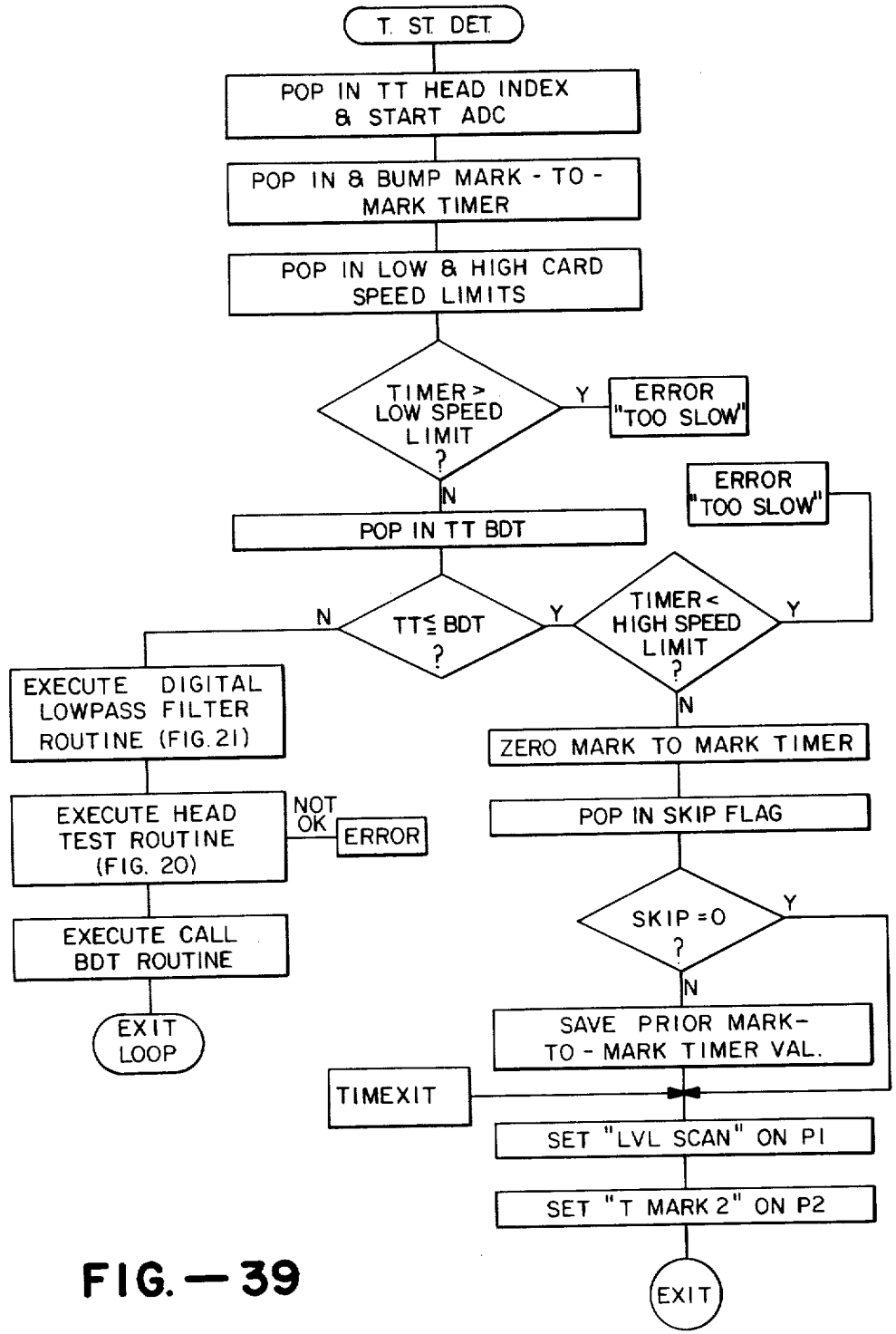
FIG.—39

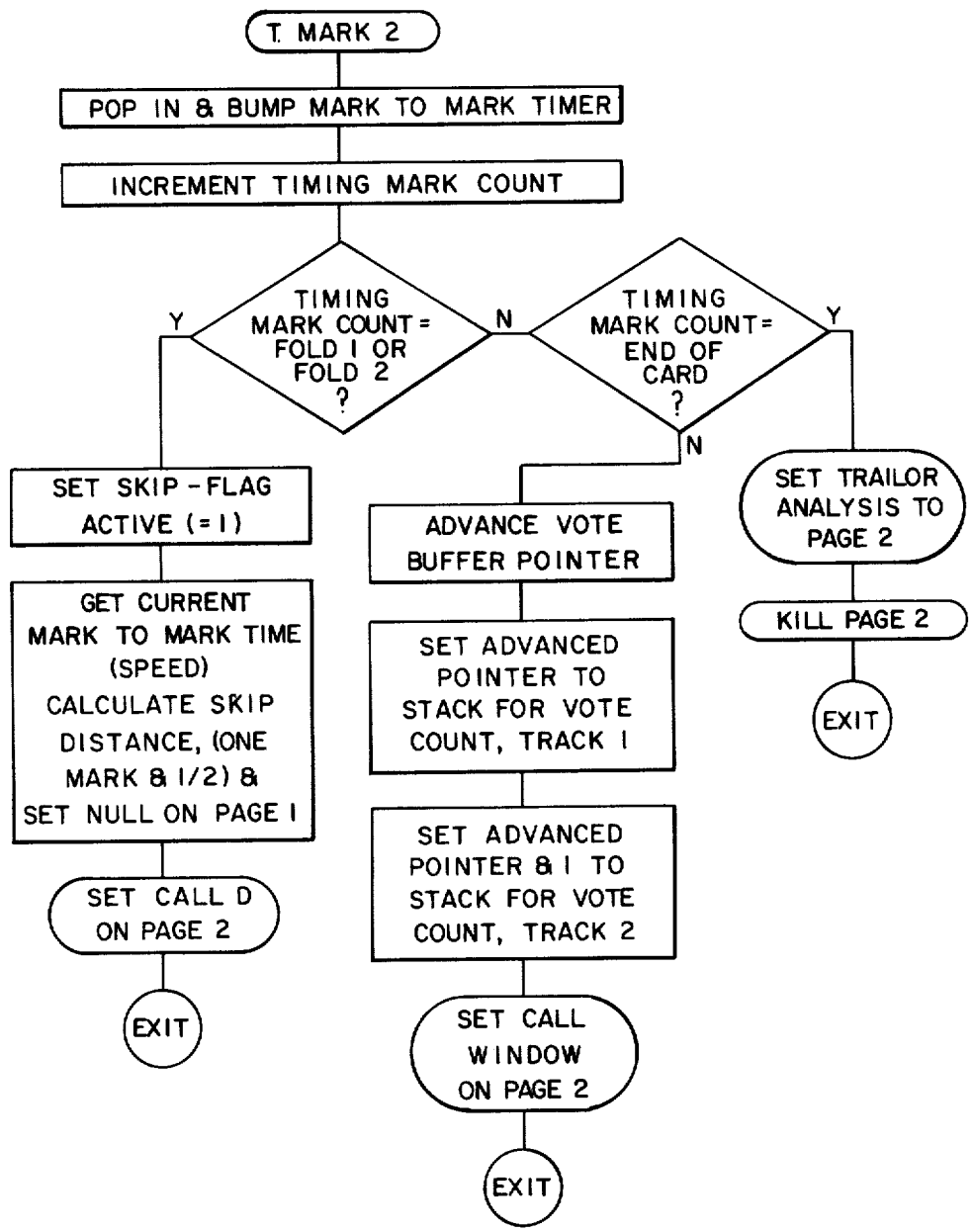
FIG. — 40

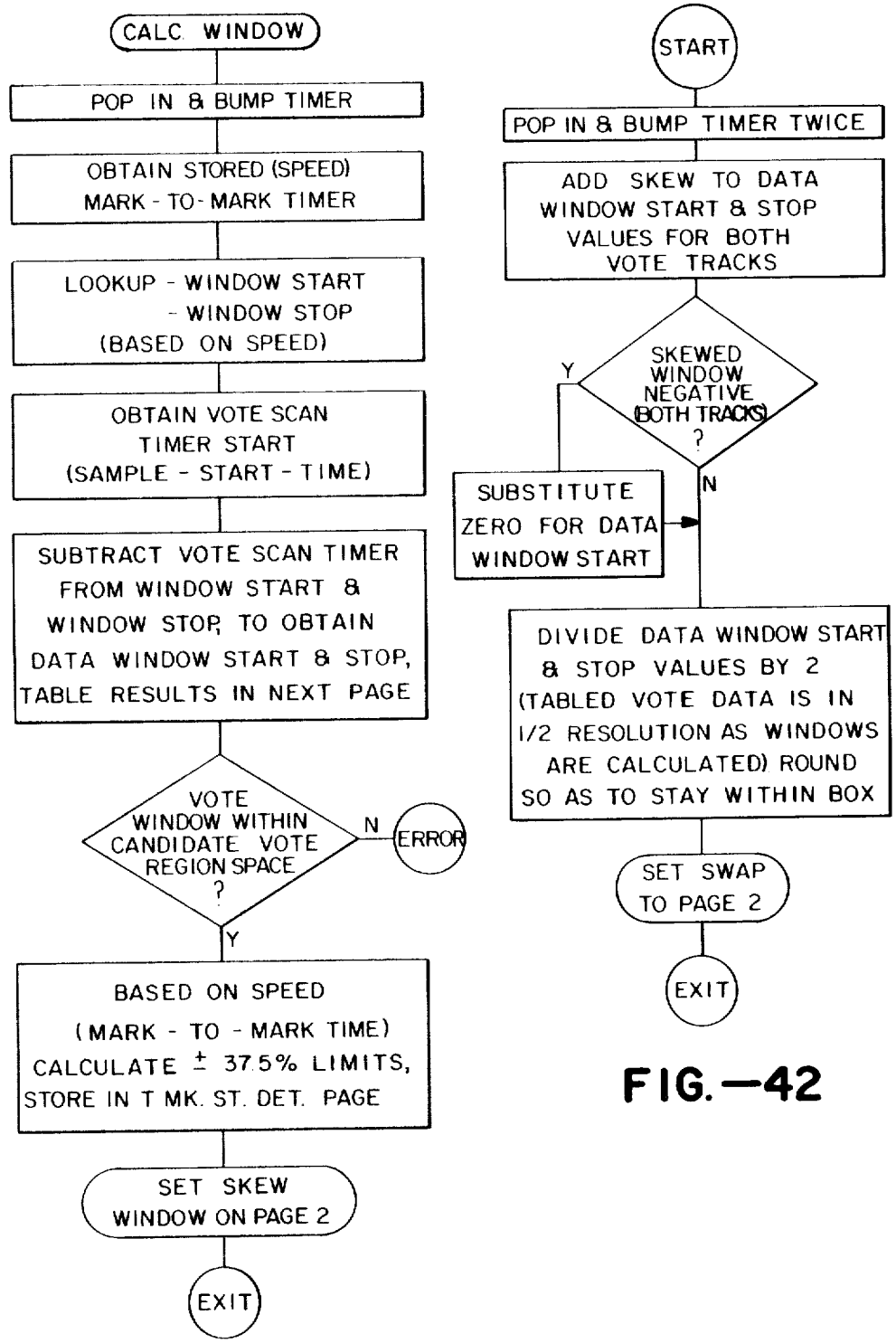
FIG.—41
FIG.—42

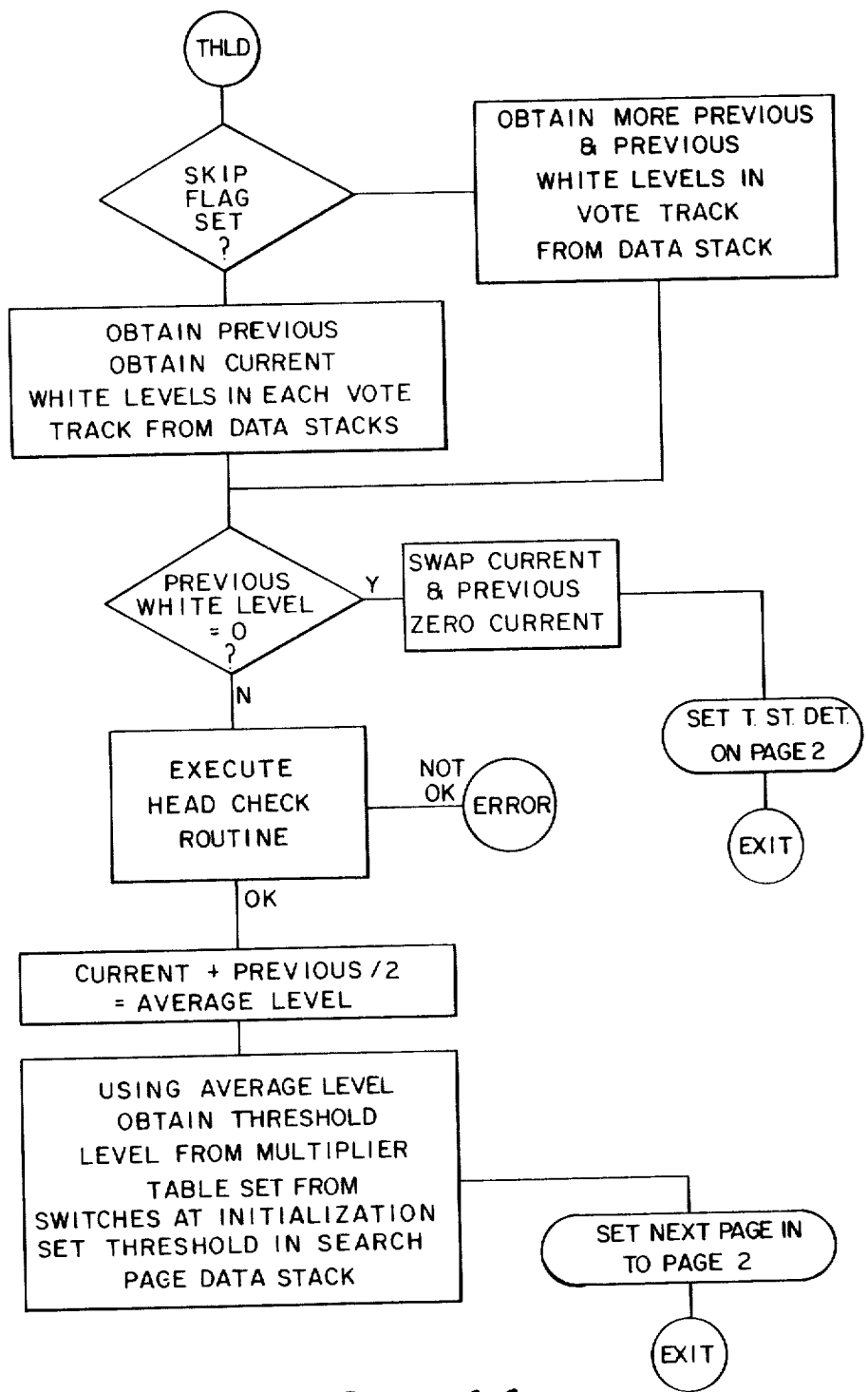
FIG. — 44

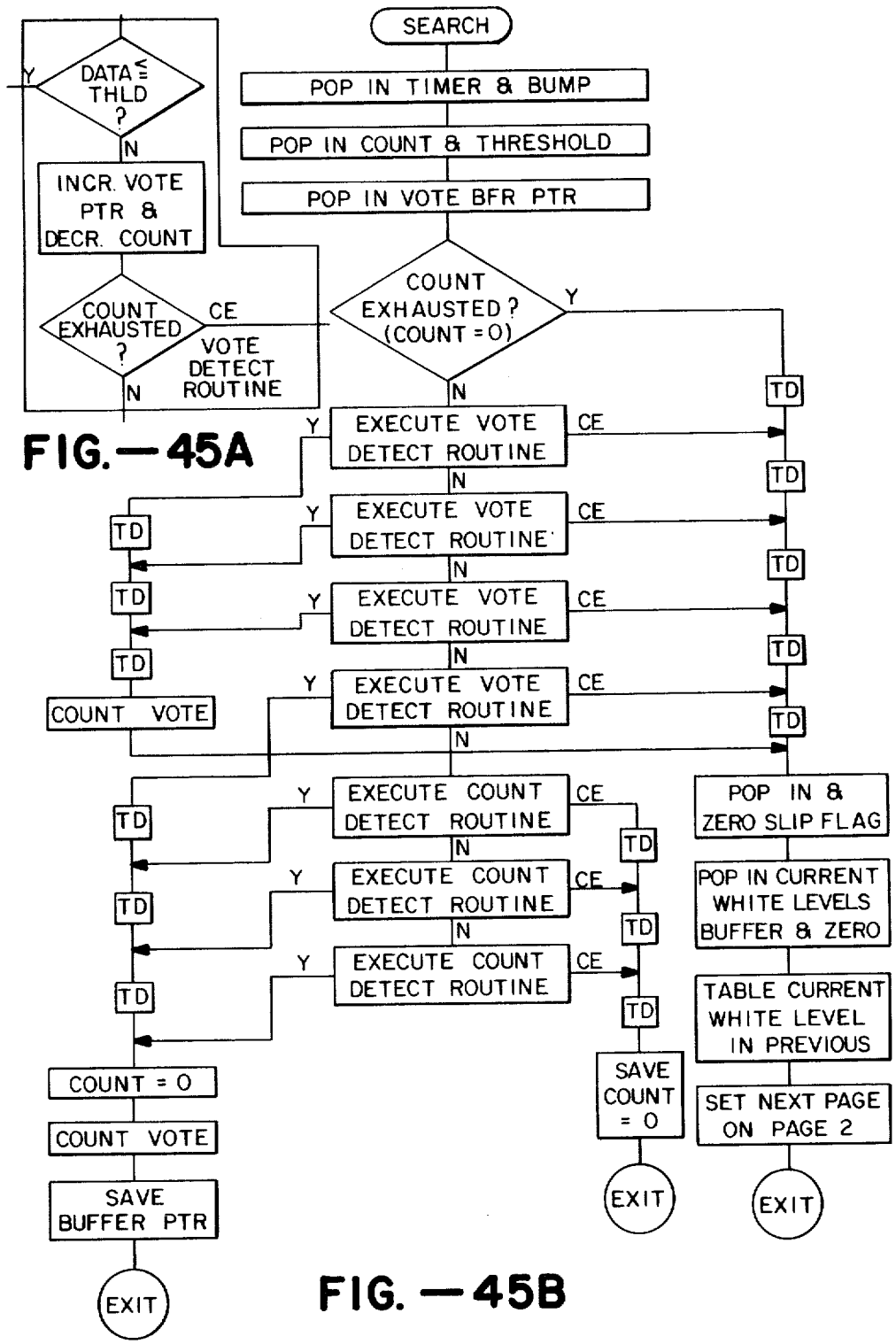
FIG.—45A
FIG.—45B

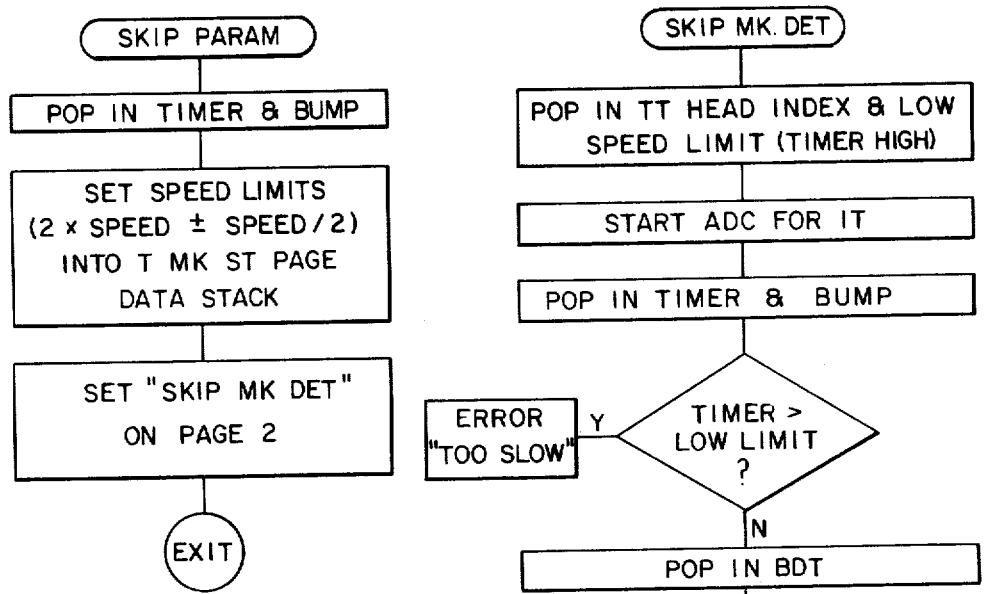
FIG.—46
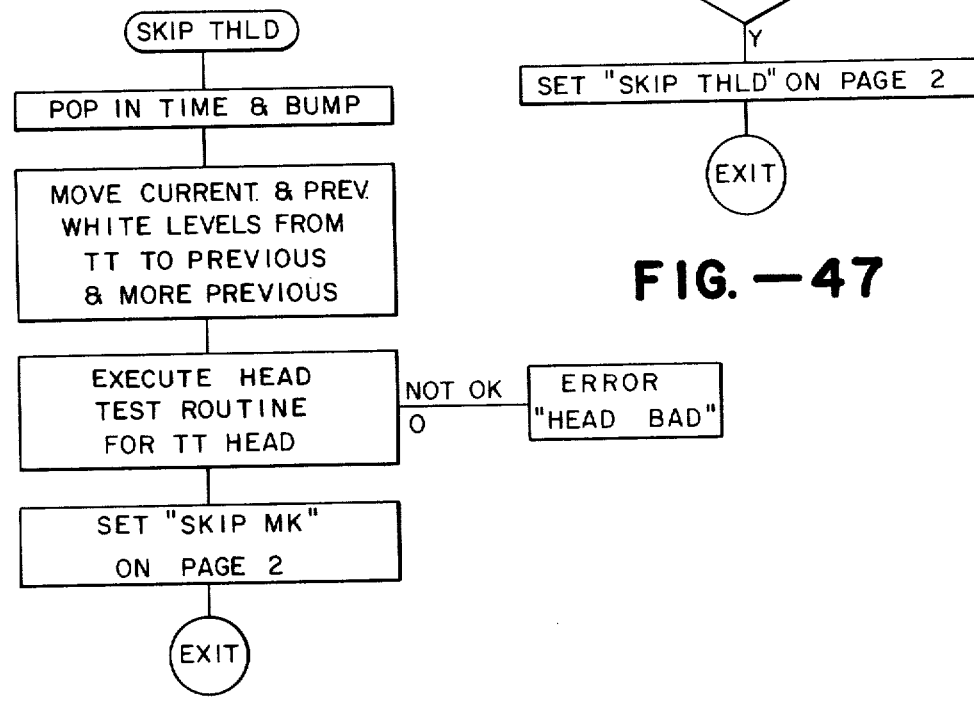
FIG.—47
FIG.—48

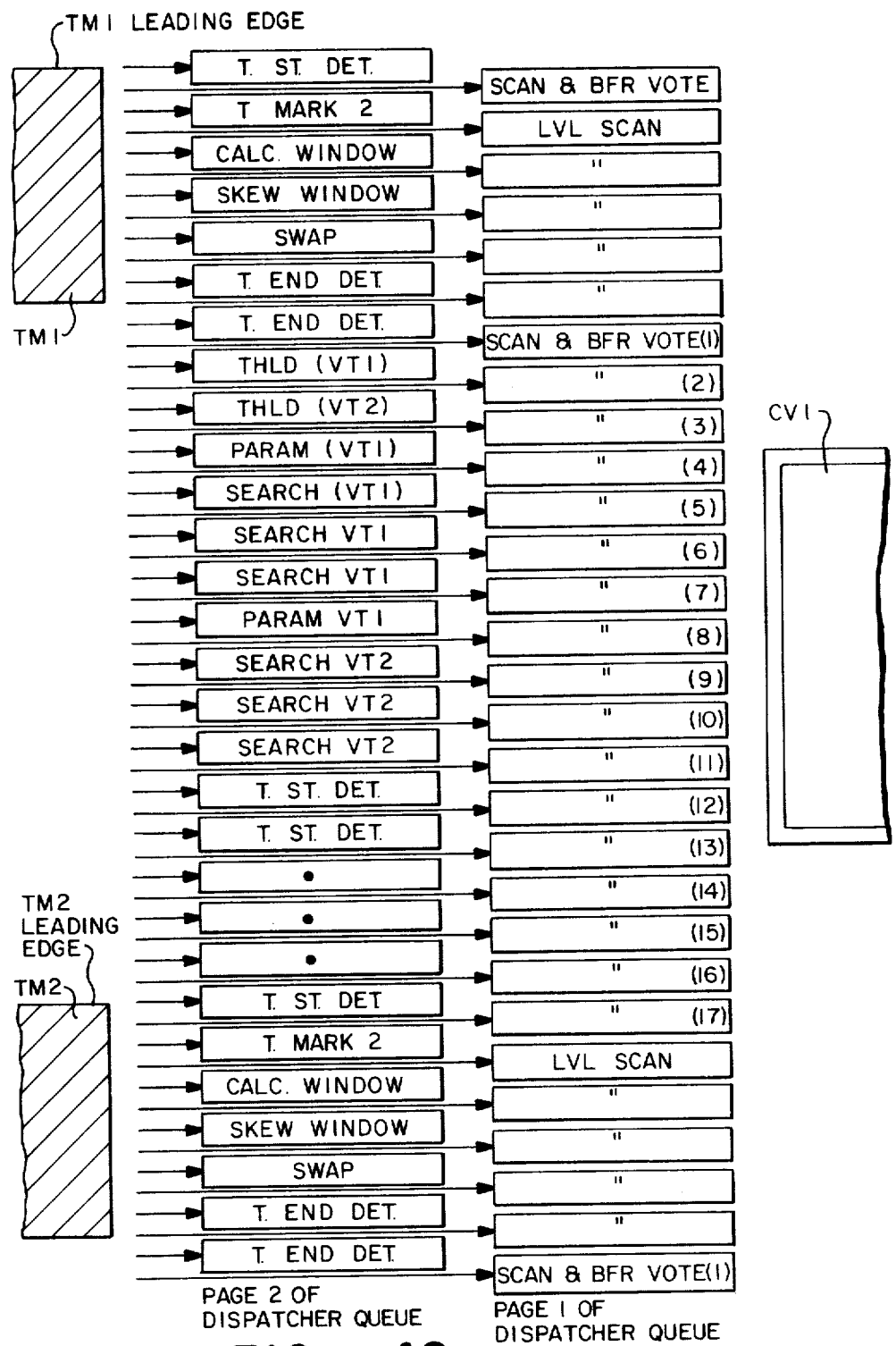
FIG. —49

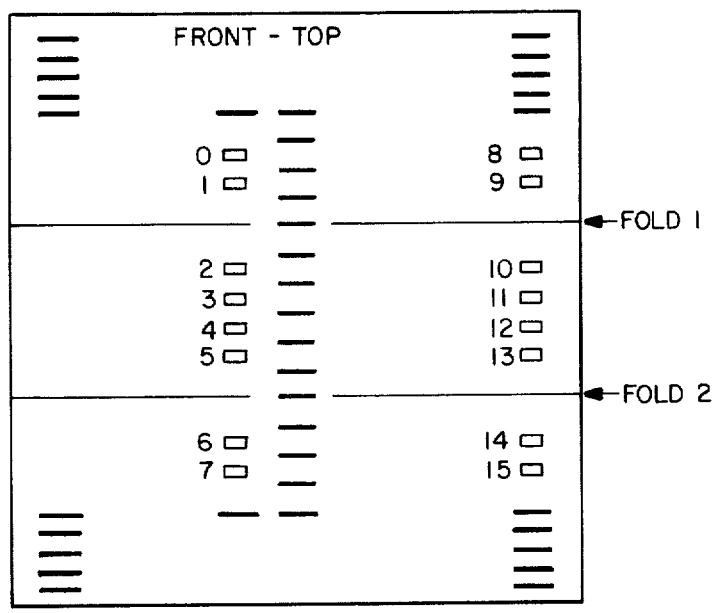
FIG.—54A
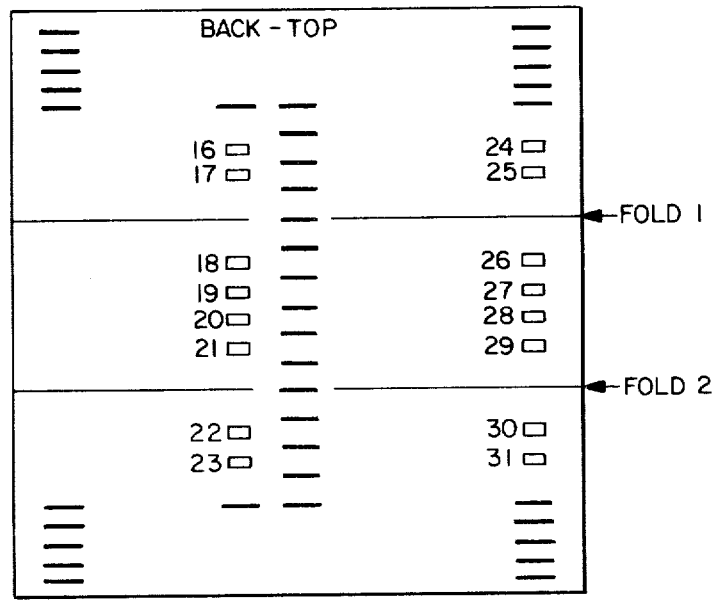
FIG.—54B

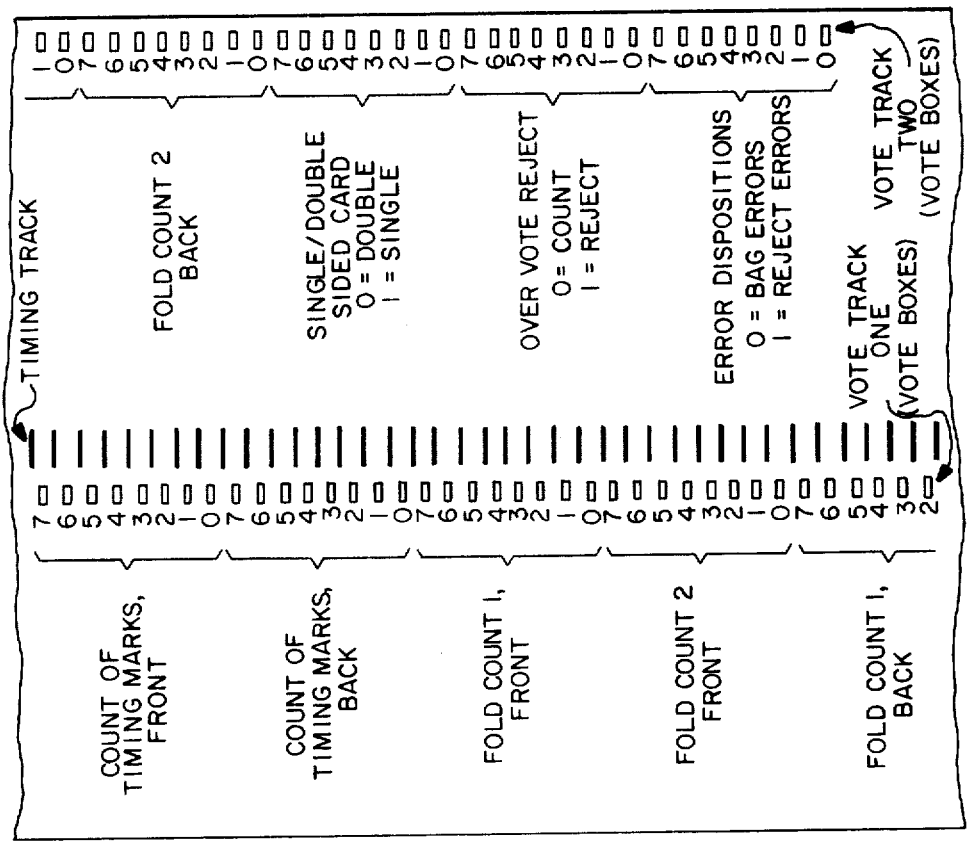
FIG.—56
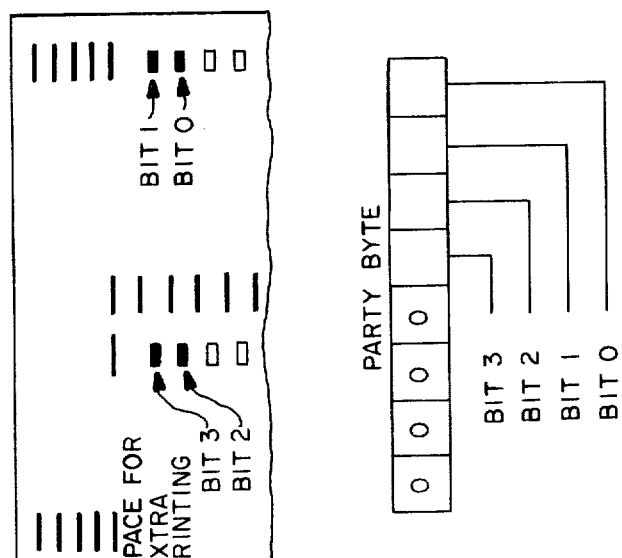
FIG.—55

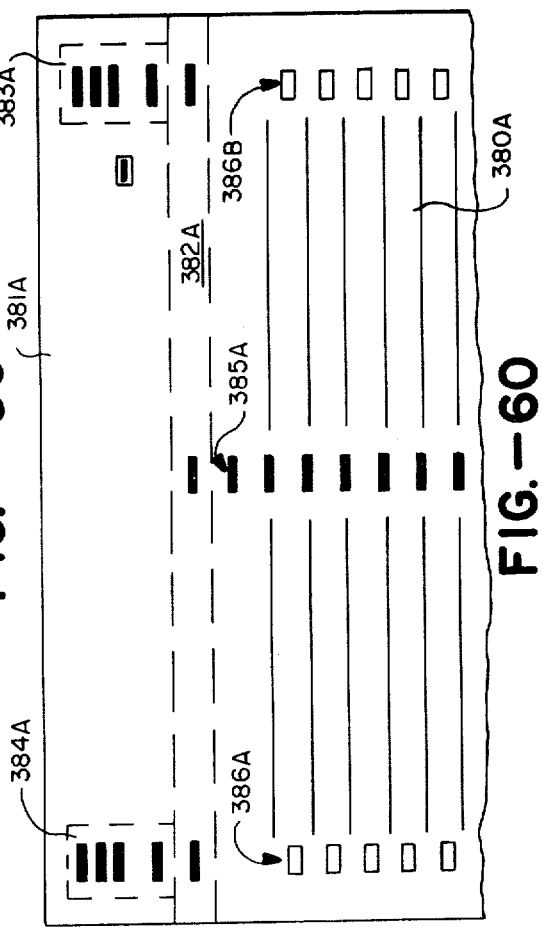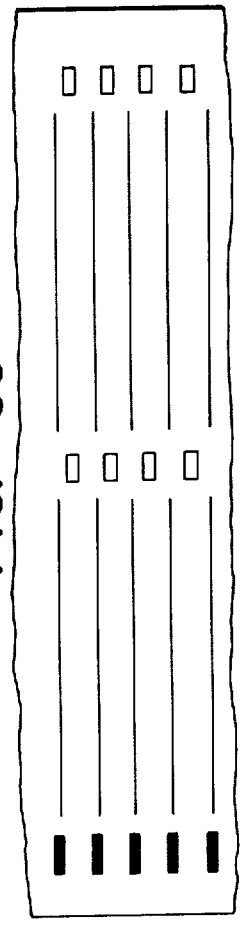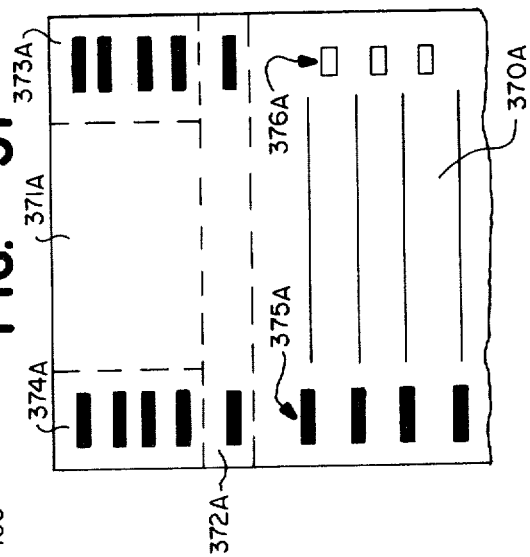
FIG.—57 FIG.—58 FIG.—59 FIG.—60 FIG.—61

SYSTEM AND METHOD FOR READING MARKS ON A DOCUMENT

This invention relates generally to systems and methods for reading marks on a document and, more particularly, to systems and methods for detecting vote marks on an election ballot card.

Systems for detecting marks on a document can be employed in a wide variety of applications. For example such document mark detecting systems can be used as data entry devices in inventory control systems, in automatic test scoring systems involving multiple choice answers and in automatic name on ballot card systems for use in political elections and the like. One of the prior art systems on the market is a name-on-ballot mark sensing system generally disclosed in the Narey et al. U.S. Pat. No. 4,021,780, issued May 3, 1977, and entitled BALLOT TALLYING SYSTEM INCLUDING A DIGITAL PROGRAMMABLE READ ONLY CONTROL MEMORY, A DIGITAL BALLOT IMAGE MEMORY AND A DIGITAL TOTALS MEMORY.

In a commercial system utilizing the technology generally described in the Narey et al patent, simultaneous sensing of manually placed pencil marks at candidate vote locations along a vote mark track is accomplished. The Narey et al. reader utilizes a ballot card having a vote track along one edge of the document and a vote position mark track for indicating active vote positions along the opposite edge of the card. Upper and lower read head stations are employed with reading heads utilized at each read head station, one for the vote track and one for the mark track. The outputs of the read heads are fed to signal comparator circuits for determining the presence of a mark in the mark track or the candidate mark region of the vote track itself.

The analog signal comparator or threshold circuit for the vote track is triggered to be active only during the time interval when the read head for the mark track is scanning a black region. The output of the analog signal comparator for the two read heads associated with the vote tracks are processed in logic circuits which form a special purpose hard-wired computer system which registers the detection of a pencil mark in a candidate vote region and process that information to check for a proper number of votes for each office as well as performing other information signal processing.

The Narey et al. system requires that the ballot card be inserted into the reader in a single standard orientation with the top of the ballot card entering the document transport system first and with side one of the card facing upward. This is required in order for the proper detection of the mark in the vote position mark track and the manually placed marks in the vote track. The circuitry coupled to the output of the read heads is dedicated to detecting marks on a particular track on the card. A sensor is provided along with some type of indication on the card, such as a missing corner section, to indicate that the ballot has been placed in the reader system in the proper orientation.

For accurate mark sensing, a document reading system in accordance with the Narey et al. patent requires that the individual read heads be accurately aligned for the two sides of the card and that the ballot card be conveyed past the read heads in a very accurately registered position. This requires expensive fixturing of the read heads and an expensive, high precision casting for the document track.

The ballot card size and other physical constraints of the Narey et al. system, along with the signal processing constraints, imposed by the use of expensive mechanical parts and discrete electronic circuits, substantially limits the number of elective offices and/or propositions which can be included on a single ballot card. Accordingly, elections having a large number of offices to be filed and numbers of issues or propositions to be voted on require the use of a plurality of ballot cards.

Accordingly, it is the principal object of this invention to provide an improved system and method for reading marks on a document.

It is a further object of this invention to provide an improved mark sense document reading system and method which can be implemented at low cost using relatively low tolerance mechanical parts.

It is a further object of this invention to provide an improved microprocessor based document mark sense reading system having widely expanded features over systems of the prior art.

It is a further object of this invention to provide a multiple dispatch computer programming system for real time data acquisition and processing involving multiple simultaneous events for use, among other things, for systems and methods for reading marks on a document.

It is the general object of this invention to provide a highly flexible, mark sense document reading system having high accuracy of mark detection by utilizing the information processing power of a microprocessor computer system to detect and effectively eliminate signal and information processing variables introduced by inherent mechanical tolerance limitations (which produce skews) and detection sensitively factors.

A system and method for detecting marks on a document in accordance with this invention includes a number of advanced features. In the system and method of this invention, the analog output signals of the various read heads scanning the document are converted into binary digital words on a sampled basis and background digital words are acquired from known blank locations on the document adjacent each potential clock mark or mark sense region. These background words are utilized to calculate a separate mark detect threshold word value for each of the possible mark regions on the document. This eliminates read head sensitivity variations from the mark detect function, including sensitivity variations inherent in the light producing and light sensing components of the read head, associated analog signal amplifying circuitry and analog to digital signal conversion circuitry as well as variations in the reflectivity of the card.

This invention also features an automatic skew detection and correction system and methodology which enables very accurate mark sensing even if substantial misalignment of the read heads or other contributing skew factors are present in the system. Virtually all contributing skew factors are detected utilizing skew indicator marks in the top and bottom header sections of the document. The detected skew is utilized to position a data analysis window for digital words acquired from candidate mark regions in the mark track so that the data analysis window will be substantially positioned in one-to-one correspondence with the actual topographic location of the candidate mark region on the ballot card.

This invention also features an automatic speed detection and correction approach utilizing a timing track having a regular sequence of timing marks with the leading edges of each timing mark defining a scan subinterval. The time length of each scan of subinterval is measured by the microprocessor data acquisition system and is utilized to control the size of the data analysis window associated with each candidate mark region. Digital data samples of illumination values from the candidate mark regions are acquired by the microprocessor system at a rate independent of document scanning speed. Accordingly, adjustment of data analysis window size also assists in producing a substantially one-to-one correspondence between the candidate digital words analyzed and the topographic location of the candidate mark region on the document itself.

This invention also features an multi-orientation processing system and methodology which permits the document to be inserted into the document transport means in any of the four possible orientations and still be read properly. Special digital orientation codes are provided on the document at symmetrical locations in the top and bottom header sections of the document. These unique orientation codes are decoded by the microprocessor based signal acquisition and data processing system to determine the entering orientation of the document and to thereafter configure the system for acquisition and processing of information from appropriate read heads, together with accurate storage of detected marks in prearranged memory locations. This enables an accurate image of the marks at candidate mark locations on the ballot to be captured in digital memory means within the microcomputer system. This is preferably done on a real time basis as the total card image is being acquired by the system. Alternatively the card image can be captured as is, and then information swapped to appropriate locations based on known card orientation.

In accordance with the system and method of this invention, a microprocessor computer control system utilizes its programmable input/output ports to maintain complete control over the sensing of the entry of the document, detection of that document's orientation and detection of any skew in the document or associated read head parameters and continuously checks on the integrity of the system to assure accurate, reliable mark sensing on the document. Error checking algorithms are provided throughout many of the real time programming page sequences employed in the firmware operating system to further assure the integrity of data acquisition and analysis.

The document mark sense system in accordance with this invention utilizes a real time programming technique which enables asynchronous data acquisition and processing simultaneously from both sides of a document having multiple tracks on each document side. A real time dispatcher program is provided in the system firmware. The dispatcher program code has upper and lower dispatch program queues associated with it for loading into the central processing unit, program page information for one of a plurality of different pages to be executed by the central processing unit for acquiring and processing digital word values from the upper and lower read head arrays during scanning of the document. The firmware program code switches program dispatch between the upper and lower dispatch program queues each time the dispatch program code is entered for execution. Each of the plurality of different program pages has substantially identical total code execution time so that the central processing unit spends equal time processing with respect to each side of the document and the processing is carried out in an asynchronous manner.

Because much of the real time data acquisition and analysis function carried out by the system requires execution of plural program page sequences with respect to information coming from each side of the document, the upper and lower dispatcher program queues each have first and second pages associated therewith, with program address and data stack pointers in the first and second queued page positions. Top and bottom dispatcher queue pointer positions are provided for holding first and second dispatcher queue pointers pointing to the first and second queued page positions.

The dispatcher program code further comprises instructions for exchanging the positions of the first and second dispatcher queue pointers on each switching by the code between the upper and lower dispatch program queues associated with processing of each side of the card and for thereafter loading into the central processing unit the program page address and data stack pointer, respectively, for the program page pointed to by the queue pointer in the top dispatcher queue pointer position of the active dispatcher program queue. Thereafter a dispatch of the central processing unit to execute the program page pointed to is accomplished.

Preselected groups of program pages are associated with the first and second dispatcher queue pointers in each of the upper and lower dispatcher program queues so that the pages execute in a prearranged interleaved order. This plural queue-plural page real time dispatcher concept with substantially equal program page execution time enables highly sophisticated, very tight real time programming for data acquisition and analysis to be implemented. As will be discussed in the detailed specification to follow this multiple queue, multiple page dispatch program arrangement also provides substantial flexibility for switching between single and multiple page dispatch and switching data stacks without switching program pages in situations where the same code execution is required for data acquisition and analysis with respect to separate but similar processing requirements.

FIG. 1 is an isometric view of a ballot counter scanning mechanism in accordance with this invention.

FIG. 2 is a sectioned elevational view of a ballot counter scanning mechanism in accordance with this invention.

FIG. 3 is a left side elevational view of a ballot counter scanning mechanism in accordance with this invention.

FIG. 4 is a bottom view of a read head taken along the lines 4—4 in FIG. 2.

FIG. 5 is a fragmentary section view of an individual read head employed in the ballot counter scanning mechanism of this invention.

FIG. 6 is a block schematic diagram of a microprocessor-based control signal and data acquisition and processing system for a document mark sensing system in accordance with this invention.

FIGS. 12A-12C illustrate variations of the operation of the dispatcher program concept shown in FIGS. 8-11.

FIGS. 13A and 13B illustrate a multipage dispatcher queue in accordance with this invention.

FIG. 14 illustrates a multilevel dispatcher, multiqueued page, real time programming concept in accordance with this invention.

FIG. 15 is a fragmentary diagram of the election code and orientation code on a ballot card, useful in explaining the operation of one feature of this invention.

FIG. 16 is a program page sequence timing diagram illustrating the operation of this system during scanning of the orientation and election codes shown in FIG. 15.

FIGS. 17-29 are software flow charts of various program pages utilized in the firmware operating system of a mark sense ballot counter system in accordance with this invention.

FIG. 30 is a schematic diagram useful in explaining the sequence of program pages executing during the scanning of a skew detect pattern on a ballot in accordance with this invention.

FIGS. 31-48 (FIGS. 34 and 45 consist of FIGS. 34A and 34B, and 45A and 45B, respectively) are software flow charts for various program pages of the firmware operating system for a mark sense ballot counter system in accordance with this invention.

FIG. 49 is a schematic diagram illustrating a typical page execution sequence for scanning a portion of the ballot card in a mark sense ballot counter system in accordance with this invention.

Figure 50A:
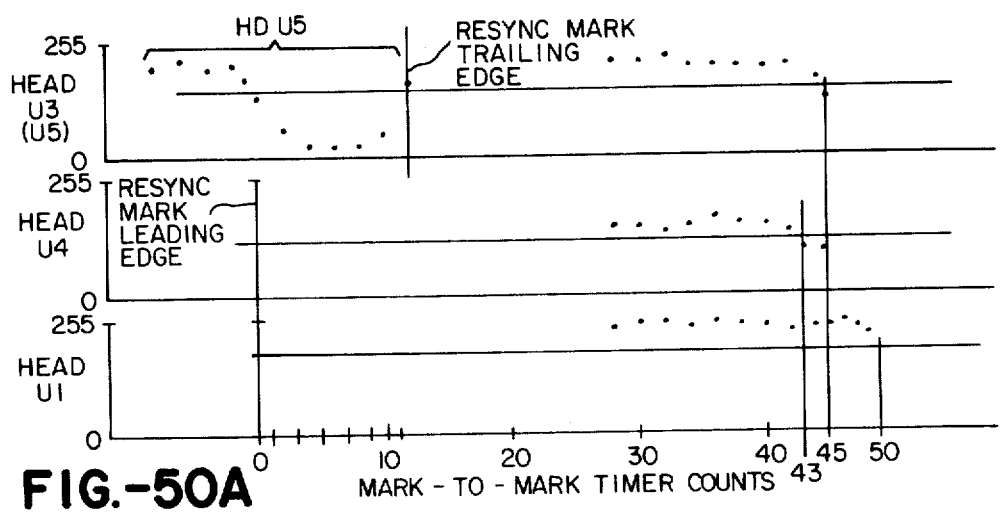
Figure 50B:
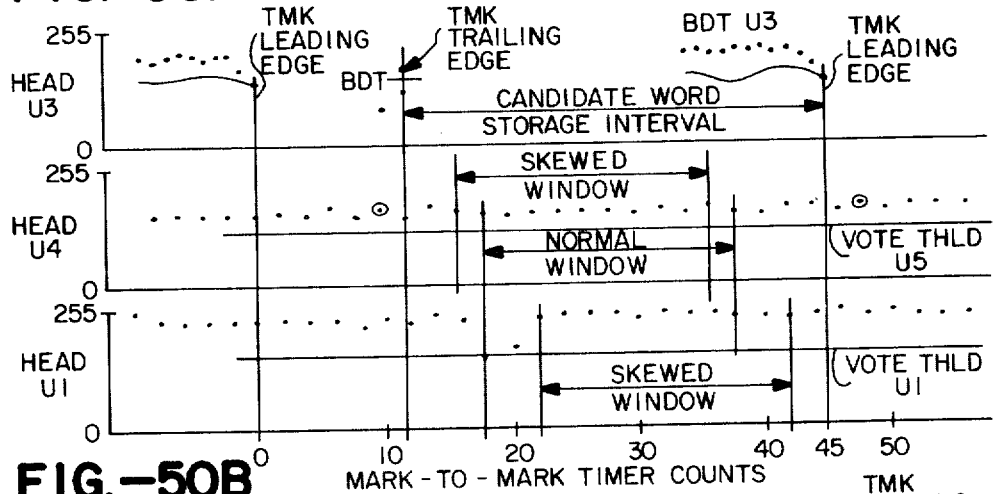
Figure 50C:
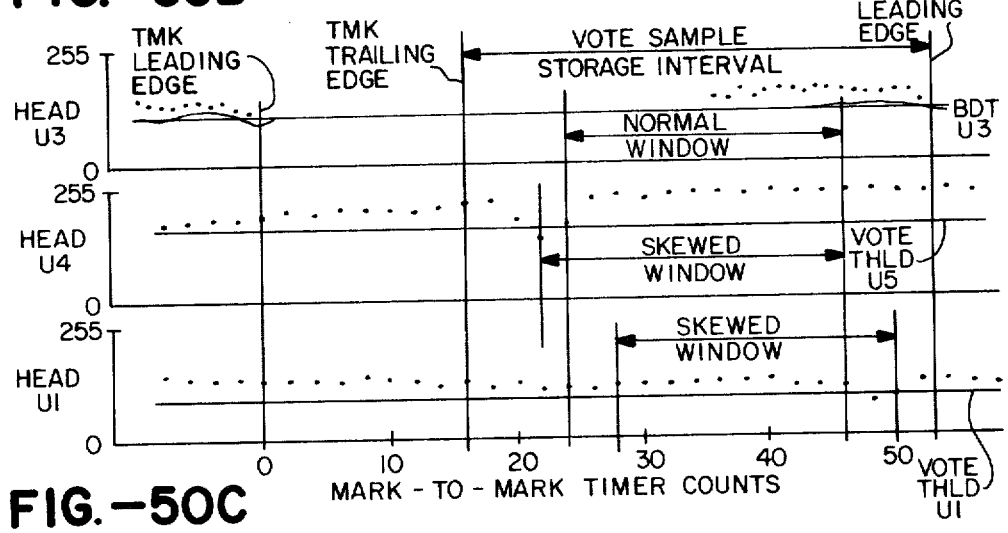

FIG. 50A-50C are digital head output versus mark-to-mark timer count graphs illustrating the operation of various features of the mark sense ballot counter system in accordance with this invention.

Figure 51:
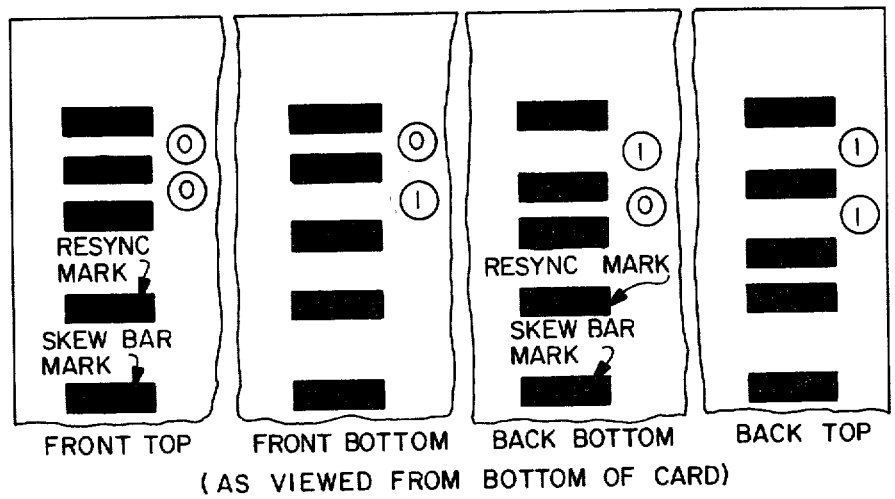

FIG. 51 illustrates the card orientation code on a preferred ballot arrangement for a mark sense ballot counter system in accordance with this invention.

FIGS. 52-56 are schematic illustrations of various data and ballot card formats useful in explaining the operation of various features of a mark sense ballot counter system in accordance with this invention.

FIGS. 57 and 58 are partial schematic views of alternative embodiments of a read head and ballot card for a mark sense ballot counter system in accordance with this invention.

FIGS. 59-61 are illustrations of other alternative embodiments of a read head and ballot card for use in a mark sense ballot counter system in accordance with this invention.

For purposes of disclosing a specific embodiment of the general mark sense document reading system and method of this invention, a system for sensing manually-made pencil marks on an election ballot card will be discussed. However, it will be appreciated that the general concepts of this invention are equally applicable to other types of mark sense reading systems involving a wide variety of documents and approaches to providing the marks on such documents.

The Card Scanner Mechanism

FIGS. 1-5 depict the mechanical and electromechanical components of a mark sense ballot counting scanning mechanism 10 in accordance with this invention. At the front of the scanning mechanism 10 are a card entry chute 20 and a card exit chute 25. Card entry chute 20 includes a card entry slit 21 and a card exit slit 22. The card exit slit 22 communicates with an upper card guide path defined between the upper track assembly 30 and middle track assembly 35. Card exit chute 25 includes a card entry slit 27 and a card exit slit 26. The card entry slit 27 is in communication with the lower card path defined between the middle track assembly 35 and the lower track assembly 40.

The upper track assembly 30 includes a pair of side rails 31, 32 and front card guide bracket 33 and a rear card guide bracket 34. The middle track assembly 35 includes side rails 36 and 37 to which are mounted a pair of upper card guide brackets 38A and 38B and three lower card guide brackets 39A, 39B and 39C. The upper card path is thus defined between the opposing card guide surfaces 33 and 38A in front of the upper and lower read head assemblies 103 and 104, shown best in FIG. 2, and the card guides 34 and 38B behind the read head assemblies 103 and 104.

The lower track assembly 40 includes side rails 41 and 42 having mounted thereto card guides 43A, 43B and 43C. The lower card path thus has a first card path section defined between the card guides 39A and 43A, a second lower card path section defined between the card guides 39B and 43B, and a third lower card section defined between the card guides 39C and 43C. The middle track assembly 35 also includes a turnaround card guide 38C which communicates with the rear portions of the upper and lower card paths.

The card transport mechanism includes an electric motor 50A (FIG. 2) mounted internal to the middle track assembly and an arrangement of drive belts and pulleys together with an arrangement of separate power driven friction rollers and idler rollers which maintain positive traction on the card during its total traverse of the upper and lower card paths. Positive drive of the card through one of the external or internal chutes is provided and will be discussed below. The electric motor 50A rotates a pulley 50 on shaft 51. That rotation is transmitted through belt 52 to a pair of pulleys 53 and 53A mounted on a common shaft and through a belt 54 to a pulley 55 mounted on a shaft 56. On the opposite side of shaft 56, a second pulley 57 of the same size and a belt 58 transmit the rotation to a pair of pulleys 59 and 59A mounted on shaft 60. A belt 61 mounted on pulley 59A transmits the rotation to a pulley 62 mounted on shaft 63. A gear 64 is mounted on the opposite end of shaft 63 as shown in FIG. 1 and transmits power to a smaller gear 65 mounted on shaft 66. The other side of shaft 66 shown in FIG. 3 has a pulley 67 thereon. The belt 68 transmits the power from pulley 67 to a pair of pulleys 69 and 69A mounted on shaft 70. Another belt 71 transmits power to a pulley 73 mounted on shaft 72.

Three sets of driven friction rollers, 75, 80 and 85 are respectively mounted on the shafts 56, 60 and 63. As shown in FIG. 2, two sets of idler rollers 76, 77, are mounted to the side guide rails of the upper and lower track assemblies respectively in card driving relation with the driven friction rollers 75. Similar idler wheel arrangements 81 and 82 are provided in connection with the friction rollers 80 and idler rollers 86 and 87 in connection with the friction rollers 85.

The base 45 on which the upper, lower and middle track assemblies are mounted has first and second card exit slits 46 and 47 provided therein. Immediately adjacent these exit slits are separate friction rollers 70A and 72A mounted on shafts 70 and 72. Each of these friction rollers has associated idler rollers 70B and 72B which cooperate with the friction rollers to drive a card diverted toward the respective exit chutes 46 and 47 into separate bins 121 or 123 through entry chutes 122 and 124, respectively, in a base pedestal arrangement 120.

The minimum card length for maintaining positive card traction throughout the entire card path is a length slightly greater than the distance between the respective friction rollers. The maximum card length is equal to the card path distance between the read head arrays and the first diverter station 94 less a predetermined length to allow time required for decision making by the microprocessor electronics associated with the mechanism and the time required for operating the first diverter station to divert the card into the first card collection region 121 of the base and pedestal arrangement. It should be appreciated, however, that shorter card lengths could be provided for by decreasing the spacing between friction rollers or by adding additional frictional rollers. The total length of the card path and thus the total permitted card length may be varied by simply changing the dimensions of the upper and lower card paths.

Each of the diverter stations 90 and 95 involves essentially the same components so only one need be described. The diverter station 90 includes a solenoid 91 coupled to an actuator lever 92 with a tension spring return 93 provided to return the actuator 92 to its unactuated position. Within the lower track assembly 40 the upper diverter guide 90A is mounted on shaft 90B so it can be moved between a divert position shown in FIG. 2 and a non-divert position corresponding to the position of the diverter guide 95A. The stationary diverter guide section 94B cooperates with the movable diverter guide section 90A to guide a diverted card through the card slot 47 into the card bin 121.

As shown in FIGS. 1 and 3, the rear portion of the side guides 31 and 32 of the upper track assembly 30 are mounted to a vertical bracket 100 so as to pivot around the shaft 101. This permits the upper track assembly 30 to pivot with respect to the middle track assembly 35 when the latching bar arrangement 105 is released. This provides access to the upper card path in the event that a card gets stuck in the scanner mechanism. Similarly, a bracket 102 mounts the rear end of the middle track assembly 35 to the lower track assembly 40. A shaft (not shown) provides for pivotal movement of the middle track assembly with respect to the lower track assembly 40 to provide access to the lower card path to remove a jammed card.

The upper read head assembly 103 is mounted to the upper track assembly 30 utilizing a shaft 103B and a pivot bar 103A which provides a floating mounting arrangement for the upper head assembly 103. In other words, the upper head assembly 103 floats on top of a card or the lower read head assembly 104. Folds in a long card may be permitted to push the upper head assembly away from the lower head assembly. The weight of the upper head assembly 103 generally maintains the lower surface thereof in contact with a card passing between the upper and lower read head assemblies so that accurate sensing is provided for clock marks and manually placed pencil marks on the card.

As shown in FIG. 4, five separate read heads designated U1 through U5 are provided in the upper read head assembly 103 in this embodiment. FIG. 5 illustrates that the individual read heads include a light exit and entrance window U1A communicating with separate optical fibers U1B and U1C leading to a light producing means U1D, which may be a light emitting diode, and a light sensing means U1E, which may be a phototransistor. Typical convenient dimensions of the read head windows U1A will be discussed below in connection with typical card feature dimensions.

In addition to the plural opto-electronic read heads in the read head assemblies 103 and 104, other opto-electronic card sensing means are provided at various locations along the card path for sensing the presence of a card at such locations. A pair of opto-electronic sensors 110 and 115 are provided at the edges of the side rails 31 and 32 of the upper track assembly immediately behind the card entry chute 20. The opto-electronic sensor 110 includes a light emitting diode 111 and a phototransistor 112 and similar components are provided in the opto-electronic sensor 115. These two sensors are utilized to detect card entry and to signal that a card of appropriate width has been inserted.

Another opto-electronic sensor 116 is provided adjacent the card exit chute 25 and separate opto-electronic sensors 117 and 118 are provided adjacent the diverter stations 94 and 95 to sense the presence of a card at these locations. These opto-electronic sensors enable the microprocessor control system to check on the presence of a ballot card at the appropriate critical locations along the card path both to determine what appropriate actions are required during card reading and to determine whether appropriate commands to the diverter stations have been executed after card reading has been completed.

As shown in FIGS. 2 and 3, the ballot card transport sensing arrangement 10 is contained within a housing and pedestal arrangement 120 with the base 45 resting on a corresponding base support 127. A front cover panel 125, a top cover panel 126 and a back cover panel 128 complete a housing for the card scanner assembly 10. The front panel 125 may contain different colored light emitting diode status lights or an alphanumeric LED or liquid crystal display to display the status of the operation of the ballot counting mechanism. The cover panel 126 is preferable readily removed to permit unjamming of a card in the card path of the mechanism.

The card guides defining the upper and lower card paths are preferably constructed from sheet metal and fastened to respective side rails utilizing appropriate sheet metal screws or similar fasting arrangements. The upper and lower read head assemblies 103 and 104 need not be accurately fixtured during assembly or mounting due to the skew correction feature which will be discussed below. The skew correction feature also corrects out of the ballot card reading process any skew contributed by skew of the document in the card path and any skew of the individual read heads with respect to each other. In this manner, the overall card transport and sensing assembly 10 can be constructed from low cost sheet metal components and can easily and inexpensively be assembled without requiring expensive jigging and fixturing of the various mechanical parts.

Electronic (Microprocessor) Control and Data Acquisition and Processing

FIG. 6 is a system block diagram of the major electronic components of the ballot counting system. The components outside the dashed region 145 comprise a relatively standard microcomputer system utilizing the Intel 8085 microprocessor chip set along with standard EPROM firmware memory and the standard random access memory (RAM) chip. Components within the dashed rectangle 145 represent output command interfacing to various components of the ballot counter system and data acquisition arrangements for the microcomputer system. These components are specifics to the document mark sensing system and methodology of this invention along with the specific of methodology involved in the firmware for operating the microcomputer system 140 to acquire and process data and issue control commands in accordance with the principles of this invention.

The system and methodology of the mark sense document reading concepts of this invention are not limited to the use of any particular microcomputer or computer system. A prototype of the invention has been constructed utilizing an Intel 8085 microprocessor as the microprocessor (central processing) unit 150. A quartz oscillator clock arrangement 151 controls the operating frequency of the microprocessor 150. Output bus 152 from microprocessor 150 contains eight bits of a total sixteen bit memory address which is communicated through tri-state buffers 160 onto address bus 161. The other eight bits of the memory address are communicated from the microprocessor 150 over output bus 153 to D-type latches 165 and the eight bit output of the D-type latches 166 forms the second segment of the sixteen bit address on the address bus 161. The control line 156 from microprocessor 150 is utilized to load the eight bit address into the D-type latches 165 off of the dual address-data bus 153.

The dual address-data bus 153 is also utilized to input and output data from the microprocessor 150 through bus transceiver 170, at the output of which is bi-directional data bus 171. Control line 154 signals bus transceiver 170 the direction of data transfer to occur, i.e. transfer from or to the microprocessor 150. Output control signals from microprocessor 150 are coupled over bus 155 to tri-state buffers 175 and the outputs of tri-state buffers 175 are placed on control signal bus 176. The clock output 156 of microprocessor 150 is coupled to synchronous counter 180 and the output bus 181 from synchronous counter 180 is utilized to drive analog to digital conversion circuitry 225 and alphanumeric printer 260.

The basic control program for operating the microprocessor system 140 is stored in firmware memory 185 which may comprise a read only memory or an erasable programmable read only memory (EPROM). Program instructions in firmware memory 185 are addressed by the address bus 188 with read of the firmware memory 185 under control of control signals on input 187 from control bus 176. The program instruction output from firmware memory 185 is placed on output lines 186 communicating with system data bus 171.

Scratch pad memory 190 comprises a random access semiconductor memory, preferably a fast dynamic RAM memory for high speed data write and read operations. Scratch pad memory is addressed by input lines 193 communicating with address bus 161, with read and write controlled by control signals from control bus 176 over inputs 192. Bi-directional data lines 191 associated with scratch pad memory 190 are in communication with the system data bus 171.

A program and totals 200 memory containing election specific program information and permanent vote count storage in non-volatile memory. A separate bus transceiver 195 is interposed between the system data bus and the input/output bi-directional data lines 202 associated with the ROM and RAM portions of the program and totals memory 200. The memory 200 is addressed by input address lines 203 coupled to system address bus 161 and control of read and write operations is provided by control input lines 201 coupled to the system control line bus 176.

The microcomputer system further includes programmable input/output ports 210 a programmable display interface 240 and a data communication interface 250. The programmable input/output ports 210 communicate with the microprocessor system over a bi-directional data bus 211 coupled to the system data bus 171. The active ports are addressed by way of an address bus input 212 coupled to the system address bus 161 and control of the direction and other functions of the programmable input/output ports as provided by control signals over an input control line bus 213 coupled to the system control bus 176 and by other demultiplexed control, address and bus signals from demultiplexer 205. Control signal buses 216 and 217 comprise output command control buses leading from an output port of the programmable input/output port arrangement 210. The data lines 215 comprise a bi-directional data bus communicating with the tri-state buffers 230 and the alphanumeric printer 260. Bi-directional control signals are provided on the control bus 214 communicating with one of the input/output ports. These control signals lines are coupled to the alphanumeric printer 260 and to one of the opto-electronic sensors in the reading mechanism to provide the LED boost function which will be discussed below.

The programmable keyboard and display interface 240 coupled to alphanumeric display 245 and keyboard 246, and the data communication interface 250 are of a standard configuration and are not directly and importantly involved in the system and methodology concepts of this invention.

One of the programmable I/O ports 216 provides control signals to front panel lights 260 which may be placed on the front panel 125 of the scanning mechanism. The control signal output bus 217 provides control signals to the driver motor 50A, the locking pin solenoid 119, card diverters 90 and 95, tri-state buffers 230 and the multiplexing circuitry 220. The outputs of the read head arrays 103 and 104 are placed on analog signal bus 221 input into multiplexer 220 as are the outputs of the opto-electronic sensors 110 and 115–118 via signal bus 222. The control signals on control bus 217 thus control which of the input analog signals from the upper and lower read head assemblies or the opto-electronic sensors are placed on the single analog signal output line 224 of multiplexer 220 and thus coupled into the analog to digital conversion circuitry 225.

The analog-to-digital conversion circuitry 225 may be a successive approximation type of analog-to-digital conversion arrangement with the successive approximation function clocked by clocking signals on input bus 226 coupled to synchronous counter 181. The output bus 227 of the analog-to-digital conversion circuit 225 is a digital word representing the magnitude of the input analog signal on input line 224. This output data word on bus 227 is buffered in tri-state buffers 230 and communicated under a command control signal via line 231 to the bi-directional bus 215. In this manner the computer system 140 acquires data from the read heads and the opto-electronic sensors in the form of digital words representing the magnitudes of sampled analog signals. The microprocessor controls the particular analog signal to be digitized and acquires the digitized data for analysis. All of this input/output control and data acquisition occurs in accordance with sequences programmed into the program control system in firmware memory 185.

Figure 7A:
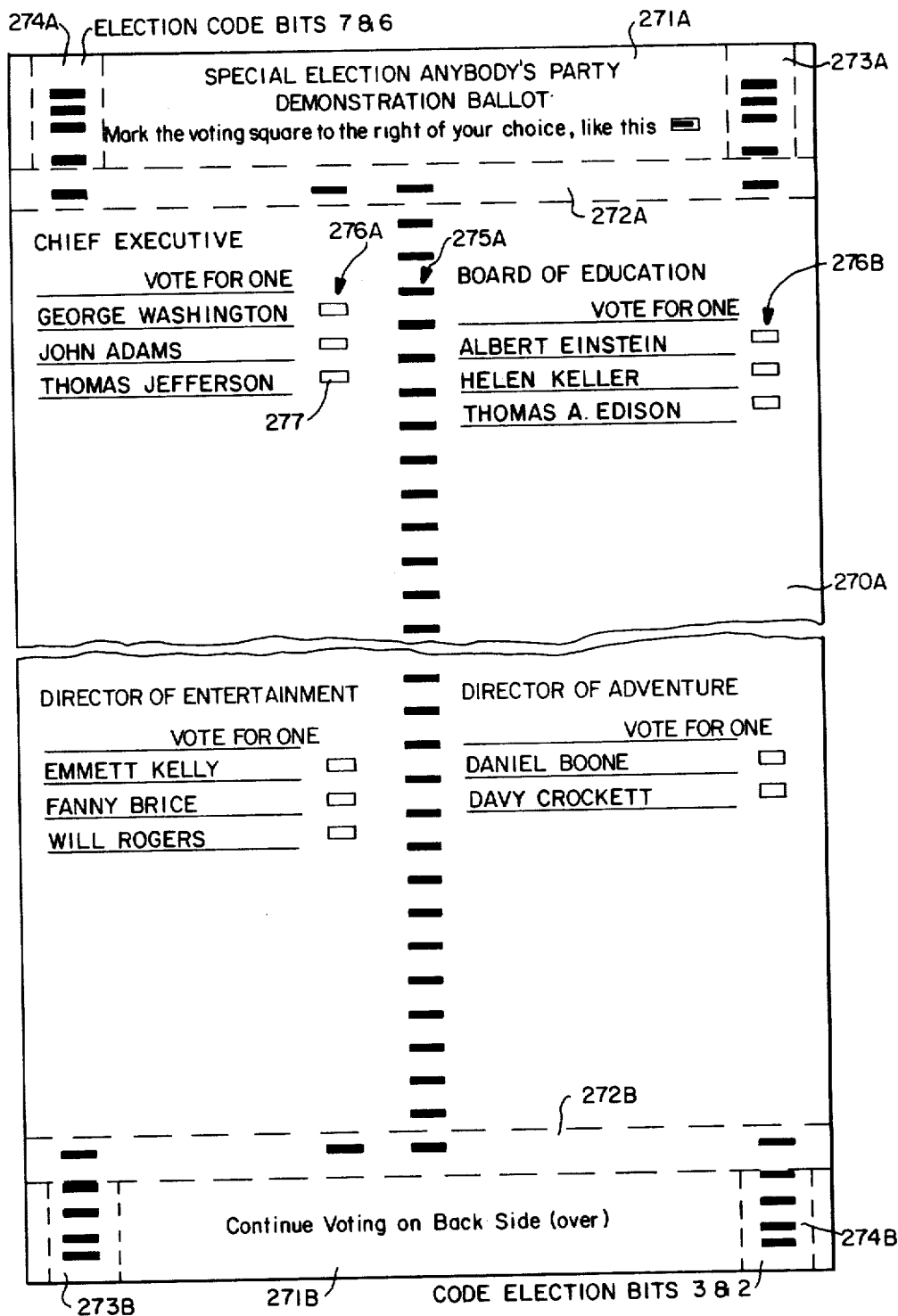
FIGS. 7A and 7B depict preferred ballot cards for a mark sense ballot counter system in accordance with this invention.
Figure 7B:
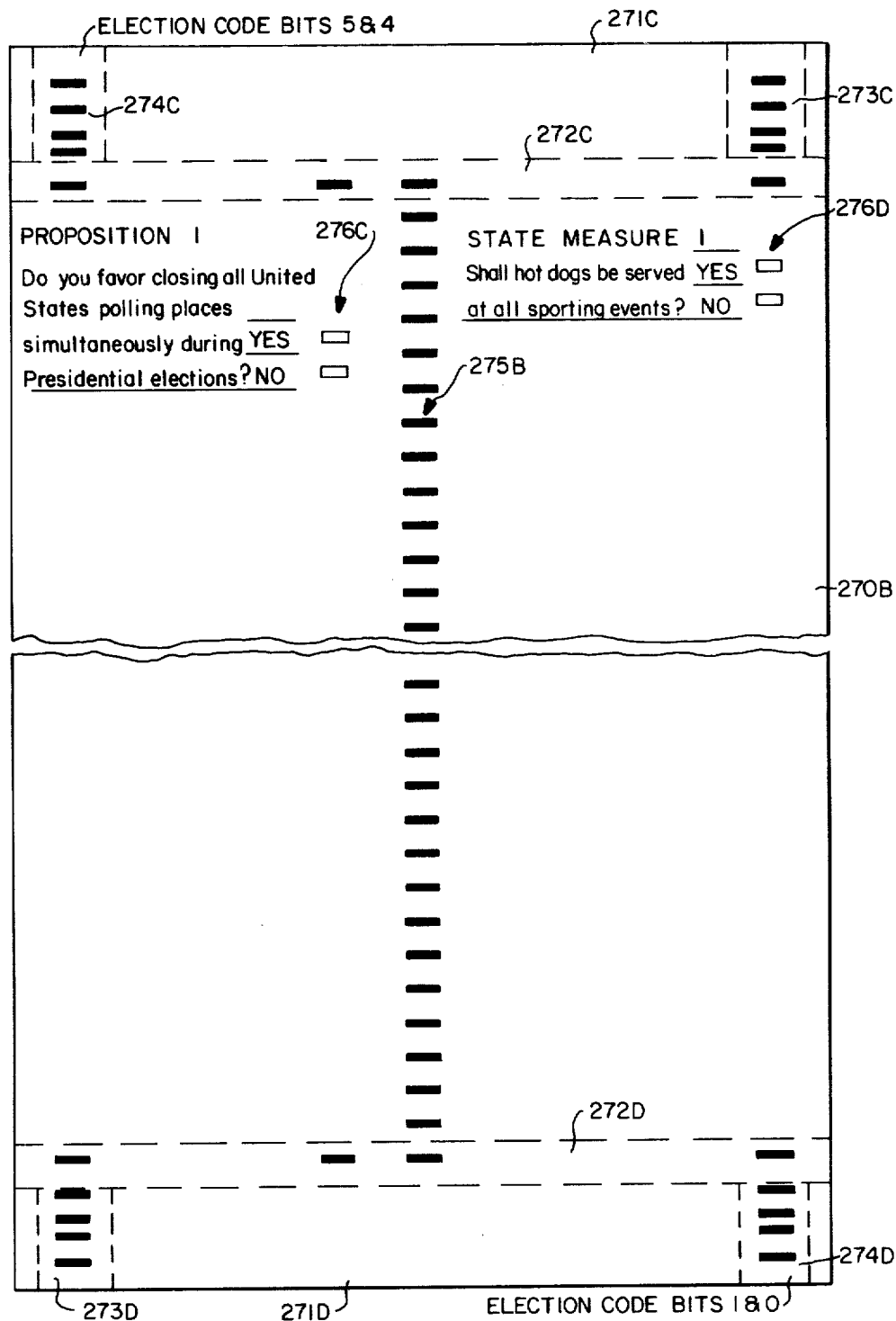

FIGS. 7A and 7B depict side one and side two, respectively, of one version of an election card ballot in accordance with this invention which utilizes two vote columns on each card side and two candidate vote mark tracks. It should be apparent that this invention could be implemented alternatively with a single column card or with ballot cards having more than two columns per card side. Side one, 270A, includes first and second header sections 271A and 271B on opposite ends of the card. Similar first and second header sections, 271C and 271D, are provided on the top and bottom portions of side two of the card. The top header section 271A includes a card orientation code section 273A and an election code or card identification section 274A. As will be discussed in more detail later, the card orientation code section 273A includes a bar pattern which may be decoded into two bits of binary digital information uniquely identifying card orientation. The election code section 274A also contains a bar code pattern decodable into two bits of an election code. Similar two bit orientation code patterns are provided in the orientation code section 273B of the bottom header 271B. On side two, shown in FIG. 7B, a two bit orientation code section 273C is provided in the top header section 271C and a unique two bit orientation code section 273D is provided in the bottom header section 271D. Additional two bit election codes are provided in the election code sections 274B, 274C and 274D in the various other bottom and top header sections on both sides of the card. These additional election code bits may be unique bits making up a total eight bit code which may be utilized to identify the type of election, the type of ballot, the precinct or other indications of card identification.

Adjacent to the top and bottom header sections on each side of the card are skew detect pattern sections 272A, 272B, 272C and 272D. These skew detect bar patterns are utilized to detect skew in a manner which permits the microprocessor control system to correct skew out of the data processing of signals from vote tracks on the ballot cards.

The main central portion of each of sides one and two of the ballot card includes a timing track 275A consisting of a regular sequence of timing marks extending throughout the entire length of the main ballot card section with each of the timing marks having a blank space therebetween. Two voting or mark tracks 276A and 276B are provided on side one of the ballot card and a pair of vote mark tracks 276C and 276D are provided on side two of the ballot card. Each of the vote tracks or mark tracks comprises a plurality of candidate mark regions, for example, the rectangular regions 277 each located opposite a name of a candidate or a voting position for a proposition or measure. Each of the candidate mark regions is located between successive marks on the timing track on that side of the card. The outline of the candidate mark region or vote box 277 is printed in an ink color to which the read head is not sensitive. For example, the read heads may use light reading in the infrared portion of the spectrum and the vote box 277 may be printed in a red ink which absorbs rather than reflects radiation in the infrared. Various card stocks can be used with the only limitation being a reflectance of at least about thirty percent in the infrared. Other approaches to marking the target area for the candidate mark region could be used, including brackets in black ink outside the track of the read-head aperture.

Referring back to the read head apertures depicted in FIG. 4, it will be seen that the U1 and U5 read head apertures are aligned with the election code and orientation code mark tracks in the two header sections on both sides of the ballot card. In addition, depending on the orientation in which the card enters the scanning mechanism 10, shown in FIG. 1-3, one of the read heads U1 and U5 will be aligned with either the candidate mark track 276B or the mark track 276D.

The read head U3 is aligned with one of the timing mark tracks 275A or 275B. One of the read heads U2 and U4 is aligned with one of the mark tracks 276A and 276C. The read heads on the lower read head assembly 104 have an identical configuration and, accordingly, have the same alignment with the various tracks on the election card. The read heads are each continuously shining light and detecting reflected light from the surface of the election card immediately underneath the particular read head aperture. Selection of appropriate combinations of read heads for detection of marks in various sections of the ballot is made under microprocessor control by commanding the multiplexer 220, shown in FIG. 6, to couple the appropriate analog signal output to the analog to digital conversion circuitry for acquisition of a corresponding digital word value by the microcomputer system. The details of read head addressing, signal conversion, and data acquisition by the microcomputer system will be discussed below.

Summary of System Operation

The actual process of conveying the ballot card depicted in FIG. 7A and 7B through the scanning mechanism 10 shown in FIGS. 1–3 with signal detection data acquisition and data processing under the control of the microcomputer system depicted in FIG. 6 involves a complex firmware program which will be discussed in detail below. However, for purposes of introduction, the operating sequence may be generally viewed as follows. Prior to any card insertion, the microprocessor system 140 is executing an idle loop program in which the microprocessor is acquiring digital data from the card input sensors 110 and 115 for purposes of detecting the entry of a card.

When a ballot card is entered through the entry chute 20 and detected by the sensors 110 and 115, one of the sensors 110 and 115 has its LED output boosted to check for card transmission level to ascertain whether more than one card is present. If more than one card is present the microprocessor continues to execute the idle loop program and to check for the presence of only one card. When the microprocessor senses that one and only one card is present, it sends a command to the drive motor to begin driving the card through the upper card path past the upper and lower read head assemblies 103 and 104.

Prior to the edge of the card reaching the read head apertures in the read head assemblies 103 and 104, the microprocessor system performs an initialization function to initialize various variables in the scratch pad memory 190 and then executes a START program during which black level words from all of the read heads are acquired and the blackest level word for each read head is stored in scratch pad memory 190. The upper surface of the lower read head and the bottom surface of the upper read head are a black color so that these black level measurements can be made. In addition, as will be seen in FIG. 2, the upper and lower read head assemblies are laterally offset so that the read head apertures therein will not be seen by corresponding apertures in the opposite read head assembly. This enables the black level detection to be accomplished without shuttering the read head apertures. However, it would alternatively be possible to provide a black leading edge on top and bottom of both sides of the election card for purposes of acquiring black level readings on all of the read heads.

The START program section is executed by the microprocessor for a predetermined time period and the black level readings are utilized to set an edge detect threshold to be utilized by the microcomputer circuitry to detect when the edge of the card reaches the read head apertures. Since the first information on the card is the digital code bits in the election code section and the orientation code section, it is convenient to detect the card edge utilizing the outputs of the read heads U1 and U5 and L1 and L5 which will be active during the detection and decoding these code marks.

After card edge has been detected, the header section of the card first reaching the read heads is read and decoded to recover the election code bits and the orientation code bits. The election code bits are stored in the scratch pad memory and the orientation code bits are decoded to detect card orientation which, in turn, is utilized in various priming page programs to set up the data stack structure of the microprocessor for appropriate reading of a card entering in the detected orientation.

The skew bar section of the ballot card is then scanned utilizing the appropriate read heads set up during the data priming based on the detected card orientation. After the skew has been detected and calculated, the main section of the ballot card is read and an image of the presence or absence of marks in candidate mark regions is captured in scratch pad memory.

As the second skew detect pattern is encountered the skew is rechecked and compared with the previously detected skew and finally the orientation code and election bits on the other end of the card are detected. The election code bits are stored in scratch pad memory and the orientation code bits are utilized to recheck the card orientation. Thereafter, the microprocessor system processes the ballot card candidate mark image stored in the scratch pad memory 190, calculates such things as overvote and undervote for various offices, and determines the appropriate diverter to operate for sending the card to an appropriate bin. If the microcomputer system validates the ballot and the markings thereon, the offices appropriately voted will be added to the accumulated totals in the totals memory 200.

If for some reason the transport and reading mechanism fails during the processing of a ballot, the ballot generally will be returned through the external exit chute to the front of the machine. If the ballot is spoiled by marking in an improper location, the ballot may be either returned to the front external exit chute or may be routed by way of one of the card diverters to a spoiled ballot bin in the pedestal. Validly counted ballots will be directed to a valid ballot bin by the microcomputer operating an appropriate one of the card diverters 90, 95 by command through an output port and one of the command signal lines in the bus 217. The microcomputer then checks the appropriate opto-electronic sensor for presence of the card at the proper exit station. After the card has left the transport mechanism, the microprocessor returns to the idle loop to await entry of the next card. A signal is provided to the front panel indicating that the ballot has been counted and the locking pin solenoid 119 is actuated to withdraw the locking pin and permit entry of a new card.

The System Firmware

The control program is *not* provided with interrupts to indicate points of progress of the card or events in the read process. Therefore, the program maintains awareness internally of such events and simulates its own internal interrupt structure.

In order to process a card under these circumstances, the control program is organized in a real time code structure so that it can deal with events in real time, such as, for example, detecting timing track marks and calculating card speed.

Real Time Program Code Structure

In order to process events in real time, in the absence of any sort of external clock interrupts, the program establishes its own constant length real time scan.

This is accomplished by a dispatch program code section which selects a real time program page and loads the program address and data stack pointer into the central processing unit for execution of the instruction sequence of that program page. Upon completion of each real time program page, program control is always returned to the dispatcher. Thus a constant length real-time scan cycle is established, if and only if, each program page has the same execution time for all possible execution paths through the page. This strong constraint on the code makes it possible to do real time processing with multiple concurrent events. Naturally the same constraint is on the dispatcher code as well, and the dispatcher simply introduces processing overhead.

The organization of the program into real time pages forces a level of organization onto the program which allows the pages to be highly structured and in most cases relatively free of jumps. This reduces the overall number of execution paths to consider and simplifies the creation of pages of constant code execution time.

The dispatcher looks at queued pages in dedicated memory (firmware memory 185) and dispatches control to the page pointed to by the queue pointer at the top of the queue. The pages themselves have the responsibility of the maintenance of these queues. If a page needs to loop on itself, it merely leaves itself in the queue. If the page needs to pass control to another page, it places the address of this new page and any pertinent data stack pointer on the queue.

Since the dispatcher is only concerned with queued pages in the firmware memory, the internal processor register states do not matter at the start or end of each page. Thus, each page may leave the processor registers in any state, and in this way, the tail of each page may do anything with the processor it wishes. This makes it possible to write delay code where necessary to fill out each page to constant execution length utilizing instructions of various execution times.

Real Time Dispatcher

The dispatcher queues have the organization and operation shown in FIGS. 8-11. Upon each dispatch the dispatcher changes a byte called "switch", and dispatches to processing pages relating to upper or lower read heads, depending on "switch" being one or zero.

The dispatch depends only on the page pointed to by the queue pointer in the active one of the upper and lower queues. The pages on the two queues may be different. The upper and lower dispatchers may be at completely different stages of processing, so that the information from the read head arrays scanning the two card sides is processed asynchronously.

Once the upper or lower dispatcher is selected, the dispatcher program code exchanges the dispatcher queue pointers in that dispatcher, as shown in FIGS. 8-11. It then uses the queue pointer that is in the uppermost position and selects the queued page pointed to by that queue pointer for the dispatch. In this way, there are normally two alternating queued pages for processing information from the upper and lower read head assemblies. A full dispatch cycle would involve four separate pages before the first page is pointed to for re-execution.

FIGS. 8-11 show a full dispatch cycle. In each of the figures the black arrow points to one of the upper and lower dispatchers depending on which is active at the time for that particular dispatch and one of the arrows representing the queue pointers is a heavy dark arrow representing the active queue pointer for that dispatch. It will be seen that, in each instance, the active queue pointer is the queue pointer emanating from the uppermost queue pointer position in the active dispatcher.

Figure 8:
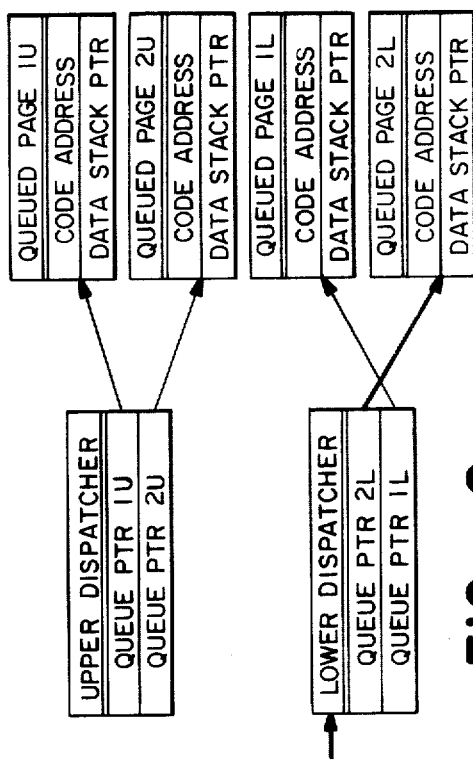
FIGS. 8-11 are schematic diagrams of a plural dispatcher, plural queued page, real time programming concept in accordance with this invention.
Figure 11:
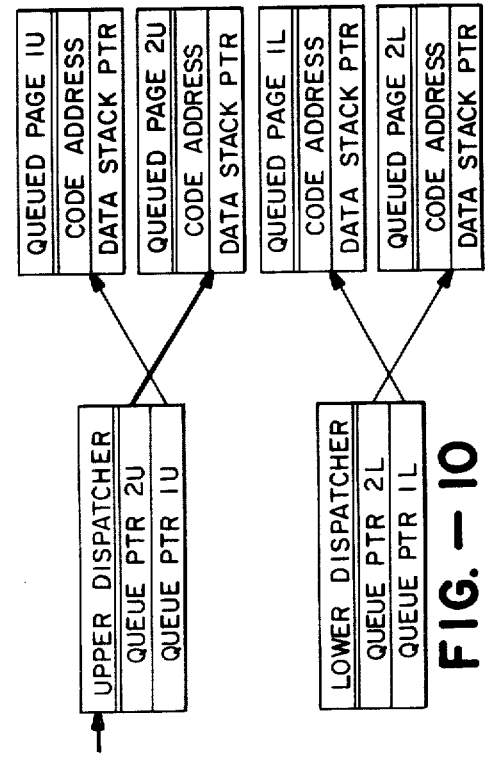

FIG. 11 illustrates the status of the dispatcher when the dispatcher program code is entered after executing the queued page 1L pointed to by the queue pointer 1L in the lower dispatcher which is active at that time. It will also be noted that, in the upper dispatcher, queue pointer 2U is in the upper queue pointer position and the queue pointer 1U is in the lower queue pointer position. Upon entering the dispatcher program again, as shown in FIG. 8, the positions of the upper dispatcher queue pointers are exchanged so that the queue pointer 1U is in the uppermost queue pointer position and sets queued page 1U as the active page to be executed by the microprocessor.

Figure 9:
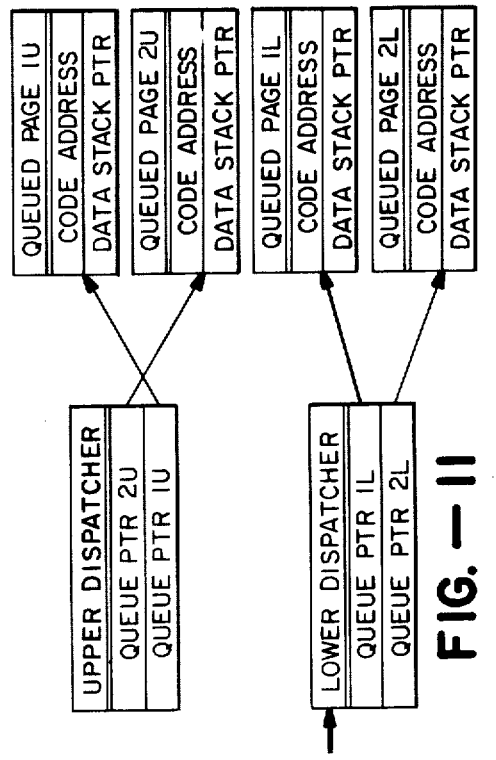
Figure 10:
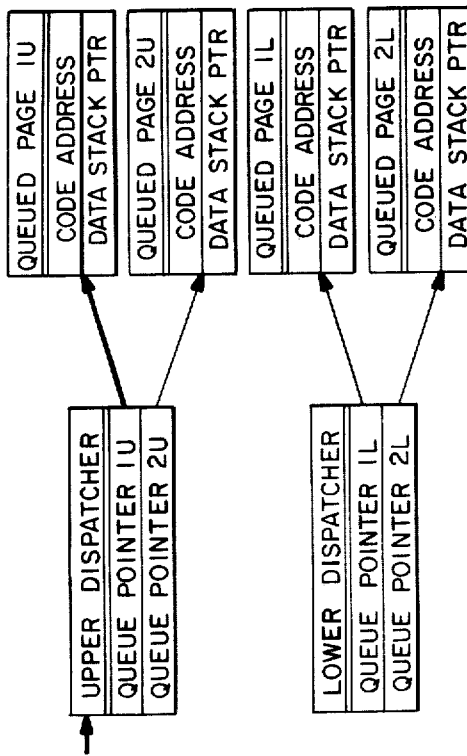

After queued page 1U is executed and the dispatcher program code is entered again, the switch bite is changed to activate the lower dispatcher as in FIG. 9. The lower dispatcher queue pointers are exchanged and the active queue pointer is queue pointer 2L pointing to queued page 2L. After page 2L is executed by the microprocessor, the dispatcher program code is entered again and the positions of the upper and lower dispatcher queue pointers are as shown in FIG. 10. The upper dispatcher is now the active dispatcher, the queue pointers 2U and 1U have been exchanged from the position they were in in FIG. 9, and the queued page 2U is loaded for execution by the microprocessor. After page 2U is fully executed, the dispatcher program code is entered again. The switch bite is changed to activate the lower dispatcher and its queue pointer positions are exchanged so that the active page becomes queued page 1L. After execution of page 1L, the next dispatch returns the dispatcher status to that of FIG. 8. In this manner it is seen that the page execution sequence is 1U: 2L: 2U: 1L.

Execution Page Data Stacks

Each execution page is accompanied by one or more unique data stacks pointed to by the stack pointer register upon initial dispatch. This technique is utilized since the "POP" and "PUSH" data load and store instructions are the most powerful and swift data movement instructions in the instruction set of the Intel 8085 microprocessor. Speed is paramount for the real-time pages, particularly for the maintenance of the dispatcher stacks themselves.

By using this technique, it becomes possible to have a single generic execution page operate with several different data stacks, with the data stacks defining a unique function for that page. For example, as will be discussed in more detail below, to decode the orientation and election code tracks on the top and bottom of the card, the same "ANALYSIS" page is used, with four unique data stacks which define the particular track being decoded.

Also, when a page completes execution, the next dispatch page address and new data stack pointer will be obtained from a particular data stack, and in this way the uniqueness of the stack will be maintained into the next dispatch. The execution of the same page with different data stacks can be chained since the data is obtained from the stacks themselves.

Variations in Dispatching

The dispatcher queue pointers and the queued pages themselves undergo constant modification, so they are maintained in RAM memory (i.e. scratchpad memory 190, FIG. 6). A program page normally replaces itself and/or a companion page on the same queue to a new page in the following way. It loads the current dispatcher queue pointer (the pointer at the top of the pair of pointers, the last dispatched, namely itself) which then points to the queue from which the current page itself was dispatched. The page then POPS a new page address and stack pointer from its own stack and pushes these pointers onto the dispatcher queue found in the process above. It then exits to the dispatcher program code, and four dispatches later, the new page is executed. If two new pages are to be loaded, the first is loaded as above and then the same code sequence is reexecuted after loading the other dispatcher queue pointer in that same dispatches queue. When the dispatcher program is executing alternating pages in one of the queues, that will be called double dispatch mode.

If extra scan resolution or speed is desired, and four dispatches per scan cycle are not needed, the program can modify the pair of dispatcher queue pointers to be the same as shown in FIGS. 12A-12C. The page takes the upper queue pointer (the last and current executed) and places it in the lower queue pointer (the next for execution). Now both queue pointers point to the same queued page. That queued page executes twice as often (i.e. on every other dispatch) so scan resolution and speed are doubled. This will be called single dispatch mode.

Code efficiency may also be achieved with this procedure. If a page explicitly makes the queue pointers point to a particular queued page, or knows which queued page is in use (i.e. is on one of the dispatcher queues), it may now advance to a new page by manipulating that queued page explicitly, without going through the code overhead of the loading new queue pointers.

Even in the double dispatch mode, if a page is explicitly placed in one of the two queued page positions, and maintains itself and all of an associated family of pages on that queue, it may deal with that queue explicitly without going through the queue pointer overhead. An example of this occurs during each scan subinterval for reading of the vote tracks. The timing track family of pages reside on the bottom of the pair of queued pages (i.e. 2U and 2L) and maintain themselves there explicitly. These pages additionally manipulate the top of the pair of queued pages (i.e. 1U and 2L) to alter the two different vote track pages which would otherwise loop there forever since they have no interval page replacement code.

Dispatch Timing

Each T-state of the 8085 processor takes 217 nano seconds. In a prototype embodiment of this invention, the real time pages are written with one exception to execute in exactly 354 T-states, so they take 76.8 microseconds to execute. The dispatcher adds 173 T-states of overhead or 37.5 microseconds. Total time for a single page scan then is 527 T-states or 114.36 microseconds. Executing one page in each of the upper and lower dispatcher queues, thus takes 278.7 microseconds. Since the card is moving through the reader at about 24 inches per second in the prototype, it moves 0.0055 inch in the single dispatch cycle of 228.7 microseconds. This represents the best case resolution of the system. During the reading of the vote tracks, double dispatch is used. This reduces the resolution to 0.011 inch.

There are several places where best case resolution is needed, such as in the pages used to detect the skew in the system. All timing relative to the vote tracks is relative to the leading edge of a timing track mark, so both the TIMING MARK START DETECT (T. ST. DET.) page and the SCAN AND BUFFER VOTE page include code which looks for the timing mark leading edge and exits when detected. Thus resolution on detecting this edge is 0.0055 inch despite the fact that the resolution present in either page alone is 0.011 inch.

Since the skew will be applied to the vote box window which is calculated relative to the timing track, both the skew and the timing track leading edge are known to best case resolution. Worst case tolerance buildup here would be the lower resolution value and the vote track data is acquired at this lower resolution value. High speed and resolution is also occasionally necessary where parameter calculation is needed in a very short amount of card travel. An example of this is right after the orientation code is known, and before the skew bar is seen to allow time to choose the correct read heads and prepare for scan of the skew detect section of the card.

Variations in Execution Page Data Stacks

As already mentioned, the data stacks make an execution page unique for a particular task, read head, and the like. Also the stacks carry information which alters queue pointers to chain the pages forward in a prearranged execution sequence.

It may also happen that, upon exit, the data stack pointer may be changed in the queued page, while the execution page is not changed. Thus a page may execute repetitively with a whole family of different data stacks, which, when complete, point back to the original data stack, and the process begins anew. The data stacks so organized become a "ring" of data stacks, and a single page can execute the entire ring as often as necessary. An example of this process is when data must be acquired on all ten read heads and data on only a few at a time can be acquired during execution of a single program page. This is shown in FIGS. 12A–12C where the data stacks chain through stacks associated with successive pairs of the five read heads U1–U5. This is done in the START page discussed below.

Execution pages may require more than one exit path, and may need to start more than one new process or page with their own unique data stacks. Since the page under execution has its own unique stack pointer under its own control, it is free to obtain a pointer from its data stack which points to a new data stack, and to load this to the stack pointer register or not as the need arises. Thus the page can "step out" of the current data stack to point to a new data stack to control an alternate exit. The stack pointer register within the processor is also available to be incremented or decremented by a fixed delta to point to new portions of the stack for variable execution functions and page exit paths.

In many cases, variable, real time execution data is stored directly in the data stacks so that a time-critical page has access to the data by merely popping the data into the processor. Another reason to store data directly in the stacks is the need to maintain critical pointers there once card orientation is known, so that regardless of card orientation, vote track data from the card is buffered into the proper memory location. These stacks which receive data in real time are initialized from an image in the firmware ROM memory to their final location in RAM memory when the system is initially turned on.

Generic Extensions of the Dispatcher Concept

It should be apparent from the above discussion of a two level-two page dispatcher program system that the same concept could be applied to a single level multiple page dispatcher program such as shown in FIGS. 13A and 13B or to a multiple level-multiple page dispatcher concept as depicted schematically in FIG. 14. The single level, multiple page dispatcher program concept shown in FIGS. 13A and 13B uses a single dispatcher queue, called A DISPATCHER, has N queued pages in the dispatcher queue, each having its individual queue pointer pointing to that page. To dispatch to the queued pages in sequence the position of the queue pointers for each page may be altered in a regular ring fashion so that, upon each entry into the dispatcher program, the content of the uppermost dispatcher queue pointer is changed so that a different queued page is pointed to and executed by the processor.

In the FIG. 14 embodiment multiple dispatcher levels, each having multiple queue pointers pointing to individual ones of multiple pages are provided. In this case a much more complicated switch byte is utilized to sequence the dispatch among the dispatcher levels, i.e. the A dispatcher, B dispatcher, up through N dispatcher levels, where each time a particular dispatcher level is entered, the queue pointers in that dispatcher level are rearranged so that the next page in sequence on that queue is executed.

It should thus be understood that the real-time dispatcher program concept of this invention may be applied in a wide variety of real time program environments. For example, variation on the ballot counter system in accordance with this invention would involve the use of two or more scanning mechanisms 10 controlled by a single microprocessor computer system. In such an embodiment of this invention, a faster microprocessor would preferably be utilized along with faster analog-to-digital signal conversion techniques to enable the same card speed to be maintained through the plural document scanning mechanisms and the same resolution of event detection to be implemented. Such an embodiment may place additional constraints on certain segments of the real time processing, but in all other respects such an embodiment is a relatively straightforward extension of the double dispatch level, double page concept discussed above. If two scanners were used with two-sided reading, four dispatch levels with two pages on each queue could be utilized.

The Real Time Program

As discussed above, this flexible single and double dispatch, queued page execution program concept utilizes a page execution cycle which is constant in length, and forces an organization on the program which greatly facilitates data acquisition and processing from concurrent operations or events in real time. The dispatch concept of this invention together with multiple exit and execution paths within the individual program pages, actually take the place of the majority of the "jumps" normally found in code without this organization. It has been discovered that it is possible to code most real-time pages in this highly structured way with very few internal "jumps". Moreover, in most instances, those programs with a substantial number of jumps can usually be structured to fit within the constant code length constraint, using varying length time delay code where necessary.

Since the basic scan cycle represents about 0.0055 inch of card travel at 24 inches per second of card speed, a timer associated with each dispatcher queue (typically associated with one of the read head assemblies) can be incremented once per real-time page. This timer value then represents card travel in units of 0.0055 inch. Since card event dimensions, e.g. distance between timing mark leading edges are known, the timer value is a direct measure of card speed. Since the program measures and uses actual card speed directly, constant card speed is not important, and the program works properly over a substantial range of card speeds and with varying card speed within limits.

Other variable parameters are measured or calculated on an individual program page basis, for example, background white level of the card as seen by each separate read head. Continuous filtered background levels are calculated, and event detection thresholds are calculated during each scan subinterval of the timing mark and vote track scanning interval. The separate read heads are checked for proper operation (i.e. minimum acceptable overall gain) every 0.0055 inch or every 0.011 inch of this scanning interval.

If for any reason, the card reading program fails to progress to the end of the real-time pages, a deadman timer, running in the dispatcher code, times out and an error is declared. Manual intervention is then required to clear the stuck card from the paper path or repair the motor in the card transport mechanism.

Specific Embodiment of System Program (Firmware) Methodology

The operation of a preferred embodiment of the real time program pages for the preferred ballot card counting system will now be described in conjunction with the timing sequence and program page flow charts depicted in FIGS. 15-50.

IDLE LOOP

There are a number of program processing operations which must be carried out to set up the system for reading of a ballot card. These program processing functions will be discussed in more detail below. Generally they involve initialization of the input/output channels and the random access memory stacks for the particular ballot card which is going to be read by the system. After these initialization program steps, the system enters an IDLE LOOP program which does not involve the dispatcher program code but instead is sequentially acquiring data from the two CARD IN sensors (110 and 115, FIG. 1) to detect the entry of a ballot card into the card transport system.

The IDLE LOOP is running continuously in the program looping on itself until a card is detected. FIG. 17 shows a program flow chart of IDLE LOOP. As shown in FIG. 17, each time the IDLE LOOP is entered a timer value is set to 148 milliseconds which is about the average time required to move a card between the CARD IN sensors and the first set of friction rollers in the card transport mechanism. The program then checks the CARD IN 1 sensor 110 to see if the converted digital data word output of that sensor is above a preset card detect threshold value.

In general, the instruction sequence utilized for acquiring a data word when one of the read head or optical opto-electronic sensors involves sending an address word to the multiplexer 220 (FIG. 6) so that the appropriate analog signal from a read head or sensor is coupled to the analog-to-digital conversion circuit 225. The processor then commands the successive approximation register in the analog-to-digital conversion circuit 225 to begin the conversion process after the multiplexer has settled down to present an accurate analog signal value input to the converter. The processor then waits for the conversion process to be complete and inputs the resulting digital word from the tri-state buffers 230 to an input port of the programmable I/O ports 210 and acquires the data word via the data bus 171 and the bus transceiver 170.

The processor then compares the value of that data word with a preselected threshold value for sensing the presence of a card by the opto-electronic sensors and the diamond shaped box labelled "CARD IN 1 Sensor ?" indicates the test for the word value being greater than or equal to the threshold. If the CARD IN 1 Sensor test is negative, the program loops back to reset the timer to 148 milliseconds and again checks the CARD IN 1 Sensor. The program will remain in this loop until the CARD IN 1 Sensor test is met, after which the program tests the output of the CARD IN 2 Sensor. If that test is not met the program recycles back to reset the timer and check the CARD IN 1 Sensor and CARD IN 2 Sensor again in sequence. When both the CARD IN 1 and CARD IN 2 Sensors have detected the card, the processor sends a LED boost command to one of the opto-electronic sensors, acquires the output of that sensor and tests it to determine whether only one card is present. This again is a threshold word value test. If this test shows that the transmission level of the card is lower than anticipated for only one card being present, the program will loop back to resetting the timer and continue through the CARD IN 1, CARD IN 2 Sensor tests and the boost LED command and testing of the boosted sensor output until it determines that only one card is present.

When the program has detected only one card present, it then checks to see whether the timer which was set to 148 milliseconds has lapsed. If the timer has not elapsed the program loops back to check the sensors again and to check for the presence of a single card, but the timer is not reset. If all of the card input sensors and boosts sensing tests are met for a full 148 milliseconds, the timer will elapse and, under program control the card transport motor will be turned on and the lockout pin will be dropped by solenoid 119 onto the card.

"INIT" Program Section

As shown in FIGS. 15 and 16, this initialization program executes between times T0 and T1. This string of code sets up all the variable parameters for the real-time pages to accomplish reading. For example, the vote buffer is zeroed, the maximum black level cells are set to maximum white and vice-versa. The dispatcher queues are initialized to two-way single page dispatch (maximum speed) and the dispatcher program code is entered to begin real-time processing.

START Program Page

After the INIT program has completed execution, the card edge is not yet up to the read heads, so the maximum black level word on each of the ten read heads can be captured in the START program page. This maximum black level word will be used later to calculate a "white" minus "black" delta for purposes of mark detect threshold calculations. A characteristic of a mark-sense reading mechanism is that, while white levels vary significantly, depending on such factors as card albedo (reflectance) and read head gain, the black level is fairly constant, and represents the true minimum signal output from the read heads. The edge detect threshold level is later set at a certain minimum constant above this black level.

This single page executes in a looping mode in full speed dispatch mode on the upper and lower dispatcher queues, and stacks are used in "ring" mode so that data on all ten read head outputs is acquired, five in processing the START page on the upper dispatcher queue and five on the lower.

Exit from START is made when sufficient data has been acquired to establish black level for all the heads. Upon exit, the four-way dispatch mechanism is set up, and the EDGE detect page is set in place with four data stacks representing the four scan tracks nearest the edges of the card, i.e. the tracks for read heads U1, U5, L1 and L5.

A software flow chart for the START program is shown in FIG. 18. The first step of this program is to POP in a head address from the data stack for this program page followed by the starting of the analog-to-digital conversion circuit for the analog signal from the addressed head. Referring back to FIG. 6, this is accomplished by sending the head address to the analog multiplexer 220 to couple the appropriate read head output signal to the analog-to-digital conversion circuit 225. The successive approximation register is then started to begin the analog-to-digital conversion process. After the start of the analog-to-digital conversion process, a timer is bumped. Then the program checks to see whether, after the bump, the timer has run out. In this case the timer is simply a count of the number of page executions.

If the timer has not run out, the digitized black level word from the conversion circuit is brought in through the programmable I/O port 210 and saved in an internal register. The next head address from the data stack is popped in and the analog-to-digital conversion process is started on the output of the corresponding read head.

Following this the digital word output of the former read head is compared to the black level word previously stored and the present level is either saved or thrown away depending on whether the value of the present black level word is less than the former one. The program then brings in the head output data word from the second read head and compares it to the word value stored from the previous measurement on that head. The current value is either saved or tossed, depending on whether it is less than the former. The program then sets an edge detect threshold for this head by popping in the threshold increment, adding into the current black level word and then storing it as the edge detect threshold. The program then increments the data stack pointer and loops back to the dispatcher.

If the timer has run out after being bumped in the earlier part of the program, the program jumps to another execution path in which the edge detect threshold is set for the current head. The program then checks to see whether it is processing data from the upper or lower head. Depending upon the result of that test, the program sets the EDGE page on both pages 1 and 2 of either the upper or lower dispatcher queue with appropriate data stacks for the U1 and U5 heads or L1 and L5 heads, respectively.

EDGE Program Page

The EDGE program page on both queued page locations on the upper and lower dispatcher queues utilizes the U1, U5, L1 and L5 read heads to detect the edge of the card. The program for this edge detect function is shown in FIG. 19. The first step of the program is to pop in the head address from the active data stack and to start the analog to digital conversion process. Following this the deadman timer is zeroed and the edge threshold value previously calculated is popped in. When the conversion process is complete the current head output data is compared with the edge threshold. If the data word value is greater than the edge threshold word value, the program sets a state flag for this array equal to an edge detected value and then places the BLK. THLD. page and its data stack on the dispatcher queue for this read head.

If the head data from the conversion process is not greater than the edge threshold value, the program checks to see if the state flag for this array has previously been set to the edge detect value. This would occur if the other read head in the array had already detected the edge and set the state flag. If this has occurred, the program jumps to place the black threshold (BLK. THLD.) page and accompanying data stack on the appropriate dispatch queue for this read head. If the state flag has not previously been set, the program knows that the edge has not yet been detected and starts the conversion process for one of the CARD IN sensors and then zeros the deadman timer again.

Following this the program checks to see whether a card is present at the input by bringing in the CARD IN sensor output word value and comparing it to the card sensing threshold. If the card is not present, either the card has been withdrawn or it has past the read head with no edge being detected due to defective read heads. At this point the edge program passes control out of real time and drives the motor sufficiently to have driven the card out of the mechanism through the external card exit chute. The program checks for a card present at the exit and declares an error if it detects a card passing through the exit chute. If the program does not detect a card emerging from the exit chute, it passes control back to the IDLE LOOP since the card has been withdrawn.

BLK. THLD. (BLACK THRESHOLD) Program Page

This page acquires initial background white levels on the card to set the initial code mark detect thresholds (black detect thresholds or BDTs) for each of the four active read heads. Sufficient scans are allowed to read one eighth inch of the card past the edge. At this point, white levels are primed and an initial mark detect threshold is set. The latest white level is examined to be above a certain minimum to ensure proper read head operation, and then exit is made to the BLACK DETECT (BLK. DET.) page. As soon as the white level is sufficient to guarantee head operation, exit is also made to the next page on the next scan cycle. Notice that a single page suffices for four tracks in this program page, and the track information is being passed forward through chained stacks.

FIG. 20 illustrates the program flow chart for the BLK. THLD. page. The program pops in the head index for the next head and the preset timer runout value equal to one eight inch of the card. Then the analog-to-digital conversion process is started for the head and the timer is bumped. After bumping the timer, the timer value is checked to see if it has run out. If the timer has not run out, the program then points to a new stack for the next head, brings in and saves the current head output level in the current level register and moving the last level to the previous level register, the second to last level to the average level register. These registers will later be used in the digital low-pass filtering operation on background levels for establishing a black detect threshold (BDT).

Next the black level word for this head is popped in from the data stack. Then a delta is calculated as the current level minus the black level word and a new black detect threshold is set equal to the delta divided by four. Next the edge threshold value is popped in and the current head output is compared to the edge threshold. If the current head output is less than the edge threshold, the program exits back to the dispatcher to loop on itself since the current head has not yet seen the edge of the card. If the current head output value is greater than the edge detect threshold, the minimum read head delta is popped in from the data stack and compared with the current delta. If the current delta is less than the minimum delta, a low gain error is declared. If it is not, the program exits back to the dispatcher to loop.

If the timer has run out after being bumped, the current head output value is obtained and then a Head Test Routine is executed. In this routine, the black level for the current head is popped in. If the current head output is less than the black level, then an error is declared since the head is dead. If it is not less than the black level, a delta is calculated as the difference between the current level and the black level word. The minimum delta is popped in from the data stack and the current delta is compared with the minimum delta. If the current delta is less than the minimum delta a gain error is declared. If it is not, the BLK. DET. (BLACK DETECT) page is set on the dispatcher queue and the program exits.

Accordingly, after the timer has run out on the first one eighth inch of the card for both the upper and lower read heads, and if no errors have been declared, the black detect threshold (BDT) has been set for all four heads and the processor can now begin to execute the BLK. DET. page and begin looking for the first black mark which is the start code mark as shown in FIG. 15.

Referring now to FIGS. 15 and 16, it is seen that the START program has executed between times T1 and T2 before the edge of the card reaches the read heads. Then the EDGE program executes between times T2 and T3 for the lower read head and between times T2 and T4 for the upper read head. As shown in FIG. 15, for purposes of illustration, it will be assumed that the card has been entered into the card transport mechanism with card side 2 (shown in FIG. 7B) up and with the bottom of the card entering first.

FIG. 15 also illustrates the effect of skew in the read heads and other skew contributors on the asynchronous processing of the various program pages for the four code sections 273D and 274D on card side 2 and 273B and 274B on card side 1. The skew shown between these various code sections is exaggerated for purposes of illustration and the skew is shown as if the read heads were unskewed and all skew is in the actual card itself.

As shown on the right side of FIG. 15, the leading edge of the card bottom reaches the L1 read head first at time T3 and then reaches the U1 read head at time T4. This time differential is due to the skew of the upper and lower read head assemblies with respect to each other, the lower one being in front of the upper one as illustrated in FIG. 2. The L5 read head is skewed with respect to the L1 read head and the U5 read head is skewed with respect to the U1 read head so the card edges are shown at different time locations to illustrate skew. This is done for purposes of illustrating how the dispatcher program pages are running asynchronously so that skew is not a factor in proper detection and analysis of the orientation and election codes in the card header. It is thus seen that the BLK. DET. page begins executing on the upper and lower dispatcher queues at different times, namely time T5 for the lower and time T6 for the upper dispatcher.

BLK. DET. (BLACK DETECT) Program page

This program page is scanning for the leading edge of the black marks in the four codes tracks 273B, 273D, 274B and 274D. Initially, the mark detect threshold calculated in the BLK. THLD. page is used for this purpose. As this page executes, not having found the mark, it executes a digital low-pass filter routine on the white background levels it has obtained and recalculates a new BDT level to be used on the next page execution. It then leaves itself on the dispatcher queue to be re-executed. The background word digital low pass filter routine operates as shown in FIG. 21. The current level is stored, and the previous current level is moved to a memory cell called "previous". The data previously in "previous" is averaged with another memory cell called "average". This averaging process accomplishes the low-pass filtering, and the new threshold is calculated from this value. The purpose of calculating the filtered background level based on a three scan cycle aged value is to not include the initial signal drop of the black mark edge in the filtered background level.

The BDT is calculated as shown in FIG. 22. The filtered background white level is diminished by the stored black value for that head to obtain the delta value. 25% of this delta is taken and subtracted from the background filtered level "AVERAGE". This number is the black detect threshold level (BDT) for the next execution of this page.

These routines are the key routines for the "automatic levels adjustment" feature present in the program. This is used for scanning the four codes tracks, the skew bar, and the timing track. Notice that it is done for each track (i.e. each read head) independent of all the others, and a new level and threshold is calculated about every 0.011 inch of card travel. Not only does the program adjust the threshold sensitivity relative to the gain of each read head, but also makes continuous adjustment for a varying card background level seen by each read head. This substantially increases the accuracy of mark detection.

In this page, and in pages to follow, a timer appropriate to the side of the card being read is advanced once per scan cycle. This timer is a direct measure of card speed. In this program it is also used as a measure of the distance between code marks read on the card since that distance determines the code bit value.

As soon as the leading edge of the black mark is seen, the timer is zeroed, and the previous timer value is stored in memory relative to a memory cell pointer for the track being read. This mediated by the data stack currently in use. Then this memory pointer is advanced to accept the next timer value. The page then exits to the SKIP page.

FIG. 23 depicts a program flow chart for the BLK. DET. page. The head index for the current head is popped in from the data stack and the analog-to-digital conversion process is started. The orientation and election code timers are popped in and bumped. Thereafter the BDT previously calculated and stored for this head is popped in and stored. The converted head output data word is brought in and compared with the BDT. If it is not greater than the BDT the digital low-pass filter routine described above and shown in FIG. 21 is executed followed by execution of the routine for calculating a new BDT. The program then loops back to the dispatcher. If the head output is greater than the BDT the timer for this head is zeroed, the former timer is stored in the data stack and the timer pointer is advanced to the next timer location. Following this, the SKIP page is set on the dispatcher stack and the program exits back to the dispatcher.

Skip Program Page

This page delays, incrementing the timer, until the falling edge of the black mark is found. Gross limits are applied to the time taken to find this falling edge to make sure that a read head did not fail, the motor did not fail, or a user did not hang onto the card. These gross limits are taken from assembly parameters and represents several hundred percent of card speed. The page loops on the dispatcher queue until the trailing edge is found.

When the trailing edge is found, this page has two alternate exits. (Two tails of data stacks are chosen to place on the dispatcher queue). First, the data pointers to the stored timers are examined to see if the last (fourth) timer has been stored, (i.e. the last code mark prior to the skew bar has been seen). If the marks are not yet completely decoded, control passes back to the BLK. DET. page. If decoding is complete, control passes to the END CODE page.

FIG. 24 illustrates the program flow chart for the SKIP program page. The analog to digital conversion process is started on the current head and then both timers are popped in and bumped. Following this, BDT is popped in and the head output data is compared with the BDT. If the head output is less than or equal to the BDT, the program pops in the low and high timer limits and then checks to see whether the timer is greater than or equal to the high limit. If the timer is less than the high limit, the program executes to the dispatcher for looping. If the timer is greater than or equal to the high limit, program declares an error that the card is moving too slow.

If the head output is greater than the BDT, the low and high timer limits are popped in. The program then checks to see whether the timer value is greater than or equal to the low limit. If it is not, the program declares an error that the card is moving too fast. Otherwise, the program checks to see whether the timer value is greater than or equal to the high limit. If it is, the program declares a too slow error. If the timer value is less than the high limit, the code stack address and low bite of the pointer is popped in and a check is made to see whether the pointer is at the end of the timer stack locations. If it is, the END CODE program is set on the dispatcher queue, otherwise the BLK. DET. page is set on the dispatcher queue.

As shown in FIGS. 15 and 16, the BLK. DET. pages and the SKIP page execute in interleaved sequence on each of the pages of the upper and lower dispatcher queues until the end of the resync mark is reached for each of the orientation and election code sections, after which the END CODE program is placed on the appropriate dispatcher queue and executed. FIG. 30 illustrates the sequence of pages executed after the end of the resync mark is reached.

END CODE

This program page, illustrated in FIG. 25, checks to see whether the election code track is present on the card, and whether the decode process for the other code on the same card side is nearly complete. Whichever code track completes first and reaches this page first looks at the memory pointers for the other page to check for three possible conditions: (1) has the decode on the other track even begun; (2) has it begun and nearly completed; (3) has it completed. In the third case, exit is immediately made to the CREATE PARAM. Exit is also immediately made if condition 1 is noted and a memory cell is changed to indicate the election code is not present on the card.

If condition 2 is detected, this page loops to wait for the final mark to be found on the other track. If the processing of the other track has not yet reached this point, i.e. none of the three conditions is met, an error is declared and card processing terminates. As shown in FIG. 25, condition 3 is tested first; condition 1 is tested if 3 is not met; and condition 2 is tested if condition 1 is met.

When this page exits, it sets the dispatcher queues so that dispatch is made in the two-way, full speed mode. This is not done to achieve resolution, but to achieve execution speed. Several pages will now execute to determine card orientation and adjust the program for it (e.g. data stacks). This must be done to pick the proper read heads to scan for the skew bars, and to obtain background levels and thresholds for those read heads. This processing must complete in time to set up the queues for pages and stacks to detect the skew bars.

CREATE PARAM Program Page

FIG. 26 illustrates the program flow chart for the CREATE PARAM page. The first step is to pop in the stored timer values ΔT1, ΔT2 and ΔT3. Then T(total) is calculated by adding all three timer values together. T(total) is divided by two to calculate an average card speed. Then the average card speed is divided by two to calculate the zero bit value length. Referring to FIG. 15, it can be seen that the bit zero distance, which is the distance between the leading edges of the first two marks on track 273B and 274B is one-fourth of the distance from the leading edge of the start code mark to the leading edge of the resync mark.

The "0" bit length is divided by two to calculate a speed error Δ. The speed error Δ is divided by 2 to calculate a limits Δ. The low "0" bit limit L1 is then calculated as the "0" bit length minus the limits Δ. This limit L1 is superimposed on the code track 273D for illustration. The "0" bit length is then added to the speed error Δ to calculate the "1" bit length. The low "1" bit limit L2 is then calculated as the "1" bit length minus the limits Δ. The high "1" bit limit L3 is then calculated as the low "1" bit limit plus the speed error Δ. Next the low speed limit is calculated as the average card speed previously calculated minus the limits Δ minus the speed error Δ. The high speed limit is then calculated by adding the speed error Δ to the low speed limit three times. After this all limits are stored in a data stack and the ANALYSIS page is set on the dispatcher queue.

ANALYSIS Program

This page uses the parameters from the previous page to decode the orientation code track. The election code track is decoded after the card is completely scanned. It obtains one of four possible two-bit code values, or it finds a timer outside the bounds and declares a speed error and exits.

Whichever card side completes its decode process first will enter this page first. Since the orientation codes in each corner are unique, the first code found orients the card since the processor knows which read head array completed the code scan first. When the other card side enters this same page, card orientation is already known, and so the second orientation code is merely verified against the first. If they don't verify, exit is made with an error. This page sets memory cells indicating the absolute orientation of the card. These were zeroed before the card entered.

When this page exits it may take two possible exit paths. First, if this is the first execution of this page, it exits to "PRIME 1" and following pages which will prime succeeding code with card orientation. If this is the second trip through this page, it exits directly to a "NULL" page downstream of the priming pages.

Figure 27:
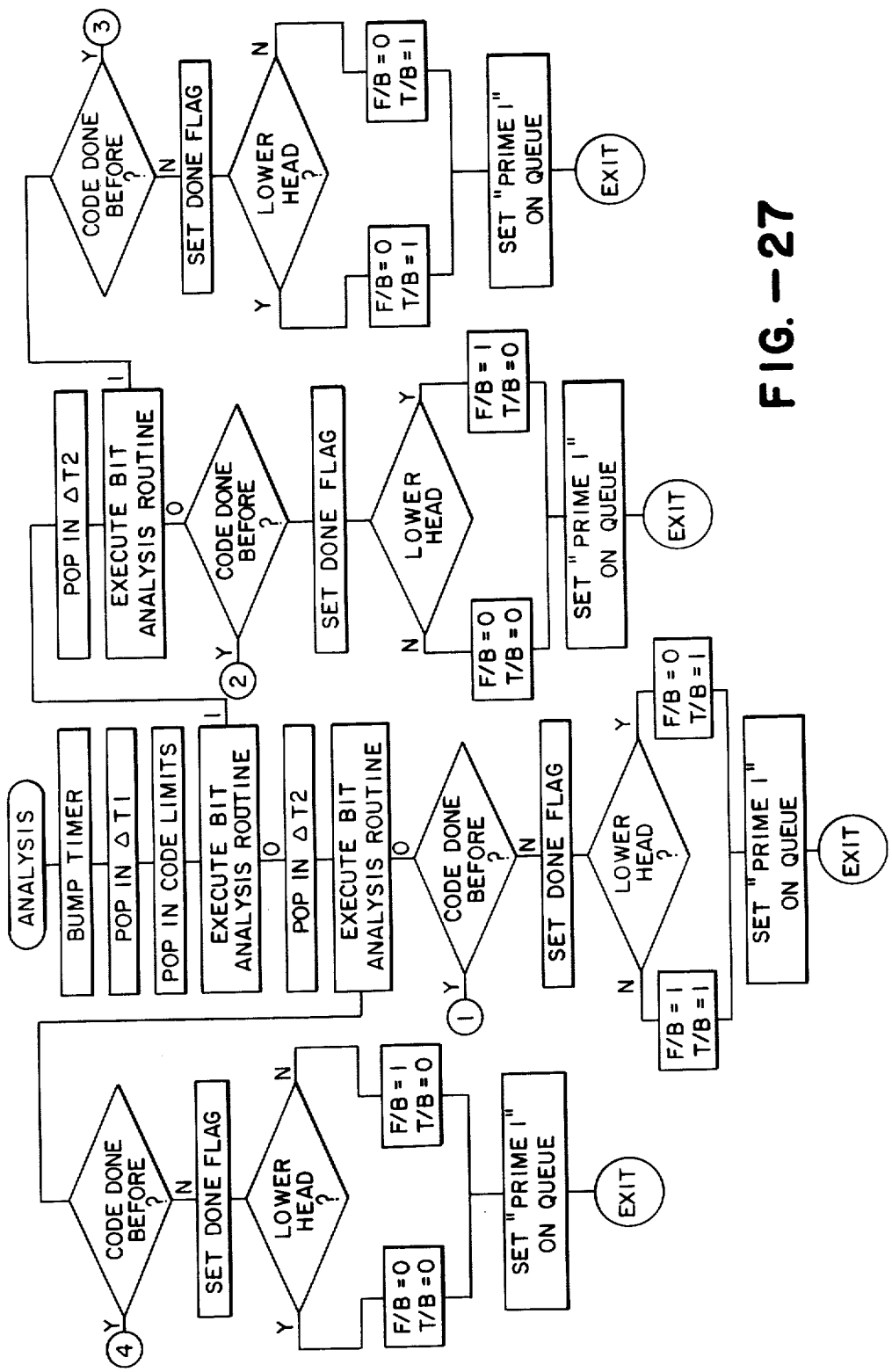
Figures 35, 36:
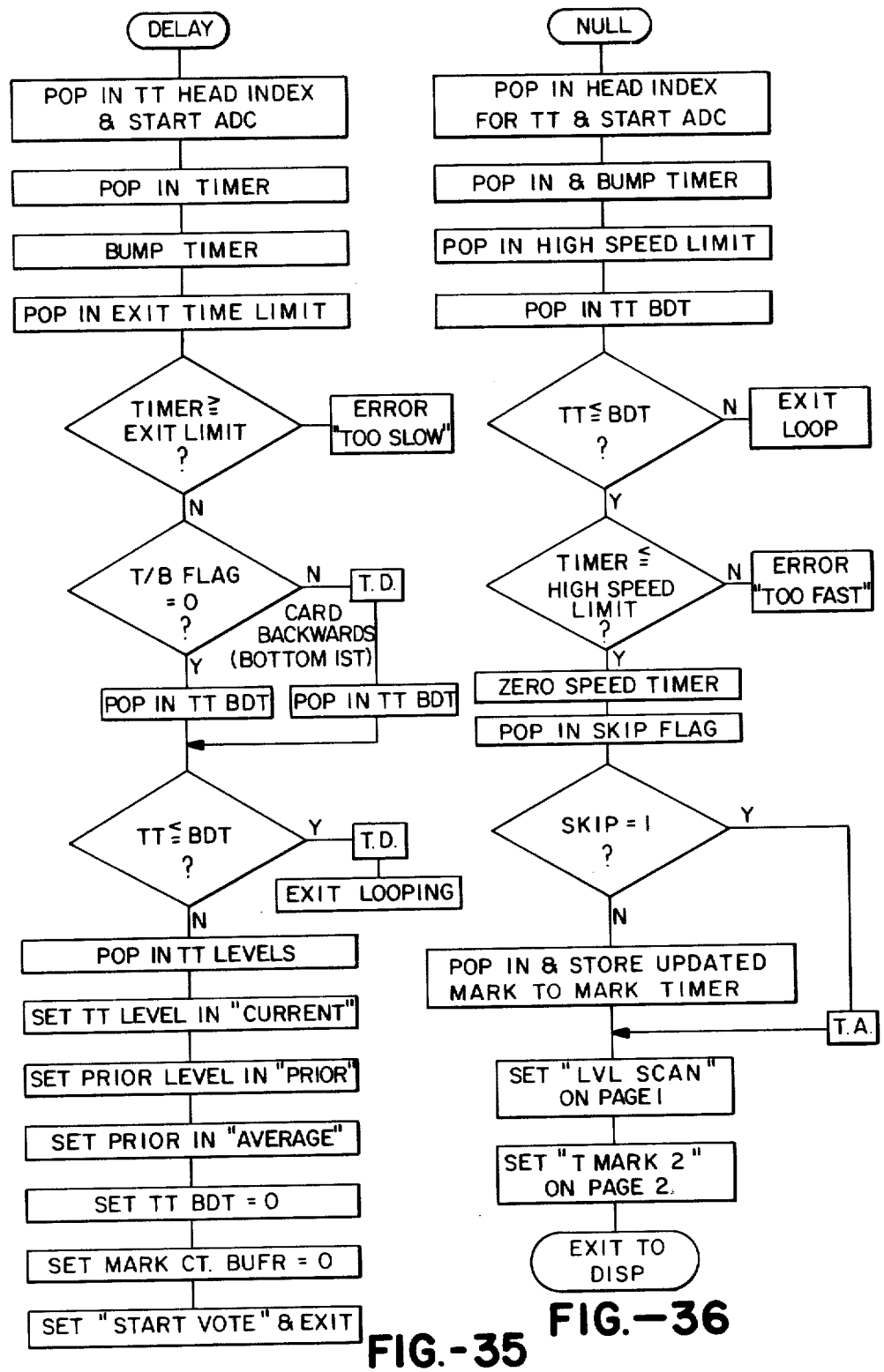

FIGS. 27–29 illustrate a software program flow chart for the ANALYSIS program page. As shown in FIG. 27, the program first bumps a timer for this page side and then pops in the value of ΔT1. Then the code limits calculated in the previous page are popped in and stored. Next the Code Bit analysis Routine shown in FIG. 28 is executed the first time to determine if the ΔT1 value corresponds to a "1" or "0" bit value. This is the first branching location in this routine. If the bit value detected is "0", the second timer value ΔT2 is popped in and the Code Bit Analysis Routine is executed again.

Since there are four possible orientations, there are four possible values for the two-bit orientation code. Depending on which of the four values is detected, the program will take one of four paths through the code with a branch at each location where the Code Bit Analysis Routine has been executed. After the Code Bit Analysis Routine is performed the second time, each of the four program code branches tests to see whether the code has been analyzed before by looking at a Code Done flag. If the Code Done flag has been set, this means that this page has executed before with respect to the orientation code scanned by the other read head array and the program branches to check the front-/back (F/B) and top/bottom (T/B) flags previously set to check whether the card orientation detected the second time is the same as that detected the first time through this program page. A example of one of the four compare routines is shown in FIG. 29.

If the Code Done flag is not set, the program sets that flag and then checks to see whether the data came from the lower or upper read head. Depending on which read head the data came from the F/B and T/B flags are set to a "1" or "0" bit value which captures the card orientation which is used in later pages to decide which read heads should be active during vote track and timing track scan and, of course, which heads should be active during the scanning of the skew detect section of the ballot card.

As previously noted when this analysis program page executes the first time it sets the "PRIME 1" program page on the dispatcher queue. When it executes a second time, it places the "NULL" page on the associated dispatcher queue.

NULL Program Page

This page is entered if card orientation is already known. This relatively simple program first bumps the timer for this page side twice, once for this page and once for the CREATE PARAM page in which the timer was not bumped and then checks the timer value against the timer limit constant to determine if the scanning detected the last orientation code mark on this side of the card too late to do an accurate levels setting in the next program page. Then this page selects one of four possible data stacks to carry the card orientation through succeeding pages with the data stacks chained. Exit is than made to PRIME 3.

PRIME 1 Program Page

This page is entered when the card orientation has been determined for the first time and will execute on the upper or lower dispatcher queue depending on which read head data was first analyzed in the ANALYSIS program. This page will be executed for one of the two card sides, and the NULL page executes for the other card side. Like the NULL page, one of four stacks is selected for card orientation, and this stack will be chained to one of four in succeeding pages. Four-way card entry is mediated by selecting one of these four stacks.

This page then primes data entities for both the top and bottom read head arrays, and affects the following data entities.

- Pointer to correct timing mark count in the timing track read stack (for correct card side)
- Pointer to the correct vote buffer in the vote read stack (for correct card side)

- Pointer to the correct vote read stack in the timing track exit stack (for correct card side)
- Flag for incrementing or decrementing vote buffer pointers.

PRIME 2 Page

This page completes the priming begun in PRIME 1. The selection of the correct read head stack in the PRIME 1 page selects which pair of read heads will be used to scan the vote tracks. The selection of read heads used to read the skew bar in these same tracks is being carried in the current stack being chained through this page into the BAR page to follow.

This page looks at one more parameter, the single/double sided card indicator. If a single sided card is being scanned, processing of BLK. DET. will be stuck on the other dispatcher queue waiting for the first orientation mark on that side. To prevent this, the program places the "END PROCESSING" page on that dispatcher queue and leaves that dispatcher queue in the current dispatch mode. When processing completes for the active card side, the other queue will have the END PROCESSING page on it, signalling processing complete for the whole card. If the system is reading a double sided card, this page takes no other action but exits to the PRIME 3 page.

PRIME 3 Page

Processing for each read head array converges here, and this page (FIG. 31) now captures background card levels for the correct tracks in preparation for detecting the skew bars. During the CREATE PARAM page, a constant was set for this page, defining a timer value representing the mid-point from the resync mark to the skew bars. This page loops on the dispatcher queue until this mid-point timer value is reached, and then it exits to the PRIME 6 page. Before the exit is made, this page checks two read heads using the same HEAD TEST ROUTINE first used in the BLK. THLD. page (FIG. 20).

This page loops and collects data samples until the timer runs out. It samples all three tracks and calculates interim thresholds of 50% of current data levels on every scan. These thresholds will be tightened to the 25% level in the SCAN page set on page 1 of the queue by the PRIME 6 page.

PRIME 6

This page (FIG. 32) executes the HEAD TEST ROUTINE on the timing track read head and exits with an error if a problem is found. This completes the operational checks on all the read heads to be used in the skew detect and vote scan processes to follow. This page explicitly starts the four-way dispatch mode and places the BAR page on dispatcher page 1 and places the SCAN page on page 2. Alternate dispatches will now take place between BAR and SCAN as shown in FIG. 30.

SCAN Page

This page executes for each read head array on one out of every four dispatches, and acquires data from one of three read heads on each execution, so its resolution is about 0.033 for each read head. This page will uses "ring" of three data stacks, with each of the three stacks pointing to one of the three "active" read heads. Therefore, the last background data samples will be from 0.011–0.033 inch before each skew bar and the last prior sample is used each time to calculate the BDT.

Referring now to FIG. 33, the SCAN program page begins with popping in the head index for the read head in the current data stack and then starting the analog to digital conversion process for that read head. The timer is bumped to keep track of time from the beginning of the leading edge of the resync mark. Next the prior level for this read head is popped in from the data stack for later use in the program. Following this the current head level is input from the converter and then stored. Black level for this head is then popped in from the data stack and a Δ is calculated as the difference between the prior level and the black level. The threshold increment is calculated by dividing the Δ by 2 and the BDT (BDT) for this read head is calculated by subtracting the threshold increment from the prior read head level. This value is then stored as a BDT (BDT) and then the program sets a new data stack pointer in the SCAN page on the queue for the next read head. Thereafter the page exits back to the dispatcher.

Control of replacement of this page on the dispatcher queue is taken care of by the BAR page which is currently executing in each of the upper and lower dispatcher queues.

BAR Page

This page (FIG. 34) digitizes and compares the outputs of all three read heads for the two vote tracks and the timing track with individual Black Detect Threshold (BDT) levels for each read head as calculated and updated by the SCAN page to find the leading edge of the skew mark for each track.

Each time a skew mark is found, the timer which has been running from the leading edge of the resync mark is stored for the appropriate track. The timer has been bumped during execution of every page, so it has a resolution of about 0.0055 inch. It should be understood that the timer could also be started at any convenient time after the resync mark and before the skew mark.

When at least one skew mark is found during execution of this page it kills the SCAN page on page 2 of the queue and replaces that page with itself. This page then gains control at the 0.0055 inch resolution value rate for purposes of more accurately finding the relative timing to the edges of the other two skew marks. With the SCAN page off the dispatcher queue, the last threshold levels calculated are frozen.

Referring now to FIG. 34, it will be seen that the BAR program page is a relatively complicated one and is one of the few program pages with a relatively large number of program jumps. The first time this page executes it will not find any stored timer values for the three skew marks, and it is unlikely to find any skew marks since execution begins about half-way between the leading edge of the resync mark and the skew bars as shown in FIG. 30. Only if the card were traveling much faster than normal would the BAR page detect any skew marks on its first execution. This could happen if the card were being pushed manually but this would be an extraordinary occurrence.

Accordingly, on the first page execution, the execution path is generally as follows. The head index and BDT for the vote track 1 (VT1) read head is popped in from the data stack, and the analog-to-digital conversion process is started. The timer is bumped and then the VT1 timer value is popped in from the data stack and checked for a stored (non-zero) value. Since there is no stored value, the data from the VT1 read head will be checked to see if it is less than or equal to the BDT for that read head. In this case it will not be, so the program will jump over to the path designated by the numeral (1).

In this path the next step is to pop in the head index and the BDT for the timing track read head and start the analog-to-digital conversion process. The timing track timer value is then popped in and checked for stored value. There will be no stored value, so the timing track data word will be looked at to see if it is less than or equal to the BDT for that read head. In this case, it will not be, so the program will jump to another execution path and pop in the head index and BDT for the VT2 read head and start the analog-to-digital conversion process. The VT2 timer value is popped in and checked for a stored value. In this case, there is no stored value so the VT2 read head output is compared with the BDT. The output will be above the BDT so the program will exit and loop on itself. This program path will continue to be executed until the first time that one of the read head output values is less than or equal to its particular BDT.

Referring to FIG. 30, for purposes of discussing an example, it will be assumed that the read head U4 associated with the first vote track, i.e. the VT1 read head, will first detect its skew mark, followed by the timing track and then the second head, will first detect its skew mark, followed by the timing track and then the second vote track VT2 scanned by read head U1. These vote track-read head assignments are arbitrary, but are carried into the scan and buffer vote page so that page processing skew will be about the same. As shown in FIG. 30, the skew relation between the read heads associated with these three tracks is indicated by the dashed lines at the lower right of the figure. These are superimposed for showing the spatial skew relationship therebetween. They also show the approximate width of the read head aperture relative to skew and timing mark width.

The BAR and SCAN pages will alternately execute on the dispatcher queue and, eventually, on one execution of the BAR page the test of the output of the VT1 read head will show that it is less than or equal to its BDT. At this point, the program continues executing through the vertical path at the left of FIG. 34 and the head index and BDT for the timing track (TT) is popped in from the stack followed by starting of the conversion process. Next the VT1 timer value is stored in the data stack and the TT timer value is popped in from the data stack. It is checked for stored value, and that test is negative so the timing track data word is brought in and checked whether it is less than or equal to its BDT. In this case, it is not, so the program will jump to the alternate path designated numeral 2 which is shown in the lower right-hand corner of FIG. 34.

The program continues execution by popping in the head U4 index and BDT for the VT2 read head and starting the conversion process. Another jump is made to an intermediate point in another program path and the VT2 timer value is popped in from the data stack. It is checked for a stored value which it does not have, so the VT2 data word is checked whether it is less than or equal to its BDT. The answer is NO, so the program jumps to an intermediate portion of another program path where the program pops past the exit pointer and kills the SCAN page on the dispatch queue and sets BAR in its place before exiting. The BAR program is now in both pages on the dispatcher queue and a single dispatch condition is implemented.

Two dispatches later, the BAR page for this read head array will again execute, and this time, it will find a stored timer value for the VT1 read head. The program condition is thus "already found 1" (AF1). The program thus jumps to a new execution path in which it pops in the head index and the BDT for the timing track and starts the conversion process for that head. The TT timer value is popped in and checked for stored value which it does not have. Accordingly, the timing track data word is checked for being less than or equal to its BDT and at this time that check is negative. The AF1 path again involves a program jump to a new execution path in which the head index and BDT for the VT2 read head is popped in from the data stack and the conversion process started. The VT2 timer value is popped in and checked for stored value which it does not have. The VT2 data word acquired is tested whether it is less than or equal to the BDT value which it is not so the program execution jumps through a timing adjust (TA) and loops in the single dispatch mode.

Two dispatches later the BAR page for this read head array executes again. Again the VT1 time value is found to be stored and the same program path is followed, but this time the timing track data word is found to be less than or equal to its BDT. At this point, the head index and BDT for the VT2 read head is popped in from the stack and the conversion process started. The timer value is now stored as the TT timer value and the VT2 timer value is popped in from the data stack and checked for stored value. It has no stored value at this time, so the VT2 data word is tested whether it is less than or equal to its BDT. The test is negative, so the program jumps through two timing adjust routines and then loops in the single dispatch mode.

Two dispatches later this BAR page executes again. This time both the VT1 timer and TT timer have stored values so the program follows the AF2 jump path pops in the head index and BDT for the VT2 read head and starts the conversion process. The VT2 timer is popped in and tested for stored value which it does not have. The program then jumps through a timing adjust back to the other execution path, tests the VT2 data word whether it is less than or equal to the BDT. This time it is not since the second vote track skew mark is not yet seen. After six more dispatches the VT2 skew mark is seen so the VT2 timer value is stored and the program loops on the single dispatch.

Two dispatches later the BAR page executes again and finds all three timer values stored so it follows the AF3 program jump to set the SKEW page on the dispatcher queue and exits to that page.

With this explanation, the other execution paths through the BAR page should be readily followed. Because of the complexity of this page some of the exits involve minor code length errors, that is in some cases the code is slightly longer than the preselected constant code length of 354T states. These minor errors are insignificant since they at most involve a few micro seconds of differential.

SKEW Page

This page obtains the stored timers from the previous page and calculates the skew delta of the two vote tracks relative to the timing track. These deltas are a direct measure of the skew in units of 0.0055 inch, and are stored permanently for use by subsequent pages. Exit is made to the SPEED page in single dispatch.

SPEED Page

This page checks the stored timer for the skew bar mark in the timing track against low speed and high speed limits set in the CREATE PARAM page. This ensures that the speed was fairly constant up to and including the skew bar. If the timer is outside these limits, an error is declared and exit is made.

New parameters are now calculated for speed limits, based on the timer value to the Skew bar in the timing track. Limits are 50 percent above and below the TT timer value found in the BAR page. This sort of parameter setting and checking will take place for the entire timing track and beyond so that a large [and] speed fluctuation cannot break the real-time program at any point. These first check speed parameters of *plus or minus* 50% are broader than later speed check parameters on timing marks that follow to allow a change in pitch (distance between marks) on the card at this point. After the skew bars, the pitch of the timing track marks may be four, five or six per inch. Exit is then made to the DELAY page.

DELAY Page

The preceding processing after the SKEW page exited has taken place while the skew bar has actually been present. This page delays until the skew mark in the timing track is over. It does a check to see if it is taking too long to find the end of this mark (user hanging onto the card), and makes an error exit if true. It uses the previous TT BDT to determine whether the mark is over and loops if it is not.

Once the mark is passed, this page primes the timing track low-pass filter cells for background level based on the known level just prior to the skew bar, and sets an initial TT BDT level of zero (completely insensitive). The Mark Count Buffer is zeroed. Exit is then made to the VOTE SET UP page.

VOTE SET UP Page

This page zeros the "Start Vote Scan Time" parameter and sets the dispatcher back to the double dispatch mode. It then sets the T. ST. DET. page as the queued page 1 and sets the NULL page as the queued page 2. Each of these two queued page positions will now execute a family of pages to accomplish the vote track scanning. The NULL page is set since before the first real timing mark there are no vote boxes. The "Start Vote Scan" parameter is set to zero to reflect this. At the top of the card, vote boxes could be processed, but at the bottom of the card this could not be done. The symmetry of the card (allowing input of either end) precludes starting vote boxes until after the first timing mark. Exit is now made to start the vote read process.

NULL Page

This page (FIG. 36) is one of a group of pages that are present on the page 1 position of the dispatcher queue and generally only scan the vote tracks with two exceptions. This group of pages, once placed on the queue, loop there forever until replaced by action of a page in the group of pages resident on page 2 of the queue and clocked by detected events on the timing track.

The two exceptions are this page, and the SCAN & BFR VOTE page that this page replaces in the no-vote-box case. These pages additionally look at the timing track for a leading edge, and in this instance exit in the same way as the T. ST. DET. page, i.e. they set T MARK 2 on the queue and exit. This is done in order to obtain a maximum resolution on detecting the timing track leading edge since all calculations on vote box placement (i.e. setting the data analysis window on stored data) are relative to this edge. Before these pages take this exit, a speed check is done to verify speed is within limits.

This page is also used to terminate a fold skip sequence so that the program can skip over locations of no vote boxes. Therefore, code relative to fold skipping is also present in this page. In particular, if a fold skip is under way, the mark-to-mark timer is not updated since a timer that spans several timing marks is needed as folds are skipped over.

Otherwise, like the T. ST. DET. page, the current mark-to-mark timer (speed) is saved and zeroed for the next mark. Exit is then made, setting LVL SCAN on page 1 of the queue and T MARK 2 on page 2 of the queue. Of course, if the T. ST. DET. page finds the timing mark first, it replaces this page with the LVL SCAN page.

LVL Scan

This page (FIG. 37) executes in looping fashion during scanning of the timing mark. The purpose of this page is to determine the maximum background white level present in each blank region of the voting track during the timing mark. This white level, and a succeeding one on the other side of a vote box (candidate mark region) will be used to calculate a vote mark detect threshold for analysis of stored data.

Previously, the initial value of the white level cell for each vote track was zeroed, and this page merely replaces this value with the maximum value it finds. This approach makes vote mark threshold setting tolerant of marks extraneous to the vote box during the timing mark. All the program needs is at least one sample of proper background level. In another program page this level will be checked using the HEAD TEST ROUTINE to detect either head failure or someone marking this whole area on the card solid black. The black levels for the VT1 and VT2 read heads are poped in and stored to be available for the HEAD TEST ROUTINE.

The T. END DET. page replaces this page with the SCAN & BFR VOTE page when it finds the end of the timing mark.

SCAN & BFR VOTE Page

This page (FIG. 38) executes when a candidate vote mark region is being scanned between successive timing marks. Its purpose is to digitize and store samples of the two vote tracks between the timing marks for later analysis to determine whether a vote was present in the candidate vote mark region. This [is] done a vote data analysis window will be calculated and positioned depending on card speed which will be known at the leading edge of the next timing mark. Also the vote mark threshold determination will be calculated as a function of the maximum white background level on both sides of the candidate vote mark region. The latter of the two white levels will be acquired by the LVL SCAN page during scanning of the next timing mark.

As will be discussed below, while the data in the two vote tracks is being acquired and stored by this page running on page 1 of the queue, data previously acquired and stored in the prior scan subinterval between timing marks is being analyzed by other program pages running on page 2 of the queue.

It is therefore necessary to buffer vote track data while simultaneously analyzing data previously buffered. Buffer pointers exist which are swapped by another page so that there is always a "current" buffer pointer, and a "previous" pointer. This page selects the current buffer pointer for each track and loads it to the stack pointer register. In this way, the number of samples stored is always reflected in the advanced pointer regardless of card speed. A check is also made to see if the end of the buffer is reached, and if it is, an error exit is taken since the card is moving too slowly. This is done on one of the two vote track buffers since they are the same length and are always stored together.

Referring now to the flow chart of FIG. 38, this page begins its execution by popping in the timing track head index and starting the conversion process for the output signal from that head. Then the mark-to-mark timer is popped in and bumped. Next the buffer pointer for the VT2 read head is popped in followed by popping in of the BDT for the timing track.

The program then checks the timing track data output to determine whether it is less than or equal to its BDT. If the test is affirmative, a timing mark has been detected by this page and the program pops in the mark-to-mark timer and zeroes it. The program then pops in the high speed limit and tests to see whether the timer is less than the high speed limit. If it is, a too fast error is declared. If it is not, the timing track exit stack is popped in the mark-to-mark timer is popped in and saved and a special time exit to a location in the T. ST. DET. program page is jumped to. This special exit sets the LVL SCAN page on page 1 of the queue and sets the T MARK 2 page on page 2 of the queue before exiting.

If the timing mark is not found, the program pops in the head indices for the tracks VT1 and VT2 and starts the conversion process for VT1. The pointer for the next VT1 memory cell is obtained and the VT1 data is input from the converter and stored in that cell. Next the TB flag is checked to see whether the card entered bottom or top first. If it entered top first then VT1 pointer is incremented and if it entered bottom first the VT1 pointer is decremented. Following this incrementing or decrementing of the pointer, the pointer is stored and then the conversion process for the VT2 read head is started. An END OF BUFFER check is then made and a too slow speed error is declared if the END OF BUFFER has been reached. If the END OF BUFFER has not been reached, the page obtains the pointer for the next VT2 memory cell and then inputs and stores the VT2 data in that cell. Following this the TB flag is again checked to either increment or decrement the VT2 pointer and then store it before exiting with a loop exit.

T. ST. DET. Page

This page (FIG. 39) is one of a family that execute in sequence on page 2 of the queue to control the collection and analysis of data gathered by the pages on page 1 and page 2 of the queue. The main vote track scan process is entered by execution of this page initially. The basic function of this page is to detect the leading edge of each timing mark. In addition speed parameters are used by this page to check if the timing mark arrived too late or too early, and an error exit is taken if the card speed is outside the low and high speed limits. The speed parameters are set as a function of the previous mark-to-mark speed timer value found between a previous timing mark pair. This allows this page to be relatively sensitive to intolerable changes in card speed caused, for example, by card jam, motor failure or the user hanging onto the card.

The threshold levels used to find the timing mark are recalculated in this page if a timing mark is not found, and then the page loops on the page 2 queue. The digital low-pass filter routine is used to set an average background word value and the BDT is updated with a newly calculated value. Additionally, a check is made to ensure that the timing track read head operation is satisfactory, using the HEAD CHECK ROUTINE (FIG. 20). Since this page may be involved in a fold skip, the mark-to-mark timer is not updated if a fold skip is under way.

T MARK 2 Page

This page (FIG. 40) completes the processing resulting from finding a timing mark leading edge. Three possible exits are taken from this page depending on the timing mark count. The page first increments the timing mark count (having just encountered a new timing mark), and checks to see if this mark is associated with one of two permissible folds in the card, or if this is the last timing mark on the card. If neither is true, processing of the vote tracks continues, and the program advances the vote buffer pointers to the next available group of cells to buffer the actual vote data from each vote track. Exit is then made to set the CALC. WINDOW page as page 2 on the queue. The timing mark is now present and several additional pages will be executed before a program page is set to begin to look for the timing mark trailing edge.

If a skip over a fold begins at this timing mark, the program indicates this to other pages by setting the skip flag and calculates the skip distance from the previous mark-to-mark timer value (speed). This distance is a mark and a half. The program therefore skips to the next timing mark (no vote boxes to this point) where the fold is, then halfway to the next mark after the fold, and processing resumes to find the next timing mark and begin processing the vote tracks again. The program exits to the CALC SKIP page to calculate limit parameters after the fold skip.

If this is the last timing mark on the card, the program exits from the pages involved in scan subintervals and sets the TRAILER page on the queue. This TRAILER page is set as page 2 on the queue, and the page 1 is killed so single dispatch mode processing begins.

CALC. WINDOW Page

This page (FIG. 41) calculates parameters to be used in other program pages. The vote box (candidate mark region) begins and ends at certain fractions of the distance from the last timing mark leading edge to the next. Rather than multiply this fraction, a product table is addressed by the mark-to-mark distance and gives the window start and stop distances. The distance to the point that the SCAN & BFR vote page began (i.e. the trailing edge of the timing mark stored in the VOTE SCAN TIMER) is subtracted from the window start and stop distances, resulting in the Data Window Start and Stop distances.

If the result for the Data Window Start distance is negative, a speed change has placed the candidate vote region ahead of start of SCAN & BFR vote page execution so an error is declared and an exit is taken.

Based on the previous mark-to-mark time, speed limits are calculated for the next expected timing mark, and these numbers are stored for use by the T. ST. DET. page. This page then exits to set the SKEW WINDOW page on the queue.

SKEW WINDOW Page

The previously detected skew due to skew present in read head placement is applied to the Data Window start and stop locations. Skew is stored as a plus or minus number or zero, and is simply added to the window start and stop values. If the number resulting is negative, the program substitutes zero since there are no negative sample locations. A negative location would involve skewing the window into a region where no vote track samples were taken.

The Data Window start and stop values are initially in terms of speed at 0.0055 inch resolution. The samples are taken at 0.011 inch, so the window values are divided by two to index them into the stored vote track memory sample space. Rounding is performed so as to stay within the candidate mark region, i.e., round up at the start of the box and round down at the end of the box. Exit is then made to the SWAP page set on the page 2 queue. A specific example of the operation of the CALC WINDOW and SKEW Window pages will be given below.

SWAP Page

At this time, no samples are being taken, and no samples are being analyzed. Instead, a buffer full of vote track data samples is waiting to be analyzed, and another buffer has previously been analyzed. In this page, the raw vote track data buffer pointers are swapped to set a new buffer free for vote track data storage.

Associated with the buffer is a pointer to the current free data cell. Since this buffer is one previously analyzed, this pointer is somewhere deep in the buffer. The program re-initialize this pointer to the start or end of the buffer depending on the content of the T/B flag so that new data will enter the correct buffer location. Exit is then made to set the T. END DET. page on the queue.

T. END DET. Page

This page (FIG. 43) loops on page 2 of the queue until the trailing edge of the timing mark is found, using the BDT previously used in T. ST. DET. to find the leading edge. Coarse assembly speed limits are first applied to make sure the timing mark ends within the low speed limit (high timer value).

The "start vote scan" timer value is now stored. This is the current timer value for this page plus one. The increment is applied since the first vote track sample will be obtained on the next scan cycle in the vote track scan page which is placed on page 1 of the queue by this page at the time it exits.

At exit time, this page also places the THLD page on page 2 of the queue.

THLD Page

This page starts by examining the skip flag. If the skip-flag is set, current and previous white levels are obtained from previous and yet more previous cells since the white levels for active candidate vote regions are split by the fold in the card itself.

Now that the timing mark is over, the background level in the vote tracks has been stored. This level, along with the previous level for the previous timing mark bound the candidate mark region. The threshold level for the mark detection in the candidate vote mark region will be a certain percentage (taken from a fractional multiplication table built from the on-board switches at initialization time) of the average of the two background levels found in LVL SCAN less the known black level for this track. This threshold is stored for use by the SEARCH page.

The HEAD CHECK ROUTINE is executed to determine that the read head for this track is still O.K. If it is not, data from the vote track is suspect since the read head may have failed, and an error exit is taken. Vote track read heads are therefore checked during each scan subinterval.

The previous level is checked for zero value. If it is zero, there was no vote box to look at (start of card) and exit will be made back to the T. ST. DET. page. Current and previous white levels will be advanced at this point since the program does not go through the SEARCH page which normally does this task.

This page exits through chained data stacks back to itself once to calculate the threshold for the second vote track data. After second execution, this page exits to the PARAM page.

PARAM Page

This page rectifies the data analysis window start and stop parameters to the manner in which the vote mark search will take place. The start parameter will be used to adjust the buffer start pointer to point to the first data sample within the data analysis window. The stop parameter minus the start parameter will produce a count of samples within the window sample space. The end parameter is checked to be within the sample space as has the start parameter been checked previously. Like the start parameter, if the stop parameter is outside the sample space, it is reflected back in so the skew cannot take the program outside the data samples actually taken and stored.

This page will place the SEARCH page on page 2 of the queue and exit. When the SEARCH page has looped enough times to complete search through data for one vote track, it will chain through the data stacks back to this page to set up parameters for the second track. Upon second exit of the SEARCH page, control will chain back to the T. ST. DET. page in time for it to obtain levels and thresholds for detecting the leading edge of the next timing mark.

SEARCH Page

This page (FIG. 45) searches the stored vote track data for votes. It uses search and threshold parameters set up for it in previous pages. It uses the "previous" buffer pointer to get to vote track data since a "current" track is at this moment being digitized and stored.

The program examines seven vote data cells for votes during each execution of the page and if there are more vote data cells to look at this page loops after storing its pointers. If a vote is found in the last three cells on this page, this page sets the parameters to the end of the scan (count=0) to force exit on the next page execution. This is done since the end of page overhead doesn't give time to permit exit to the next page. This page registers a vote and exits on the first data cell, if any, that breaks the vote threshold. If no data cells meet the criterion to the end of the scanned data there is no vote mark detected. The final exit is to the PARAM page for vote track 2 if that track has not been searched or to T. ST. DET. if the second vote track data has already been searched. Before exit the current white level buffer is zeroed and the "current" value is tabled in the "previous" cell.

SKIP PARAM Page

This page (FIG. 46) sets the parameters for speed limits after the fold skip, and then exits to the SKIP MK. DET. Page.

SKIP MK. DET. Page

This special page (FIG. 47) simply waits for the timing mark to be over in order to wait for the right one to come up again. A check is made whether mark terminates on time. Once the end of the timing mark is seen, exit is made to the SKIP THLD. page.

SKIP THLD. Page

This page (FIG. 48) pushes current and previous vote track background white levels one deeper into cells to account for the extra timing mark introduced by the fold skip. The HEAD TEST ROUTINE is executed on the latest background level word. Then the page exits to the SKIP MARK page if the read head is O.K.

SKIP MARK Page

This special skip exit from the T MARK 2 page sets the NULL page on the Page 1 queue, so that page is not acquiring vote track data. The SKIP MARK page does nothing but loop until the skip distance timer set by the T MARK 2 page times out. At timer runout, this page resets the NULL page as page 1 and sets the T. ST. DET. page as page 2 to start processing the active region of the vote card again.

TRAILER SKIP Page

This page simply delays in single dispatch on page 1 of the queue until the end of the last timing mark is detected. Coarse limits with error exits are provided to check on card speed. These error exits as well as all others in this program are present primarily to avoid a stuck page on the queues.

Upon exit, the page dispatches to the LVL. SCAN page with a special set of chained data stacks for it so it and other pages to follow will accomplish trailer label decode. This exit is accomplished through the TRAILER 2 page.

TRAILER 2 Page

This page sets parameter for the BLK. THLD. page to exit on the timer run out then sets up four-way dispatch to the BLK. THLD. page.

Chained data stacks will force execution of the following pages in a manner similar to the page execution sequence for the card header on the opposite end of the card shown in FIGS. 15 and 16:
- BLK. THLD.
- BLK. DET.
- SKIP
- END CODE
- CREATE PARAM At the end of this page execution sequence the election codes track buffers are complete with up to eight data bits and the parameters to decode them are calculated. The last page, through the chained data stack, exits in single dispatch mode to the END PROC. page.

END PROC. Page

This page loops endlessly on the page 1 queue until it finds its companion page on the page 1 queue for the other read head array. This delays until both sides of the card are complete. When the upper and lower dispatcher queues both contain this page, the program exits to go count the votes.

Release Vote Buffers, Decode Codes Tracks

Real time processing is over at this point. The program now decodes the election codes tracks, and verifies the orientation codes from the last header of the card seen by the read heads. Errors are declared if the election code is wrong or the orientation codes don't compare. The votes are now counted, and the processor diverts the card to the proper location. Then the processor retracts the locking pin and returns to the IDLE LOOP to await the next card.

Example of Page Execution Sequence

Referring now to FIG. 49 a typical sequence of pages executed on one of the upper or lower dispatcher queues for each scan subinterval is illustrated. The sequence of pages is shown superimposed on a typical scan subinterval between timing marks TM1 and TM2. A candidate vote box CV1 is also illustrated. A scan subinterval comprises the distance between the TM1 leading edge and the TM2 leading edge. As the read heads approach the TM1 leading edge, the T. ST. DET. (timing start detect) page is executing on page 2 of the dispatcher queue and the NULL page or SCAN & BFR. VOTE is executing on page 1 of the dispatcher queue. If this is the first timing mark on the card to have a candidate vote region associated with it the NULL page is page 1 on the queue. In this case the SCAN & BFR.page finds the leading edge of the timing mark and sets the LVL SCAN page on page 1 of the dispatcher queue and the T MARK 2 page on page 2 of the dispatcher queue.

The next three pages executing on page 2 of the dispatcher are the calculate window, skew window and swap pages which set the data analysis window for the vote buffer associated with the prior scan subinterval and then swap the vote buffer so that the data analysis window which has been calculated and skewed is applied to the appropriate candidate words stored from the prior candidate vote mark region. Referring now to FIGS. 30 and 50A–50C, an example of the detection of skew and applying of the detected skew as well as speed to calculation and skew of the data analysis window will be discussed.

FIG. 50A illustrates the data gathered by the processor while scanning from the resync mark leading edge to the detection of the skew bars for the heads U3, U4 and U1 which are the active read heads in the upper read head array assuming that the card has come in with side 2 down and the bottom end in first as discussed in connection with FIGS. 15 and 16. FIG. 50A shows that the resync mark leading edge is found by the read head U5 at mark count zero (the mark-to-mark timer count having been reset by the BLK. DET. page when it detects the resync mark leading edge). The SKIP page then continues to look at the output of head U5 until it finds the resync mark trailing edge after which the END CODE, CREATE PARAM, ANALYSIS, and other following pages are executed as shown in FIG. 30 until the SCAN and BAR pages are set on the dispatcher queue.

At this point head U3 along with head U4 and U1 become active and the processor acquires data for these heads initially for every two mark-to-mark timer counts since the mark-to-mark timer is being bumped in both the SCAN and BAR pages. It will be remembered that only the BAR page is looking at the output of the U3, U4, U1 read heads. At mark-to-mark timer count 43, the BAR page finds the skew mark for read head U4 and begins to execute in single dispatch mode so that samples for read heads U3 and U1 are taken on every mark-to-mark timer count. The BAR page executes two more times and then finds the head U3 skew mark, after which it executes four more times and then finds the read head U1 skew mark.

In the SKEW page which is then set on the dispatcher queue the skew of the U4 read head is calculated with respect to the timing track read head U3 as a minus two skew and the skew of the read head U1 with respect to the timing track read head U3 is calculated as a plus four. These skew values are stored for later use by the SKEW WINDOW page. Note that the skew values for the read heads are stored in units of mark-to-mark timer counts. Later the window will be calculated and skewed utilizing mark-to-mark timer counts and then divided by two to set the data analysis window for the candidate vote words which are accumulated every other mark-to-mark timer count by the SCAN & BFR. VOTE page as shown in FIG. 49.

Referring now to FIG. 50B, an example of the calculation and skew of the data analysis window as well as the calculation of threshold parameters and search for votes in the vote buffer will be discussed under conditions where the card speed is not changed and the read head outputs, i.e. background data words are at about the same level as during the scan of the skew pattern shown in FIG. 50A. In other words, nothing has changed dramatically in terms of the card background, the read head gain or the card speed. The timing mark leading edge is detected and the mark-to-mark timer count set to zero when the processor sees that the output of head U3 fallen below its BDT. Later, at mark-to-mark timer count 12, the trailing edge of the timing mark is detected and this begins the candidate word storage interval during which the SCAN & BFR. VOTE page is acquiring and storing candidate vote words every other mark-to-mark timer count. A total of sixteen such candidate words are acquired and stored and then the SCAN & BFR. VOTE page detects the next timing mark leading edge at mark-to-mark timer count 45. Accordingly, sixteen candidate vote words are stored in a buffer to be analyzed during the next scan subinterval.

During the scan of the timing mark in the next scan subinterval, the data analysis window for the just previously stored candidate vote words is calculated and then skewed. The window size is calculated based on the card speed measured in terms of the mark-to-mark timer counts between timing mark leading edges. In this case the exact same timing mark count is accumulated as was accumulated between the resync mark and the skew bar mark for the timing mark read head U3.

In the CALC. WINDOW page shown in FIG. 41, the size and placement of a normal data analysis window, i.e. one that would be utilized if there were no skew between the respective read heads is calculated.

The stored mark-to-mark timer value of 45 is utilized to look up in a table window start and window stop values. In this case those values are 18 and 38, respectively, as shown in FIG. 50B. Since these numbers need to be translated to candidate word samples eventually for setting a data analysis window, the Start Vote Scan timer value stored by the T. END DET. page is obtained and subtracted from the window start and window stop values. In this case the Start Vote Scan timer value is 12 and the subtraction gives the values 6 and 26 for the data window start and stop points in mark-to-mark timer counts.

The actual skewing of the window is accomplished in the SKEW page shown in FIG. 42. As previously noted the skew for head U4 is minus two so this minus two value is added to the 6 and 26 values, leaving 4 and 24 as the data window stop and start points. When divided by two, the start and stop values become 2 and 12. Similarly, the plus 4 skew is applied for read head U1 giving the data analysis window start and stop points of 10 and 30 which, divided by 2 give the values 5 and 15. This completes the skewing of the calculated window and sets the data analysis parameters for the SEARCH page.

The two threshold pages which execute after the T END DET. page set the thresholds for vote track 1 and vote track 2 read heads, i.e. read heads U4 and U1, utilizing the whitest level found during the timing mark by the execution of the LVL. SCAN page, taking an average of those two white levels and then using that average level to address a multiplier table set in to the memory from manual switches upon initialization of the program. The PARAM page then executes as previously described to set up the actual parameters for searching the data words in the skewed data analysis window. Then the SEARCH page is executed and looks at each data sample within the skewed windows for each vote track to determine whether there is a mark or not. As can be seen from FIG. 50B, an extraneous mark ahead of the skewed data analysis window exists for the read head U1 but is not counted as a vote because it is outside of the skewed window area. No vote is found for the vote track associated with read head U4 since none of the data analysis points within the skewed window breaks the vote threshold.

Referring now to FIG. 50C, it can be seen that the mark-to-mark timer count between the successive timing mark leading edges in this case is 53 counts. This is substantially greater than the 45 counts previously found and means that the card has slowed down. The CALC. WINDOW page utilizes the stored mark-to-mark timer count value 53 to address a table to find a normal window start of 24 and a normal window stop of 46. The sample start count is 16 so the normal data analysis window in mark-to-mark timer counts is 8 and 30 respectively. In the SKEW page the minus 2 skew value is added to the normal window to obtain the skewed window for read head U4 and the plus 4 skew is added to the window start and stop values for the read head U1. Accordingly, the skewed window for read head U4 starts at 6 and ends at 28. When this is divided by 2 the start and stop points become 3 and 14 respectively. For the read head U1, skewed window start and stop points are 12 and 34 which when divided by 2 produce the values 6 and 17. These skewed windows are shown in FIG. 50C and form the data analysis window for the stored candidate vote samples for that scan subinterval.

FIG. 50C also shows the effect of changes in the background data from the read heads U1, U4 and U3. The output from U3 has generally dropped and the BDT calculated on a low-pass filter basis tracks the changes in the background word values. Similarly the output of head U4 has generally increased and the output of head U1 is generally decreased so that corresponding changes in the calculated vote threshold are applied. FIG. 50C illustrates that the effect of the skewed windows for read head U4 is to detect a vote mark which would not have been detected if a normal window were applied. Similarly, at the right extreme of the data analyzed with respect to read head U1, a mark is detected which would not have been detected within the normal window.

It should be understood that it would also be possible to calculate and skew a data analysis window during a timing mark and also set up threshold and other parameter values during that timing mark by limiting the number of LVL. SCAN pages executed and then registering a vote within the data analysis window as the SCAN & BFR. VOTE pages execute by only looking at candidate words obtained in SCAN & BUFFER vote pages which fall within the previously calculated data analysis window. Such an approach would be as accurate as storing all the candidate words from the vote tracks so long as substantial variations in card speed and background levels did not occur from one scan subinterval to the next.

Program Memory Organization

The mark-sense ballot counter system software resides in program memory 185, and the removable memory module 200 contains election card definitions and RAM memory for vote totals. Additional RAM memory 190 is provided to support the reading process. The memory layout is shown in Table 1 below.

TABLE 1

| MEMORY LOCATION (HEX) | MEMORY TYPE | DATA STORED |
| --- | --- | --- |
| 0000 - 3FFF | (16K EPROM) | Card reading Firmware program, vote tabulation, etc. |
| 4000 - 47FF | (2K, RAM) | Volatile data area for the card reading process (data stacks for program pages) |
| 8000 - DFFF | (24K, EPROM) | Ballot card definitions |
| E000 - EBFF | (3K RAM, battery supported) | Vote counters, non-volatile data areas |

Notice that the memory from 8000 - EBFF resides in the removable memory module 200, and that through pin definitions, the addresses have been changed. The removable memory module supports EPROM of either the 2716 or 2732 type (2K×8 or 4K×8) through a jumper option, and only that amount of EPROM must be present to support elections as long as the memory is contiguous upward from address 8000.

When the processor accesses addresses in the removable memory module 200, a wait state is generated to allow the processor to read and write the slightly slower RAM. As long as the processor is addressing memory 185 and 190, it runs at full speed. Since speed is paramount during the card reading process, the data areas for this process reside in RAM memory 190.

Initializing the Removable Memory Module 200

When a new memory module 200 is introduced into the system, its RAM memory can be in any state and it must be initialized to run in the system.

This is also necessary since the power-fail detection, automatic restart logic depends on data stored in the removable RAM. If the RAM has never previously been formatted, the automatic restart process is undefined.

Automatic Formatting of Removable Memory

Assuming a new memory module 200 has been introduced into the system, the formatting process is automatic. Upon power-up, the processor looks for a special bit pattern in the removable RAM. Since this is a new memory module, this bit pattern will not be present. The processor automatically formats the new memory module and writes this special bit pattern into it so the automatic format will not be done again. The result of the formatting process is to leave the memory module in a defined state so that the power-down restart logic will now work properly. Upon the next power-up with this memory module, the system will discover that the memory module has been formatted, and it will come up through the automatic restart logic. Part of the formatting process above is to configure the card reader to expect a particular card type, namely the system control card. At this point in the process, the control card is the only card that the system is capable of reading. The control card definition is controlled through assembly parameters in the main firmware program, and can be changed only by redefining these assembly parameters and reassembling the program.

Configuring the System for Ballot Counting

A control card is used to configure the system to accept ballot cards of a particular type, and for certain other parameters concerning the election. After automatic formatting of the memory module above, the control card is the only card the system can read. At this time the control card can be entered, and upon acceptance of the control card, the system is configured to the new ballot card type as defined by the control card. This configuration information is permanently stored in the memory module, and does not have to be entered again.

In fact, unless the control card has the same physical parameters as the new ballot card definition, the control card cannot be re-entered without special action from the control keypad.

All subsequent operations using this memory module will assume the new ballot card configuration. When the control card is processed and configuration is complete, the system printer will print: CONTROLARD ACCEPTED/.

At this point, the system is ready to be prepared for elections. The sign on messages may warn of memory check sum errors since a new memory module has been prepared. To prepare for the election, the vote totals memory must be cleared from the keypad, and this will clear check sum errors. The control card function will be discussed in more detail below.

Power-Up

Upon initial power-up, the ballot counter initializes all I/O ports, initializes all on-board memory and displays the following in the front panel public counter:
CESI It next performs a test of the RAM memory, both on the main board and on the removable memory module. Bit patterns are written and read for the entire memory, and then the original contents restored. The removable RAM memory is also sized at this time. That portion of the removable RAM memory module containing the vote counters is checksummed, and the checksum is compared with that stored last to guarantee integrity of the stored vote totals. If everything is proper at this time the printer will print the following message:

CITY OF DENVER
PBC/X V1.4.228
------------------

RAM TEST FOR
4000H TO 47FFH
NO ERRORS
RAM TEST FOR
EOOOH TO EBFFH
NO ERRORS

If the RAM test fails, it will print the failure location along with the bit pattern written and read as follows:

RAM TEST FOR
4000H TO 47FFH
NO ERRORS
RAM TEST FOR
EOOOH TO 3BFFH
RAM FAILURE
EO7FH WR:00H RD:FFH
------------------

If the checksum test fails, it prints a warning as follows:

CITY OF DENVER
PBC/X V1.4.228
------------------

RAM TEST FOR
4000H TO 47FFH
NO ERRORS
RAM TEST FOR
E000H TO EBFFH
NO ERRORS
------------------
ERROR WARNING
MEMORY CHECKSUM

The memory checksum test is also performed every time the totals are updated in the memory module, and upon error, the warning message would appear.

If the tests are all properly passed, the ballot counter is idle and ready to accept cards.

Power Fail Detection and Recovery

At all times when the system is powered-up, control passes through the power fail detection and recovery logic. As discussed above, the special case of an unformatted memory module caused the power-up logic to not attempt automatic power-fail recovery, but instead to format the memory module. In the case of the system powered down while idle, the power-fail restart logic is also skipped and the system is brought up as normally configured in the memory module. In all other cases, wherein a card scan was in process by the system, the automatic restart logic is invoked.

Before 5 volts begins to fail on the electronics, power fail detection causes an RST 7.5 interrupt. The processor saves the current program counter and processor context and then halts. Software in the startup procedure looks at this saved data and may use it to resume operation. If it does this, it clears a software counter to allow more interrupts, otherwise one interrupt is all that is allowed. Interrupts occurring while the machine is initializing itself are ignored.

If the power down happened before the reader detected the card, or completely read the card, the card is ejected back to the user upon power-up with the message: REENTERARD UNCOUNTED/

If the power-down occurred after the card has been read and the vote counters are affected, the interrupted context is restored and control is returned to exactly the point processing was interrupted.

Processing then, resumes from this interrupted point, and the vote tally is completed, the card is routed to the proper bin, and the system returns to idle to await the next card.

Exception Conditions—Card Jams

At all times, the system follows a card from entry to exit. It verifies that the card takes the proper exit path. If a card has been seen to enter but does not take the proper exit within two seconds of when it should arrive, the exception condition of a card jam is detected by the system. The machine is halted, the beep tone is sounded four times followed by a ten second delay to scan the keypad. The printer will then print the "clear paper path" message.

To clear the error, the "reset" key may be pressed once during the silent period of the beeper. This turns off the beeper and returns the system to the idle state. The card jam is then cleared by opening the paper transport mechanism and extracting the card. Pressing the "reset" key a second time will operate the paper transport mechanism for three seconds to eject the card from the front of the machine. This may clear the card out of the machine, but it is more likely that the card must be removed manually. Depending on the state of processing of the card at the time the jam occurred, the card may have already been counted or it may need to be re-entered. This state is called out in a printer message at the time the card jam alert is printed.

If the card is not detected leaving the reader after the card has been processed, the following message is printed:

CARD INSIDE RDR 09-06
CLEAR PAPER PATH
CARD PROCESSED
------------------

Notice that the message indicates that the card has been processed. The card must not be re-entered, but manually placed in the bin with the counted cards.

If the card has not yet been fully processed and doesn't leave the reader, then the error message might be:

MISREAD REENTER 01-05
CARD INSIDE RDR 09-05
CLEAR PAPER PATH
RE-ENTER CARD
------------------

In this case, the card must be re-processed through the reader since it has not yet been counted.

Pushbottom Interface

The system is equipped with a 12-key keypad which is used to control the system to execute prearranged functions.

System Error Messages and Error Statistics

Throughout the card reading program, errors may occur that preclude the accurate reading of the ballot card. As an example, the user might hold onto the card causing a break in the timing track processing (i.e. speed error). In the case of any error, exit is made immediately to process the error and no votes on the ballot are used. If the system is configured to reject the ballots in error, the ballot is returned to the user and a message is printed. Otherwise the ballot is placed in the reject bag, and not counted. In the latter case a message may not be printed unless the error is serious. A message is printed in the following format:

MISREAD, REENTER 00-02 where the first two digits are the error code byte and the second two the error state byte.

The "STATE" byte represents the state of processing when the error occurred. The states are as follows:

```
STATE = 0 IDLE
        1 EDGE DETECT, ISTAK UNSAFE
        2 SETTING UP READ, ISTAK UNSAFE
        3 READING VOTES, ISTAK UNSAFE
        4 COUNTING VOTES
        5 WAITING FOR CARD TO APPEAR AT EXIT
        6 WAITING FOR CARD TO EXIT
        7 POST-PROCESSING
```

Table 2 shows all the possible error messages and their meanings, along with the disposition of the ballot in the various configurations and the collection of statistics.

Two other categories are present in the error statistics printed during vote totals.
- WRITE-IN CARDS
- OVERVOTE REJECTS The write-in cards are always bagged for further processing. The overvoted cards may optionally be counted or rejected back to the user. If the system is configured to reject overvotes, then this category is present in the statistics, and the card is rejected to the user with the message on the printer: OVERVOTE REENTERARD/.

Specification of the Codes Tracks

The orientation and election codes have four possible values as shown in FIG. 51. The circled numbers are the two binary bits as evaluated by the card-reading program. When the distance between leading edges of the marks equals 0.125 inch, the number is zero, and when the distance is 0.1815 inch, the number is a one. The next mark is for resynchronization, and the next is the skew bar. The timing track begins at the skew bar.

The orientation codes are as fixed above. Notice that when reading from the bottom of the card, the order of the bits in the orientation code are as read from the bottom of the card. The bits for the four orientation are as follows:

| Front-Top | 00 |
| Front-Bottom | 01 |
| Back-Bottom | 10 |
| Back-Top | 11 |

Reading any one of the orientation tracks is sufficient to orient the card, and the others are decoded to check that the orientation is correct.

Once the orientation is known, the election code tracks can be considered as fixed relative to card orientation, and can be transformed relative to card entry, just as the vote tracks can be. Therefore, to construct the election code tracks, the bits in the code are considered to be read from top to bottom of a normally oriented card. (Unlike the orientation code which is read from the bottom of the card on the bottom end).

The bit position definitions of the election code tracks then are as shown in FIG. 7. These bits are stored in the

TABLE 2

| ERROR CODE | MEANING | PRINTED ON ERROR | STATISTICS |
|---|---|---|---|
| 00 | Speed too Slow, Orientation Mark (during read) | *Misread, Reenter 00-XX | Speed Err, User |
| 01 | Speed too Slow, Timing Track | *Misread, Reenter 01-XX | Speed Err, User |
| 02 | Speed too Fast, Timing Track | *Misread, Reenter 02-XX | Speed Err, User |
| 03 | Speed too Slow, Orientation Mark (during decode) | *Misread, Reenter 03-XX | Speed Err, User |
| 04 | Speed too Fast, Orientation Mark (during decode) | *Misread, Reenter 04-XX | Speed Err, User |
| 05 | Orientation Marks each Side of Card Don't Agree | *Misread, Reenter 05-XX | Speed Err, Codes |
| 06 | A/D Process Bad, Conversion Complete Signal Inop. | Read Head Check 06-XX | Read Head Failure |
| 07 | Deadman Timer Runout | Card Inside RDR 07-XX | Motor, Stuck Card** |
| 08 | Card exiting Front Chute Without Read Head Detecting Card | Read Head Check 08-XX | Read Head Failure |
| 09 | Timer Runout During Exit Process or Improper Card Divert | Card Inside RDR 09-XX | Motor, Stuck Card** |
| 0A | Special Election Codes Track | *Misread, Reenter 0A-XX | Speed Err, Codes |
| 0B | Read Head Gain too Low to Process Mark Sense Data | Read Head Check 0B-XX | Read Head Failure |
| 0C | Buffer Overflow, Raw Read Head Data | Read Motor Slow 0C-XX | Speed Err, Program |
| 0D | Return From Timing Mark too Late to Apply Skew to Data | *Misread, Reenter 0D-XX | Speed Err, Program |
| 0E | Exit Orient Traces too Late to Set Up for Bar | *Misread, Reenter 0E-XX | Speed Err, Program |
| 0F | Pre-Punch (Election Code) Incorrect | Incorrect Ballot | Pre-Punch Check |

*These error messages are not printed unless the system is configured to reject ballots in error. The other messages reflect problems sufficiently serious to warrant attention.
**These errors are fatal and require operator intervention.

Figure 52:
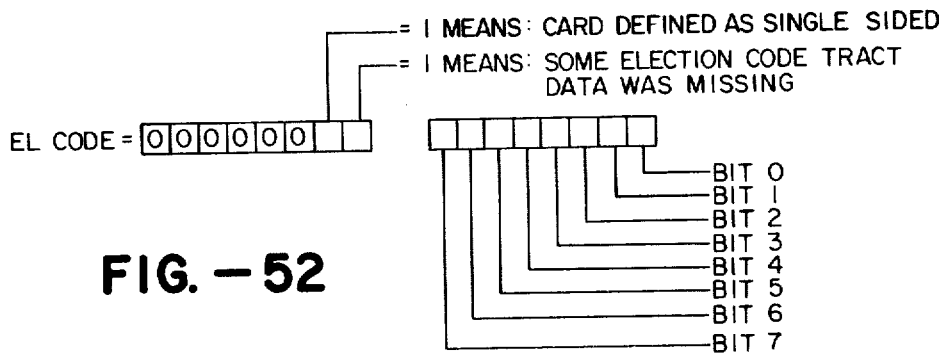

Ballots that are always returned to the user regardless of system configuration are:
- Control Cards
- Ballots under card reader test
- Incorrect Election Codes
  (Wrong Card for Election)

two-byte election code in computer memory as shown in FIG. 52.

Any or all of the mark patterns in the election code tracks which produce two bits each in the election code may be missing. If all of them are missing, the election code becomes: 01 00.

Notice that if the card is single sided, only four bits are available in the election code and the bit patterns might be: 0000 0010 XX00XX00 or: 0000 0010 00XX00XX depending on orient track relating to card side definition.

If one of the election code track patterns is missing, the resulting largest number available as an election code is 63, but this set of numbers is distinct from a full election code byte because of the "missing" bit in the second byte.

The Vote Section of the Card

If a fold is defined in the card, the fold must be pre-scored on a timing mark. This means that the timing marks must be substantially aligned on both sides of the card under this condition. As long as the fold doesn't spill outside the timing mark, alignment between the sides may be relaxed to this extent. If there are no folds, there is no requirement that the card sides match except perhaps for ink bleed through which shouldn't happen anyway.

The dimensions of the timing track marks (heading edge to heading edge) imply a ¼ inch pitch. The pitch of the codes tracks above and below the skew bar is ¼ inch. The pitch of the timing track may change after and before the end skew bars to 1/5 inch or 1/6 inch. When the finer pitches are chosen, the dimensions of the vote box height and the timing track height are reduced proportionately.

Determining Vote Track Length and Fold Counts

When the system is initially configured, the length of the card (timing track count) and folds counts must be entered in order to read cards at all. These counts may differ from the front to the back of the card, since the two card sides are processed asynchronously. The counts are determined as follows:

Timing Mark Count—Count of actual timing marks excluding the marks parallel with the skew bar, whether or not there are folds in the card.

Figure 53:
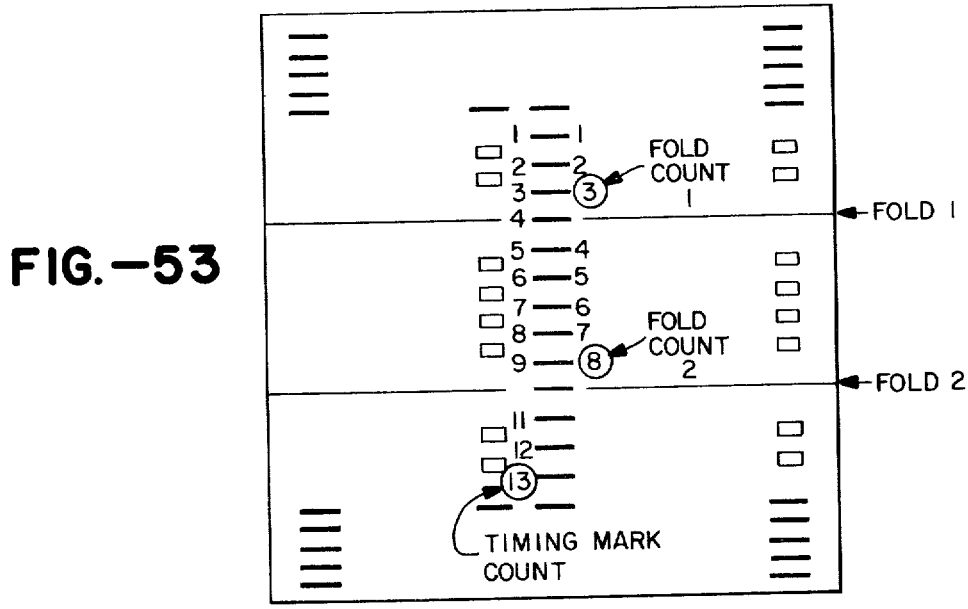

Fold Counts—Count of timing marks, excluding the mark parallel with the skew bar, from the top of the card to the timing mark before the timing mark upon which the card is folded. If there is more than one fold, the second fold count proceeds across the fold, not counting the mark on the fold, to the mark before the mark on the next fold. An example is shown in FIG. 53.

In this short card example, the counts are:
Mark Count=13
Fold Count 1=3
Fold Count 2=8

These numbers are entered on the control card configuration data discussed below, and may be different from front to back sides of the card.

The system reads the votes in the vote boxes and then constructs a bit string representing the vote boxes in vertical columns down the four columns potentially present on the card. This is done for all the valid vote box positions on the card. The bit string begins with the highest order bit at the upper left-hand corner of the card on the front side, and proceeds to the lowest order bit. Examples of the vote box ballot positions are shown in FIGS. 54A and 54B.

Partisan Elections—Party Byte

For elections that require a party be specified on the card, the first four vote boxes are printed as if they were timing marks. Four bits result, or 15 possible party codes. The four bits appear in the party byte relative to the vote positions as shown in FIG. 55.

Control Card Format

The system Standard Control Card is currently defined by assembly parameters in the system as follows:

| | |
|---|---|
| Election Code Bytes: | 00 39 (hex) |
| #Timing Marks-Front | 39 (decimal) |
| #Timing Marks-Back | 39 (decimal) |
| #Fold Count 1 - Front | 0 (0 = no fold) |
| #Fold Count - Back | 0 |
| #Fold Count 2 - Front | 0 |
| #Fold Count - Back | 0 |

The vote boxes assembled into a bit string are used to extract the control card configuration data. The bits in the bit string are taken eight at a time, and used as bytes. These bytes contain information in binary form, and the vote boxes are marked in this way. The format is as shown in FIG. 56. The vote track boxes are marked by bit positions in bytes that represent binary data in resulting memory bytes.

Mark-Sense Sensitivity Switch

The dipswitch on the main board is used to enter data which defines the sensitivity of the read heads when scanning the vote boxes.

That data entered are binary values between 0 and 255. Zero represents maximum sensitivity, and 255 represents minimum sensitivity, i.e., 255=100% threshold over background white; and 0=0% threshold over background white.

Emperical data shows that the system is reliable down to about a 10-20% threshold level, and below this point the system detects defects in the paper or erasures as marks. The system is preferably set to a threshold of 20%, or binary equivalent of 51 decimal.

It should be apparent from the above description of specific Mark Sense Ballot Counter system employing the general mark sense system and methodology of this invention, that the invention could be employed to read marks provided on any document by appropriate modifications of the scanner mechanism, the read head arrays and the read head interface in the digital electronics. For example, since digital data codes are provided on the ballot card system, it should be understood that the mark sense reading system and method of this invention could be employed generally to scanning a data card having a pattern of data words thereon with the data words either preprinted on the card or hand marked on the card. A variety of inventory control and other functions could be implemented in such card reading system. It should also be apparent that automatic test document reading could be implemented utilizing the system and method of this invention.

It should also be seen that numerous modifications in the mechanical, electromechanical and electronic system implementation of this invention could be made without departing from the scope of the invention. For example, it should be apparent that a wide variety of scanning mechanisms could be utilized for scanning a single or plural read head array with respect to a document. In addition, the signal multiplexing and analog-to-digital conversion components of the overall system could be implemented in different ways. For example, the microprocessor could download, through the programmable I/O ports, read head addresses to be stored in separate registers and separate discrete logic arrangements could be utilized to multiplex the read head outputs in sequence to the analog-to-digital conversion circuit and store the output of the conversion circuit in separate registers associated with each read head for access by the computer through an input data port. If integrated circuit analog-to-digital conversion circuits become inexpensive in the future, each of the individual read heads and optoelectronic sensors could have its own conversion circuit running independently of the processor and maintaining a buffer storage of the sampled output to be fetched by the microprocessor through its programmable I/O ports. This would eliminate some of the processor overhead in the program code pages.

In another variation of the invention, the outputs of the optoelectronic sensors could be routed through their own analog comparator circuits rather than being routed through the analog multiplexer and digital conversion circuits as shown in FIG. 6. The microprocessor could then acquire the output of the comparator to check on the presence of a card.

It should further be apparent that the invention is not limited to any particular type of microprocessor system but could utilize any of the current state of the art eight bit, sixteen bit or future thirty-two bit microprocessor units.

The features of the system and method of this invention could be applied to reading single sided cards only using read heads which transmit light through the card. The single sided card could utilize black marks in candidate mark regions or, alternatively, punch out regions. Instead of using digital codes to indicate card orientation, a single code mark in a designated location on one corner of the card could be used. These are some of the numerous variations in implementation of the general concepts of this invention which could be employed by skilled artisans.

FIGS. 57–60 illustrate some of the more important variations in implementation of this invention which could be employed. FIG. 57 illustrates a read head assembly 103' having two read heads U1' and U2' which could be utilized with a single column ballot card 370A, shown in FIG. 58. The single column ballot card has a timing mark track 375A along one edge and a single mark track 376A along the other edge. Either one of the code sections 373A or 374A in the header section 371A could be utilized as an orientation code section and an election code section on this ballot. The skew detect section 372A contains the skew detect marks for the read heads U1' and U2' (or similar read heads in a lower read head assembly if a two-sided card and a two read head assembly implementation is utilized.)

It will be appreciated that in this single column ballot card system, the active read head selection feature discussed above in connection with the two-feature column, five read-head system, is not necessary. Instead, all that is required is that the two read heads be properly associated with the timing track or vote mark track utilizing the card orientation code to indicate which way the card is entered. In most other respects, the implementation of the concepts of this invention with respect to a single column ballot card would be essentially the same. It may, however, be possible to increase card speed and utilize shorter individual program pages since the amount of data that has to be acquired and processed during each scan interval between the timing marks is been substantially reduced.

FIG. 59 and 60 illustrate another alternative embodiment utilizing a read head 103" having three read heads U1", U2" and U3" utilized to read the modified two column ballot card shown in FIG. 60. In the modified two column ballot card 380A, the vote tracks 386A and 386B are located along the opposite edges of the card so that one of the left and right hand read heads U1" and U3" is always scanning one of the vote mark tracks regardless of card orientation. The orientation code and election code sections 383A and 384A are in the same location as in two column card shown in FIGS. 7A and 7B. The skew detect pattern 382A has a skew detect mark in the appropriate location aligned with the vote mark track 386A.

The embodiment shown in FIGS. 59 and 60 also eliminates the need for utilizing the card orientation code to select which read heads to be active for scanning the vote section of the card. However, the orientation code is utilized to assign particular ones of the left and right most read heads to a particular vote track so that vote information is properly accumulated and stored.

It should also be understood that the two column ballot card systems shown in FIGS. 7A and 7B and FIG. 60 could utilize an arrangement in which the timing track is located adjacent to either the left or right edge of the card. FIG. 61 shows the timing mark track on the left edge of the ballot card, but it should be apparent that the timing track could also be on the right edge.

From the above discussion, it should also be apparent that numerous approaches could be taken to implementing the features of this invention with ballot cards or data cards having more than two mark tracks on each side of the card, using one of a variety of configurations for arranging the timing track and the respective mark tracks on the card and appropriate read head configurations.

While the numerous features of this invention have been described as being implemented in a firmware programmed digital computer, it will be apparent to persons of skill in the data processing art that discrete digital logic circuits could also be used to implement individual features separately or in combination and that programmed logic arrays or other digital integrated circuits could be utilized to produce an equivalent hard-wired, special purpose computer. The programmed general purpose computer implementation is preferred for reasons of lower cost and design and programming flexibility.

Accordingly, it should be understood that although a several embodiments of the invention have been disclosed above, numerous modifications could be made by persons of ordinary skill in the art without departing from the scope of this invention as claimed in the following claims.

What is claimed is:

1. In a system for reading marks on a document having at least one mark track comprising a plurality of prearranged candidate mark regions with blank regions therebetween, reading means including illuminating means for directing a beam of light to a prearranged illumination region and sensing means for receiving one of reflected or transmitted values of illumination from said illumination region and producing an analog output signal representing said values of illumination;

means producing relative scanning motion between said reading means and said mark track;

signal conversion means for sampling said analog output signal and converting sampled signals to corresponding binary digital words; and digital computer means coupled to said signal conversion means, including means for: acquiring at least one background digital word representing a background illumination value as said illumination region traverses each said blank region of said mark track and a plurality of candidate digital words representing a plurality of sequential illumination levels from subregions of each candidate mark region, calculating a separate digital mark detect threshold word value for each of said candidate mark regions as a prearranged function of at least one background digital word associated with an adjacent blank region, and registering a mark in a candidate mark region when the value of one of said candidate digital words is less than or equal to said associated digital mark detect threshold word value.

2. The system of claim 1, wherein said system further comprises means presenting a black region to said reading means prior to the scanning of said mark track; and said digital computer means includes means for: acquiring and storing a digital black level word while said black region is presented to said reading means, acquiring and temporarily storing said plurality of candidate words representing a plurality of illumination levels from subregions of each candidate mark region, acquiring and temporarily storing two background digital words from blank regions on each side of each candidate mark region, calculating a digital mark detect threshold word value for each candidate mark region as a prearranged percentage of the average of the values of said two background digital words less the value of said digital black level word, and comparing a preselected plurality of the values of said stored candidate digital words with said digital mark detect threshold value and registers the presence of a mark in said candidate mark region if any of said candidate word values is less than or equal to said digital mark detect threshold word value.

3. The system of claim 1, wherein said document includes a timing track extending parallel to said mark track and comprising a sequence of timing marks separated by blank timing track regions, said timing marks generally defining a scan subinterval of said mark track between the leading edges of successive timing marks and consisting of one each of said blank regions and said candidate mark regions; said reading means further includes a second illumination means and a second sensing means for scanning said timing track; and said system further comprises analog signal multiplexing means coupled to said digital computer for multiplexing analog output signals from each said sensing means to said signal conversion means under control of said digital computer means; said digital computer means includes means for: operating said multiplexing means to multiplex output signals from said first and second sensing means to said signal conversion means in a prearranged sequence at programmed time intervals including first time intervals during which said second sensing means is scanning at least a portion of said blank timing track region and crossing the leading edge of each of said timing marks, permitting said digital computer means further acquire at least one timing track background word representing a background illumination value received by said second sensing means as said second illumination means traverses each of said blank timing track regions, calcualting a separate timing mark detect threshold word value associated with each of said timing marks as a prearranged function of at least one timing track background word value associated with a blank timing track region immediately preceding each said timing mark, and registering detection of the leading edge of each said timing mark when one of the digital word values corresponding to output signals from said second sensing means is less than or equal to said associated timing mark threshold value.

4. The system of claim 3, wherein said digital computer means includes means for: acquiring a plurality of timing track background words representing background illumination values received by said second means as said second illumination region traverses portions of each of said blank timing track regions, performing a digital low pass filtering operation on said plurality of timing track background words as each said word is acquired to produce an average digital background word which excludes a plurality of current and prior background word values, and continuously recalculating said separate timing mark threshold value as a prearranged function of said average digital background word.

5. The system of claim 4, wherein said system further comprises means presenting a black region to said reading means prior to scan of said timing track, said digital computer means includes means for: acquiring at least one digital black level word representing the output of said signal conversion means when said second means is responding to calculating said black region, and said separate timing mark threshold values as a prearranged percentage of the difference between said black level word and said average digital background word.

6. The system of claim 3, wherein said digital computer means includes means for: acquiring said plurality of candidate words from successive subregions of each candidate mark region at a rate independent of document scanning speed, measuring the time of said scan subinterval as an indication of document scanning speed, calculating an appropriately sized data analysis window for said candidate words, and registering the presence of a mark if any candidate word value within said data analysis window is less than or equal to said associated digital mark detect threshold word.

7. The system of claim 6, wherein said digital computer means includes means for: calcualting low and high scan speed limits for each successive scan interval as a function of the document scan speed detected for the prior scan subinterval, and registering a speed error if said document scan speed indication for any scan subinterval is less than said calculated low scan speed limit or greater than said calculated high scan speed limit.

8. The system of any of claims 2 or 5, wherein said digital computer means includes means for: calculating for each acquired background digital word a gain word for said associated light sensing means as the difference between said background digital word value, and the black level value for said light sensing means, and comparing said gain word value with a preset minimum gain word value and registers a gain error if said gain word value is less than said minimum gain word value.

9. The system of claim 1, wherein said document includes a timing track comprising a sequence of timing marks separated by blank timing track regions, said timing marks generally defining a scan subinterval of said mark track between the leading edges of a pair of successive timing marks and consisting of one each of said blank regions and said candidate mark regions, said reading means further includes a second illumination means and a second sensing means associated with said timing track; and said system further comprises analog signal multiplexing means coupled to said digital computer means for multiplexing analog output signals from each said sensing means to said signal conversion means under control of said digital computer means; said digital computer means including a central processing unit with a program counter and data stack register therein, program storage means, and data storage means and a control program stored in said program storage means for operating said central processing unit, said control program including a dispatcher program code having associated first and second program pages with program address and data stack pointers in first and second queued page positions and top and bottom dispatcher queue pointer positions for holding first and second dispatcher queue pointers pointing to said first and second queued page positions, said dispatcher program comprising program code instructions for exchanging the positions of said first and second dispatcher queue pointers upon each entry into said dispatcher program code and for loading into said program counter and said data stack register the program page address and data stack pointer respectively for the program page pointed to by the queue pointer in the top dispatcher queue pointer position, and then dispatching program execution by said central processing unit to said program page, said control program further comprising a plurality of program pages having instruction sequences of equal total execution time, a first group of said program pages being associated with said first dispatcher queue pointer and the second group of said pages being associated with said second dispatcher queue pointer such that individual pages in said first and second groups are repetitively executed by said central processing unit in a prearranged time interleaved order during each said scan interval, each of said program pages having at least one data stack located at a preassigned location in said data storage means, said first group of program pages including a TIMING MARK START DETECT page set on one of said queued page positions prior to said second sensing means encountering said timing mark and a TIMING MARK END DETECT page set on the same queued page position prior to said second sensing means encountering the end of said timing mark, said second group of pages including a SCAN BLANK REGION page and a SCAN MARK REGION page respectively set on the other of said queued page positions during the scanning of each timing mark and the scanning of each blank timing mark region, said TIMING MARK START DETECT page and said TIMING MARK END DETECT page each including program code for causing said central processing unit to command said multiplexer to couple a sampled analog output signal from said second sensing means to said signal conversion means, to acquire the digital word output of said signal conversion means and to compare the said digital word output to a prearranged digital threshold word value to detect the start and end respectively of a timing mark, said SCAN BLANK REGION page being set on the other of said queued page positions after said TIMING MARK START DETECT page detects the start of a timing mark and said SCAN MARK REGION page being set on said other queued page position after said TIMING MARK END DETECT page detects the end of a timing mark, said SCAN BLANK REGION page including program code instructions for causing said central processing unit to command said multiplexer to couple a sampled analog output from said first sensing means to said signal conversion means, and to acquire the digital word output of said signal conversion means to be used in determining a mark detect threshold value; said SCAN MARK REGION page including program code instructions for causing said central processing unit to command said multiplexer to couple a sampled analog output signal from said first sensing means to said signal conversion means, and to acquire the digital word output of said signal conversion means to be used to detect the presence or absence of a mark in a candidate mark region of said timing track.

10. In a method for detecting marks on a document having a mark track comprising a sequence of candidate mark regions separated by blank regions, the steps of:
scanning said mark track with a small area light source and an associated light sensitive detector for producing an analog output signal representing transmitted or reflected illumination levels from said mark track,
converting said analog output signals into a sequence of corresponding binary digital words grouped as blank region words and candidate region words;
calculating a separate digital mark detect threshold for each said candidate mark regions as a prearranged function of at least one of said blank region words derived from at least one adjacent blank region;
comparing the values of a preselected plurality of candidate region words associated with each candidate mark region with said digital mark detect threshold for said candidate mark regions; and
registering the presence of a mark in said candidate mark region if the value of any of said candidate region words is less than or equal to said digital mark detect threshold.

11. The method of claim 10, wherein prior to said scanning step are performed the steps of:
scanning a black region with said light source and said light sensitive detector; and converting the analog output signal from said detector into a sequence of corresponding binary digital words representing black level words; said method further comprising the step of temporarily storing a group of candidate digital words corresponding to each candidate mark region; and said step of calculating comprises calculating separate digital mark detect threshold for each said candidate mark region as a preset percentage of the average of the values of at least one blank region word from each blank region adjacent said candidate mark region less the value of at least one of said black level words; and said step of comparing is carried out on a preselected plurality of said temporarily stored candidate digital words.

12. The method of 10, applied to detecting marks on a document which also has a timing track thereon extending parallel to said mark track and comprising a sequence of timing marks separated by blank timing track regions, the leading edges of successive timing marks generally defining the beginning and ending of a scan subinterval including a blank region and candidate mark region of said mark track, said method further including the steps of:

scanning said timing track with a second small area light source and an associated light sensitive detector for producing a second analog output signal representing transmitted or reflected illumination levels from said timing track at the same time as said mark track is being scanned by said first light source and said first light sensitive detector;

converting said second analog output signals into a sequence of corresponding binary digital words at least while scanning a substantial portion of each blank timing track region preceding each timing mark and the leading edge of each timing mark;

calculating a separate timing mark detect threshold for each timing mark as a prearranged function of at least one digital word associated with a blank timing track region preceding said timing mark;

comparing the values of said digital words derived from said second analog output signal with said timing mark detect threshold; and registering the leading edge of each timing mark when the value of one of said digital words derived from said second analog output signal is less than or equal to said timing mark detect threshold.

13. The method of claim 10, applied to detecting marks on a document which also has a timing track extending parallel to said mark track and comprises an initial blank timing track region and a sequence of timing marks separated by blank timing track regions, said timing marks generally defining the beginning and end of a scan subinterval including a blank region and a candidate mark region of said mark track, and further including the steps of:

scanning said timing track with a second small area light source and an associated separate light sensitive detector for producing a second analog output signal representing transmitted or reflected illumination levels from said timing track, said scanning being performed at the same time as said mark track is being scanned;

converting said second analog output signals into a sequence of corresponding binary words at least while scanning a substantial portion of said initial blank timing track region and while scanning a substantial portion of each blank timing track region preceding each timing mark and the leading edge of each timing mark;

calculating an initial timing mark detect threshold based on digital word values from said initial blank timing track region;

executing an initial digital low pass filter averaging routine on digital words corresponding to said initial blank timing track region to produce an average digital background word;

calculating a timing mark detect threshold as a predetermined function of said average digital background word;

comparing each digital word associated with scan of said timing track with said timing mark detect threshold;

registering detection of the leading edge of a timing mark when one of said digital words has a value less than or equal to said timing mark detect threshold;

reexecuting said digital low pass filter averaging routine when said digital word has a value greater than said timing mark detect threshold; and recalculating said timing mark detect threshold after each reexecution of said digital low pass filter averaging routine.

14. In a system for reading marks on a document having a mark track comprising a regular sequence of candidate mark regions and blank regions therebetween and a timing track extending parallel to said mark track and comprising a regular sequence of timing mark separated by blank timing track regions with said timing marks generally defining a scan subinterval of said mark track as the region between leading edges of a pair of successive timing marks and including one blank region and one candidate mark region, said mark track and said timing track being preceded by a skew detect pattern printed on said document at the same time as said timing marks and comprising separate skew bar marks aligned with said mark track and said timing track and equidistant from said skew sync mark, reading means including first and second illuminating means for separately directing a small spot of light onto said mark track and said timing track respectively, and first and second light sensing means receiving reflected or transmitted illumination from said small spot of light for producing first and second analog output signal representing the magnitude of detected illumination;

means for scanning said reading means with respect to said skew detect pattern and said mark track and timing track;

signals conversion means for converting the analog outputs of said light sensing means into corresponding word digital values;

digital computer means coupled to said signal conversion means for acquiring and analyzing digital word values representing illumination values received from said skew detect pattern and said mark track and timing track; said digital computer means includes means for: operating on digital word values acquired from said signal conversion means during scanning of said skew detect pattern to calculate a skew differential between said mark track and said timing track cumulatively due to any skew factor including, but not limited to, positional skew between said first and second light sensing means, scanning skew between said document and said reading means, and printing skew between the edges of said document and said mark track and said timing track; said digital computer means further includes means for operating on digital word values acquired from said signal conversion means during scanning of each said scan subinterval to detect the leading edge of associated beginning and ending timing marks and to utilize said calculated skew differential between said mark track and said timing track to appropriately position a candidate mark data analysis window to analyze only digital word values acquired from substantially the actual candidate mark region of said mark track within said scan subinterval.

15. The system of claim 14, wherein said digital computer means includes means for measuring the time duration between the detected leading edges of beginning and ending timing marks for each scan subinterval as an indication of relatively scanning speed and adjusts the size of said candidate mark data analysis window for each scan subinterval based on the time duration of either the directly associated scan subinterval or the immediately preceding scan subinterval.

16. The system of claim 14, wherein said digital computer means includes means for: temporarily storing digital word values acquired from said signal conversion means during scanning of each candidate mark region associated with each scan subinterval, measuring a time duration between the leading edge of beginning and ending timing marks for each scan subinterval as an indication of relative scanning speed, calculating an appropriate size and position of a candidate mark data analysis window for said stored digital word values based on said calculated skew differential and said relatively scanning speed, and determining the presence of a mark in a candidate mark location by analyzing digital word values only within said data analysis window.

17. In a system for reading marks on a document having at least one mark track comprising a regular sequence of candidate mark regions with blank regions therebetween and a timing track extending parallel to said mark track and comprising a regular sequence of timing marks separated by blank timing track regions, said timing marks generally defining the top and bottom boundaries of a scan subinterval including a blank region and a candidate mark region of said mark track, said document further having top and bottom header sections each having an orientation code track located thereon and comprising a unique document orientation code, one of said code track locations being aligned with a mark track or said timing track and the other being located symmetrical with the first in the other header section on said document and aligned with a mark track or said timing track,
  reading means including separate illumination means for directing a small spot of light onto each mark track and said timing track and associated light sensing means for receiving reflected or transmitted illumination from each said small spots of light and producing analog output signals representing the magnitude of detected illumination,
  means for receiving said document in either top or bottom end first orientation and for transporting said document past said reading means;
  signal conversion means for converting the analog output signals of said light sensing means into corresponding digital word values;
  digital computer means coupled to said signal conversion means includes means for: acquiring and analyzing digital word values corresponding to output signals from an appropriate light sensing means associated with said orientation code track while one of said top or bottom header sections of said document is transported past said reading means, decoding said orientation code on said header section to determine which direction said document is being scanned, and thereafter using said decoded orientation code to control the acquiring and processing of digital word values corresponding to output signals from said light sensing means as digital words appropriately representing each mark track and said timing track.

18. The system of claim 17, further comprising analog signal multiplexing means coupled to said digital computer means for controlling the coupling of said analog output signals to said signal conversion means, and wherein said digital computer means further includes means for using said decoded orientation code to determine the proper order for multiplexing of said analog output signals to said signal conversion means for acquiring digital data word representations from said timing track and each mark track.

19. The system of claim 17, wherein said digital computer means includes a document mark track memory having a memory location for each candidate mark region of each mark track, and program means for analyzing digital word values associated with candidate mark regions on each mark track in real time as said document is being scanned to detect the presence or absence of marks in said candidate mark regions and for using said decoded orientation code to address the appropriate memory location in said mark track memory for loading digital indications of the presence of a detected mark at an associated candidate mark region.

20. The system of claim 17, wherein said document further includes a document identification code track in each header section comprising a binary document code identifying said document, said identification code track being parallel to said orientation code track and aligned with one of said illumination means; and wherein said digital computer means includes means for: acquiring and analyzing digital word values corresponding to output signals from appropriate light sensing means while the said top or bottom header section of said document, is transported past said reading means, and decoding said document identification code track simultaneously with the decoding of said orientation code track.

21. The system of claim 17, wherein a plurality of mark tracks are provided on said document and said mark tracks are oriented with respect to said timing track such that they are in different positions depending on which end of said document first enters said document receiving and transporting means, said reading means includes a plurality of illumination means and light sensing means positioned so that one reading means and one sensing means is aligned with each mark track and said timing track regardless of which document end enters first; and said digital computer means includes means for using said decoded orientation code to select appropriate light sensing means from which to acquire data during scanning so that only data from said timing track and said mark tracks are acquired.

22. In a system for simultaneously reading marks on a document having on each side at least one mark track comprising a sequence of prearranged mark regions with blank regions therebetween and a timing track extending parallel to said mark track and comprising a sequence of timing marks separated by blank timing track regions, said timing marks generally defining the top and bottom boundaries of a scan subinterval comprising a blank region and a candidate mark region of said mark track, said document further having top and bottom header sections on each side, each of said header sections having an orientation code track thereon comprising a unique document orientation code with said orientation code track locations in one of said header sections being aligned with a mark track or said timing track on each side of said document and the other being located symmetrical with the first and aligned with a mark track or said timing track, upper and lower reading means each including separate illumination means for directing a small spot of light onto each mark track, and said timing track and associated light sensing means for receiving reflected illumination from each small spot of light for producing output signals representing the magnitude of said detected illumination;

means for receiving said document in any of the four possible orientations and for transporting said document between said upper and lower reading means;

signal conversion means for converting the analog output signals of said light sensing means into corresponding digital word values;

digital computer means coupled to said signal conversion means includes means for: acquiring and analyzing digital word values corresponding to output signals from the appropriate light sensing means in each said reading means associated with respective orientation code tracks while one of said top or bottom header sections is transported past said upper and lower reading means, decoding said four orientation code to determine in which of said four orientations said document entered, and thereafter using said decoded orientation code to control the acquiring and processing of digital word values corresponding to output signals from said light sensing means in each reading means as digital words appropriately representing each mark track and each timing track on both sides of said document.

23. The system of claim 22, further comprising analog signal multiplexing means coupled to said digital computer means for controlling the coupling of said analog output signals from each reading means to said signal conversion means, and wherein said digital computer means includes means for using said decoded orientation code to determine the proper order for multiplexing analog output signals from each reading means to said signal conversion means for acquiring digital data representations from said timing track and each mark track on each side of said document.

24. The system of claim 22, wherein said document further includes a document identification code in each header section on each side of said document and comprising a binary document code identifying said document, said identification code being parallel to said orientation said code track and aligned with one of said illumination means; and wherein said digital computer means includes means for: acquiring and analysing digital word values corresponding to output signals from appropriate light sensing means in said reading means while said top and bottom header sections are transported between said upper and lower reading means, and decoding each of said document identification code tracks during the same processing interval as decoding of said orientation code track on the same side of said document.

25. The system of claim 22, wherein said digital computer means includes a separate document mark track memory for each side of said document, each of said mark track memories having prearranged memory locations for each candidate mark region on said side of said document, and program means for sequentially analyzing digital word values associated with candidate mark regions on each of said mark tracks on both sides of said document in real time as said document is being scanned to detect the presence or absence of marks in said candidate mark regions and for using said decoded orientation code to address the appropriate memory location in the appropriate mark track memory for storing a digital indication of the presence or absence of a mark at an associated candidate mark region.

26. The system of claim 22, wherein said digital computer means includes a central processing unit and program storage means with a control program stored therein for operating said central processing unit to read said document, said control program including a real time program code section for operating said central processing unit to detect marks in candidate mark locations in real time as said document is scanned between said upper and lower reading means, said real time program code section including a dispatcher program code having upper and lower dispatch program queues associated therewith for loading into said central processing unit program page information for one of a plurality of different pages to be executed by said central processing unit for acquiring and processing digital word values acquired from said upper and lower reading means respectively during scan of said document, and program code for switching program dispatch between said upper and lower dispatch program queues each time said dispatch program code is entered for execution by said central processing unit, each of said plurality of different program pages having substantially identical total code execution times so that said central processing unit spends equal time processing with respect to each side of said document and said processing for each side is carried out in an asynchronous manner.

27. The system of claim 26, wherein said dispatcher program code further has associated with each of said upper and lower dispatcher program queues first and second program pages with program address and data stack pointers in first and second queued page positions and top and bottom dispatcher queue pointer positions for holding first and second dispatcher queue pointers pointing to said first and second queued page positions, said dispatcher program code further comprising program code instructions for exchanging the positions of said first and second dispatcher queue pointers upon each switching by said code between said upper and lower dispatch program queues and for thereafter loading into said central processing unit the program page address and data stack pointer, respectively, for the program page pointed to by the queue pointer in the top dispatcher queue pointer position of the active dispatcher program queue, and then dispatching central processing unit program execution to said program page, a first group of said plurality of different program pages being associated with said first dispatcher queue pointer in each dispatcher program queue and a second group of said program pages being associated with said second dispatcher queue pointer in each of said program queues such that individual pages in said first and second groups are repetitively executed by said central processing unit in a prearranged time interleaved order during each said scan subinterval associated with each side of said document.

28. The system of claim 22, wherein a plurality of mark tracks are provided on each side of said document and said mark tracks are oriented with respect to an associated timing track such that they are in different positions depending upon which orientation said document is received in, each said reading means includes a plurality of illumination means and light sensing means positioned so that one reading means and one sending means are aligned with each mark track each timing track regardless of document orientation; and said digital computer means includes means for using said decoded orientation code to select appropriate light sensing means from which to acquire data during scanning so that only data from said timing tracks and said mark tracks are acquired.

29. In a system for reading marks on a ballot card having at least one vote track on one side of said card,
   a card entry chute, an external card exit chute, and at least one internal card exit chute;
   card transport means, including motor driving means, for engaging a card inserted through said entry chute and transporting said card throughout an elongated card guide path to said exit chutes;
   card directing means mounted adjacent said internal card exit chute and selectively actuable to direct said card to one of said exit chutes;
   reading means mounted at a reading station near said card entry chute for detecting marks on said vote track as said card transport means transports said card past said reading station;
   separate card sensing means positioned in front of said reading station, and at each of said exit chutes for signalling the presence of a card at said locations; and
   digital computer means, including a central processing unit, first memory means for storing a firmware operating system, second memory means for storing data to be used by said firmware operating system and vote information detected on said vote track of a ballot card, and programmable input-/output ports operating under the control of said central processing unit for inputting and outputting data and control signals; said programmable input-/output ports being coupled to said drive motor and said card directing means to output operating control signals thereto and being coupled to said reading means and said card sensing means for inputting data signals therefrom; said firmware operating system including means for: programming said central processing unit to execute a sequence of input-output operations via said programmable input and output ports including inputting data from said card sensor at said entry chute to detect entry of a card and responding by outputting a control signal to turn on said motor in said card transport means, acquiring and processing data from said reading means as said card is transported past said reading station to detect marks on said vote track and storing said detected marks in said second memory means, and outputting control signals to said card directing means to direct said card to an appropriate exit chute based on said acquired and processed data from said reading means.

30. The system of claim 29, wherein said card transport means further includes an upper card guide means communicating with said card entry chute, a lower card guide means communicating with said external card exit chute, and a card turnaround guide means at the ends of said upper and lower card guide means opposite said card entry chute for guiding said card between said upper and lower card guide means, plurality of card drive rollers mounted between said upper and lower guide card means, each having associated upper and lower idler rollers and being coupled in relation with said motor for positive transport of said card through said upper and lower card guide means, and a separate card drive roller and idler roller mounted in the vicinity of said internal card exit chute and coupled in driving relation with said motor for driving said card through said chute.

31. The system of claim 30, wherein said upper and lower card guide means comprise upper, lower and middle track assemblies, said upper and lower track assemblies defining the upper and lower card guide surfaces of said upper and lower card guide means, respectively, and including mounting brackets for said upper and lower idler rollers, respectively; said middle track assembly defining the lower and upper card guide surfaces of said upper and lower card guide means, respectively, and including mounting brackets for said card drive friction rollers; said upper track assembly being hingedly mounted at one end with respect to said middle track assembly to provide access to said upper card path, and said middle track assembly being hingedly mounted at one end to said lower track assembly to provide access to said lower card path.

32. The system of claim 29 adapted for reading marks on a ballot card having a plurality of vote tracks, wherein said reading means comprises a plurality of light sources and associated light sensitive detectors associated with said plurality of vote tracks and each of said card sensing means comprises a light source and a light sensitive detector; said system further comprising signal conversion means for converting input analog signals from said light sensitive detectors to corresponding digital words; and analog multiplexing means coupled to said signal conversion means, to an output port of said digital computer means and to each of said light sensitive detectors for coupling an analog output signal from one of said light sensitive detectors to said signal conversion means under control of an output data word from said digital computer means.

33. The system of claim 32, wherein said card sensing means positioned in front of said reading station comprises a light emitting diode and a proportional light intensity detector means mounted on opposite sides of said card path, and drive circuit means for said light emitting diode including a drive boost means coupled to an input/output port of said digital computer means for intermittently increasing the light output of said LED in response to a boost command from said digital computer means via said input/output port; said digital computer means being programmed to perform the following functions: to operate said signal multiplexing means to couple the output of said proportional light intensity detector means to said signal conversion means while waiting for entry of a card, to input corresponding digital words from said signal conversion means to register the presence of a card when the value of one of said digital words is less than or equal to a preset card detect threshold word, and to thereafter output said LED boost command signal to said LED boost means and to input corresponding digital words from said signal conversion means to register the presence of more than one card when the value of one of said digital words corresponding to said boosted LED output is less than or equal to a preset two card detect threshold word.

34. The system of claim 29, wherein said vote track is a mark track comprising a plurality of prearranged candidate mark regions with blank regions therebetween, said reading means includes illuminating means for directing a beam of light to a prearranged illumination region and sensing means for receiving one of reflected or transmitted values of illumination from said illumination region and producing an analog output signal representing said values of illumination; and said system further includes signal conversion means coupled to one of said input/output ports for sampling said analog output signal, and converting said sampled signals to corresponding binary digital words;

said digital computer means includes means for: acquiring from said signal conversion means at least one background digital word representing a background illumination value as said illumination region traverses each said blank region of said mark track and a plurality of candidate digital words representing a plurality of sequential illumination levels from subregions of each candidate mark region, for calculating a separate digital mark detect threshold word value for each of said candidate mark regions as a prearranged function of at least one background digital word associated with an adjacent blank region, and for registering a mark in a candidate mark region when the value of one of said candidate digital words is less than or equal to said associated digital mark detect threshold word value.

35. The system of claim 34, wherein said document includes a timing track comprising a sequence of timing marks separated by blank timing track regions, said timing marks generally defining a scan subinterval of said mark track between the leading edges of a pair of successive timing marks and consisting of one each of said blank regions and said candidate mark regions, said reading means further includes a second illumination means and a second sensing means associated with said timing track; and said system further comprises analog signal multiplexing means coupled to said digital computer means for multiplexing analog output signals from each said sensing means to said signal conversion means under control of said digital computer means; said digital computer means including a central processing unit with a program counter and data stack register therein, program storage means, and data storage means and a control program stored in said program storage means for operating said central processing unit, said control program including a dispatcher program code having associated first and second program pages with program address and data stack pointers in first and second queued page positions and top and bottom dispatcher queue pointer positions for holding first and second dispatcher queue pointers pointing to said first and second queued page positions, said dispatcher program comprising program code instructions for exchanging the positions of said first and second dispatcher queue pointers upon each entry into said dispatcher program code, for loading into said program counter and said data stack register the program page address and data stack pointer respectively, for the program page pointed to by the queue pointer in the top dispatcher queue pointer position, and then dispatching program execution by said central processing unit to said program page, said control program further comprising a plurality of program pages having instruction sequences of equal total execution time, a first group of said program pages being associated with said first dispatcher queue pointer and the second group of said pages being associated with said second dispatcher queue pointer such that individual pages in said first and second groups are repetitively executed by said central processing unit in a prearranged time interleaved order during each said scan interval, each of said program pages having at least one data stack located at a preassigned location in said data storage means, said first group of program pages including a TIMING MARK START DETECT page set on one of said queued page positions prior to said second sensing means encountering said timing mark and a TIMING MARK END DETECT page set on the same queued page position prior to said second sensing means encountering the end of said timing mark, said second group of pages including a SCAN BLANK REGION page and a SCAN MARK REGION page respectively set on the other of said queued page positions during the scanning of each timing mark and the scanning of each blank timing mark region, said TIMING MARK START DETECT page and said TIMING MARK END DETECT page each including program code for causing said central processing unit to command said multiplexer to couple a sampled analog output signal from said second sensing means to said signal conversion means, to acquire the digital word output of said signal conversion means and to compare the said digital word output to a prearranged digital threshold word value to detect the start and end respectively of a timing mark, said SCAN BLANK REGION page being set on the other of said queued page positions after said TIMING MARK START DETECT page detects the start of a timing mark and said SCAN MARK REGION page being set on said other queued page position after said TIMING MARK END DETECT page detects the end of a timing mark, said SCAN BLANK REGION page including program code for causing said central processing unit to command said multiplexer to couple a sampled analog output from said first sensing means to said signal conversion means, and to acquire the digital word output of said signal conversion means to be used in determining a mark detect threshold value; said SCAN MARK REGION page including program code for causing said central processing unit to command said multiplexer to couple a sampled analog output signal from said first sensing means to said signal conversion means, and to acquire the digital word output of said signal conversion means to be used to detect the presence or absence of a mark in a candidate mark region of said timing track.

36. The system of claim 34, wherein said system further comprises means presenting a black region to said reading means prior to scan of said mark track; and said digital computer means includes means for: acquiring and storing a digital black level word while said black region is presented to said reading means, acquiring and temporarily storing said plurality of candidate words representing a plurality of illumination levels from subregions of each candidate mark region, acquiring and temporarily storing two background digital words from blank regions on each said of each candidate mark region, calculating a digital mark detect threshold word value for each candidate mark region as a prearranged percentage of the average of the values of said two background digital words less the value of said digital black level word, and comparing a preselected plurality of the values of said stored candidate digital words with said digital mark detect threshold value and registers the presence of a mark in said candidate mark region if any of said candidate word values is less than or equal to said digital mark detect threshold word value.

37. The system of claim 34, wherein said card includes a timing track extending parallel to said mark track and comprising a sequence of timing marks separated by blank timing track regions, said timing marks generally defining a scan subinterval of said mark track between the leading edges of successive timing marks and consisting of one each of said blank regions and said candidate mark regions; said reading means further includes a second illumination means and a second sensing means for scanning said timing track; and said system further comprises analog signal multiplexing means coupled to said digital computer for multiplexing analog output signals from each said sensing means to said signal conversion means under control of said digital computer means; said digital computer means includes means for operating said multiplexing means to multiplex output signals from said first and second sensing means to said signal conversion means in a prearranged sequence at programmed time intervals including first time intervals during which said second sensing means is scanning at least a portion of said blank timing track region and crossing the leading edge of each of said timing marks, said digital computer means further includes means for: acquiring at least one timing track background word representing a background illumination value received by said second sensing means as said second illumination means traverses each of said blank timing track regions, calculating a separate timing mark detect threshold word value associated with each of said timing marks as a prearranged function of at least one timing track background word value associated with a blank timing track region immediately preceding each said timing mark, and registering detection of the leading edge of each said timing mark when one of the digital word values corresponding to output signals from said second sensing means is less than or equal to said associated timing mark threshold value.

38. The system of claim 37, wherein said digital computer means including means for: acquiring a plurality of timing track background words representing background illumination values received by said second means as said second illumination region traverses portions of each of said blank timing track regions, performing a digital low pass filtering operation on said plurality of timing track background words as each said word is acquired to produce an average digital background word which excludes a plurality of current and prior background word values, and continuously recalculating said separate timing mark threshold value as a prearranged function of said average digital background word.

39. The system of claim 38, wherein said system further comprises means presenting a black region to said reading means prior to scan of said timing track, said digital computer means includes means for: acquiring at least one digital black level word representing the output of said signal conversion means when said second means is responding to said calculating black region, and said separate timing mark threshold values as a prearranged percentage of the difference between said black level word and said average digital background word.

40. The system of any of claims 36 or 39, wherein said digital computer means include means for: calculating for each acquired background digital word a gain word for said associated light sensing means as the difference between said background digital word value and the black level value for said light sensing means, and comparing said gain word value with a preset minimum gain word value and registers a gain error if said gain word value is less than said minimum gain word value.

41. The system of claim 38, wherein said digital computer means includes means for: acquiring said plurality of candidate words from successive subregions of each candidate mark region at a rate independent of document scanning speed, measuring the time of said scan subinterval as an indication of card scanning speed, calculating an appropriately sized data analysis window for said candidate words, and registering the presence of a mark if any candidate word value within said data analysis window is less than or equal to said associated digital mark detect threshold word.

42. The system of claim 41, wherein said digital computer means includes means for; calculating low and high scan speed limits for each successive scan interval as a function of the card scan speed detected for the prior scan subinterval, and registering a speed error if said card scan speed indication for any scan subinterval is less than said calculated low scan speed limit or greater than said calculated high scan speed limit.

43. The system of claim 29 wherein said vote track is a mark track comprising a regular sequence of candidate mark regions and blank regions therebetween and a timing track extending parallel to said mark track and comprising a regular sequence of timing marks separated by blank timing track regions with said timing marks generally defining a scan subinterval of said mark track as the region between leading edges of a pair of successive timing marks and including one blank region and one candidate mark region, said mark track and said timing track being preceded by a skew detect pattern printed on said card at the same time as said timing marks and including separate skew bar marks aligned with said mark track and said timing track, said reading means includes first and second illuminating means for separately directing a small spot of light onto said mark track and said timing track respectively, and first and second light sensing means receiving reflected or transmitted illumination from said small spot of light for producing first and second analog output signals representing the magnitude of detected illumination; and said system further comprises signal conversion means coupled to one of said input/output ports for converting the analog outputs of said light sensing means into corresponding word digital values; said digital computer means including means for acquiring and analyzing digital word values representing illumination values received from said skew detect pattern and said mark track and timing track; said digital computer means including means for operating on digital word values acquired from said signal conversion means during scanning of said skew detect pattern to calculate a skew differential between said mark track and said timing track cumulatively due to any skew factor including, but not limited to, positional skew between said first and second light sensing means, scanning skew between said card and said reading means, and printing skew between the edges of said card and said mark track and said timing track; said digital computer means further including means for operating on digital word values acquired from said signal conversion means during scanning of each said scan subinterval to detect the leading edge of associated beginning and ending timing marks, and utilizing said calculated skew differential between said mark track and said timing track to appropriately position a candidate mark data analysis window to analyze only digital word values acquired from substantially the actual candidate mark region of said mark track within said scan subinterval.

44. The system of claim 43, wherein said digital computer means includes means for: measuring the time duration between the detected leading edges of beginning and ending timing marks for each scan subinterval as an indication of relatively scanning speed, adjusting the size of said candidate mark data analysis window for each scan subinterval based on the time duration of either the directly associated scan subinterval or the immediately preceding scan subinterval.

45. The system of claim 43, wherein said digital computer means includes for: temporarily storing digital word values acquired from said signal conversion means during scanning of each candidate mark region associated with each scan subinterval, measuring a time duration between the leading edge of beginning and ending timing marks for each scan subinterval as an indication of relative scanning speed, calculating an appropriate size and position of a candidate mark data analysis window for said stored digital word values based on said calculated skew differential and said relatively scanning speed, and determines the presence of a mark in a candidate mark location by analyzing digital word values only within said data analysis window.

46. The system of claim 29 wherein each vote track is a mark track comprising a regular sequence of candidate mark regions with blank regions therebetween and said card further has a timing track extending parallel to said mark track and comprising a regular sequence of timing marks separated by blank timing track regions, said timing marks generally defining the top and bottom boundaries of a scan subinterval including a blank region and a candidate mark region of said mark track, and top and bottom header sections each having an orientation code track located thereon and comprising a unique card orientation code, one of said code track locations being aligned with a mark track or said timing track and the other being located symmetrical with the first in the other header section on said card and aligned with a mark track or said timing track, said reading means includes separate illumination means for directing a small spot of light onto each mark track and said timing track and associated light sensing means for receiving reflected or transmitted illumination from each of said small spots of light and producing analog output signals representing the magnitude of detected illumination; and said system further includes signal conversion means for converting the analog output signal of said light sensing means into corresponding digital word values, said digital computer means including means for: acquiring and analyzing digital word values corresponding to output signals from an appropriate one of said light sensing means associated with said orientation code track while one of said top or bottom header sections of said document is transported past said reading means, decoding said orientation code on said header section to determine which direction said card is being scanned, and thereafter using said decoded orientation code to control the acquiring and processing of digital word values corresponding to output signals from said light sensing means as digital words appropriately representing each mark track and said timing track.

47. The system of claim 46, further comprising analog signal multiplexing means coupled to an input/output port of said digital computer means for controlling the coupling of said analog output signals to said signal conversion means, and wherein said digital computer means includes means for using said decoded orientation code to determine the proper order for multiplexing analog output signals to said signal conversion means for acquiring digital data representations from said timing track and each mark track.

48. The system of claim 46, wherein said digital computer means includes a mark track memory having a memory location for each candidate mark region of each mark track, and program means for, analyzing digital word values associated with candidate mark regions on said mark track in real time as said document is being scanned to detect the presence or absence of marks in said candidate mark regions, and using said decoded orientation code to address the appropriate memory location in said mark track memory for loading digital indications of the presence of a detected mark at an associated candidate mark region.

49. The system of claim 46, wherein said card further includes a card identification code track in each header section comprising a binary card code identifying said card said identification code track being parallel to said orientation code track and aligned with one of said illumination means; and wherein said digital computer means includes means for: acquiring and analyzing digital word values corresponding to output signals from appropriate light sensing means while said top or bottom header section of said document is transported past said reading means, and decoding said card identification code track simultaneously with the decoding of said orientation code track.

50. The system of claim 46, wherein a plurality of mark tracks are provided on said card, and said mark tracks are oriented with respect to said timing track such that they are in different positions depending on which end of said document first enters said document receiving and transporting means, said reading means includes a plurality of illumination means and light sensing means positioned so that one reading means and one sensing means is aligned with each mark track and said timing track regardless of which document end enters first; and said digital computer means uses includes means for using said decoded orientation code to select appropriate light sensing means from which to acquire data during scanning so that only data from said timing track and said mark tracks are acquired.

51. The system of claim 29 for simultaneously reading marks on a card having on each side at least one vote track in the form of a mark track comprising a sequence of prearranged mark regions with blank regions therebetween and further having on each side a timing track extending parallel to said mark track and comprising a sequence of timing marks separated by blank timing track regions, said timing marks generally defining the top and bottom boundaries of a scan subinterval comprising a blank region and a candidate mark region of said mark track, said card further having top and bottom header sections on each side, each of said header sections having an orientation code track thereon comprising a unique card orientation code with one of said orientation code track locations in one of said header sections being aligned with a mark track or said timing track on each side of said document and the other being located symmetrical with the first and aligned with a mark track or a timing track, said reading means including upper and lower reading means each including separate illumination means for separately directing a small spot of light onto each mark track and said timing track and associated light sensing means for receiving reflected illumination from each small spot of light for producing output signals representing the magnitude of said detected illumination; and said system further including signal conversion means for converting the analog output signals of said light sensing means into corresponding digital word values, said digital computer means including means for: acquiring and analyzing digital word values corresponding to output signals from the appropriate light sensing means in each said reading means associated with respective orientation code tracks while one of said top or bottom header sections is transported past said upper and lower reading means, decoding said orientation code to determine in which of said four orientations said card entered, and thereafter using said decoded orientation code to control the acquiring and processing of digital word values corresponding to output signals from said light sensing means in each reading means as digital words appropriately representing each mark track and each timing track on both sides of said document.

52. The system of claim 51, further comprising analog signal multiplexing means coupled to an input/output port of said digital computer means for controlling the coupling of said analog output signals from each reading means to said signal conversion means, and wherein said digital computer means including means for using said decoded orientation code to determine the proper order for multiplexing analog output signals from each reading means to said signal conversion means for acquiring digital data representations from said timing track and each mark track on each side of said document.

53. The system of claim 51, wherein said card further includes a card identification code in each header section on each side of said document and comprising a binary card code identifying said card, said identification code track being parallel to said orientation said code track and aligned with one of said illumination means; and wherein said digital computer means including means for: acquiring and analyzing digital word values corresponding to output signals from appropriate light sensing means in said reading means while said top and bottom header sections are transported between said upper and lower reading means, and decoding each of said card identification code tracks during the same processing interval as decoding of said orientation code track on the same side of said card.

54. The system of claim 51, wherein said digital computer means includes a separate card mark track memory for each side of said card, each of said mark track memories having prearranged memory locations for each candidate mark region on said side of said card, and said firmware operating system includes program means for, sequentially analyzing digital word values associated with candidate mark regions on each of said mark tracks on both sides of said card in real time as said card is being scanned to detect the presence or absence of marks in said candidate mark regions, and using said decoded orientation code to address the appropriate memory location in the appropriate mark track memory for storing a digital indication of the presence or absence of a mark at an associated candidate mark region.

55. The system of claim 51, wherein said said firmware operating system further includes a real time program code section for operating said central processing unit to detect marks in candidate mark locations in real time as said card is scanned between said upper and lower reading means, said real time program code section including a dispatcher program code having upper and lower dispatch program queues associated therewith for loading into said central processing unit program page information for one of a plurality of different pages to be executed by said central processing unit for acquiring and processing digital word values acquired from said upper and lower reading means respectively during scan of said card, and program code for switching program dispatch between said upper and lower dispatch program queues each time said dispatch program code is entered for execution by said central processing unit, each of said plurality of different program pages having substantially identical total code execution times so that said central processing unit spends equal time processing with respect to each side of said card and said processing for each side is carried out in an asynchronous manner.

56. The system of claim 55, wherein said dispatcher program code further has associated with each of said upper and lower dispatcher program queues first and second program pages with program address and data stack pointers in first and second queued page positions and top and bottom dispatcher queue pointer positions for holding first and second dispatcher queue pointers pointing to said first and second queued page positions, said dispatcher program code further comprising program code instructions for exchanging the positions of said first and second dispatcher queue pointers upon each switching by said code between said upper and lower dispatch program queues and for thereafter loading into said central processing unit the program page address and data stack pointer, respectively, for the program page pointed to by the queue pointer in the top dispatcher queue pointer position of the active dispatcher program queue, and then dispatching central processing unit program execution to said program page, a first group of said plurality of different program pages being associated with said first dispatcher queue pointer in each dispatcher program queue and a second group of said program pages being associated with said second dispatcher queue pointer in each of said program queues such that individual pages in said first and second groups are repetitively executed by said central processing unit in a prearranged time interleaved order during each said scan subinterval associated with each side of said card.

57. The system of claim 51, wherein a plurality of mark tracks are provided on each side of said document and said mark tracks are oriented with respect to an associated timing track such that they are indifferent positions depending upon which orientation said document is received in, each said reading means includes a plurality of illumination means and light sensing means positioned so that one reading means and one sending means are aligned with each mark track each timing track regardless of document orientation; and said digital computer means includes means for using said decoded orientation code to select appropriate light sensing means from which to acquire data during scanning so that only data from said timing tracks and said mark tracks are acquired.

58. In a method for detecting marks on a document having a mark track comprising a regular sequence of candidate mark regions separated by blank regions and a timing track comprising a regular sequence of timing marks separated by blank timing track regions with the leading edges of successive timing marks defining a mark track scan subinterval including a blank region and a candidate mark region, the steps of:

simultaneously scanning said mark track and said timing mark with separate small area light sources and associated light sensitive detectors for producing analog output signals representing transmitted or reflected illumination values from said tracks, sampling analog output signals representing illumination levels from said mark track at a rate independent of speed of said scanning;

converting said sampled analog output signals into corresponding binary digital words grouped as blank region words and candidate words;

temporarily storing candidate words for each scan subinterval;

detecting the leading edge of each timing mark based on outputs from said associated light sensitive detector scanning said timing track;

measuring the time between detected leading edges of successive timing marks as an indication of scanning speed for each scan subinterval;

calculating an appropriately sized data analysis window for each scan subinterval as a function of said associated scanning speed; and examining the stored candidate words only within said data analysis window to determine the presence or absence of a mark within the associated candidate mark region.

* * * * *